United States Patent
Choi et al.

(10) Patent No.: US 10,172,175 B2
(45) Date of Patent: Jan. 1, 2019

(54) METHOD AND APPARATUS FOR INTERWORKING BETWEEN ELECTRONIC DEVICES

(71) Applicant: Samsung Electronics Co., Ltd., Gyeonggi-do (KR)

(72) Inventors: Sehwan Choi, Suwon-si (KR); Soon-Youl Kwon, Yongin-si (KR); Kyoungwon Kim, Yongin-si (KR); Jung-Sik Park, Suwon-si (KR); Yu-Min Cho, Seoul (KR); Young Kyu Seon, Yongin-si (KR); Hong-Ik Jin, Suwon-si (KR); Kyungjung Kim, Suwon-si (KR); Ga-Jin Song, Anyang-si (KR); Hyun-Ju Hong, Osan-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/653,080

(22) Filed: Jul. 18, 2017

(65) Prior Publication Data

US 2018/0020320 A1 Jan. 18, 2018

(30) Foreign Application Priority Data

Jul. 18, 2016 (KR) .......................... 10-2016-0090668

(51) Int. Cl.
*H04W 76/14* (2018.01)
*H04W 4/80* (2018.01)
(Continued)

(52) U.S. Cl.
CPC ............. *H04W 76/14* (2018.02); *H04W 4/80* (2018.02)

(58) Field of Classification Search
CPC ....... H04W 76/14; H04W 4/80; H04W 4/008; H04W 76/023; H04W 4/00; H04W 76/02
See application file for complete search history.

(56) References Cited

U.S. PATENT DOCUMENTS

| 8,229,352 B2 | 7/2012 | Doan et al. |
| 8,688,037 B2 | 4/2014 | Chatterjee et al. |
(Continued)

OTHER PUBLICATIONS

IEEE Std 802.11n, "Part 11: Wireless LAN Medium Access Control (MAC) and Physical Layer (PHY) Specifications—Amendment 5: Enhancements for Higher Throughput", Oct. 29, 2009, 536 pages.

*Primary Examiner* — Pablo Tran

(57) ABSTRACT

A method and apparatus capable of enhancing the usability of an electronic device through interworking between the electronic devices are disclosed. The electronic device includes a 1st wireless communication interface configured to perform 1st wireless communication with another electronic device, a 2nd wireless communication interface configured to perform 2nd wireless communication with another electronic device, and a processor operatively coupled with the 1st wireless communication interface and the 2nd wireless communication interface. The processor is configured to connect with another electronic device by the 1st wireless communication, using the 1st wireless communication interface, execute a 1st process with another electronic device on the basis of the 1st wireless communication, sense a 2nd process during the execution of the 1st process, allocate a resource for processing the 1st process and the 2nd process, in accordance with a corresponding profile, and process at least one process among the 1st process or the 2nd process on the basis of the allocated resource.

20 Claims, 28 Drawing Sheets

(51) Int. Cl.
*H04W 4/08* (2009.01)
*H04W 4/00* (2018.01)

(56) References Cited

U.S. PATENT DOCUMENTS

| | | |
|---|---|---|
| 9,088,305 B2 | 7/2015 | Jurgovan et al. |
| 9,603,192 B2 * | 3/2017 | Mohebbi ............... H04W 92/02 |
| 9,843,662 B2 * | 12/2017 | Kim .................... H04M 1/7253 |
| 2006/0160489 A1 | 7/2006 | Hardacker |
| 2015/0288410 A1 | 10/2015 | Adiletta et al. |
| 2016/0249217 A1 * | 8/2016 | Luft .................. G06Q 30/0205 |
| 2018/0049083 A1 * | 2/2018 | Kubota ................ H04W 36/04 |

* cited by examiner

METHOD AND APPARATUS FOR INTERWORKING BETWEEN ELECTRONIC DEVICES

CROSS-REFERENCE TO RELATED APPLICATION(S) AND CLAIM OF PRIORITY

The present application is related to and claims priority under 35 U.S.C. § 119(a) to a Korean Patent Application Serial No. 10-2016-0090668, which was filed in the Korean Intellectual Property Office on Jul. 18, 2016, the entire content of which is hereby incorporated by reference.

TECHNICAL FIELD

Various embodiments of the present disclosure teach a method and apparatus capable of enhancing the usability of an electronic device through interworking between the electronic devices.

BACKGROUND

With the recent growth of digital technologies, various types of electronic devices such as mobile communication terminals, smart phones, tablet personal computers (PCs), notebook computers, wearable devices, digital cameras, personal computers (PCs) or the like are being widely used.

The recent trend is that connection between electronic devices employs cable-less wireless connection in place of cable connection. Also, even in the case of electronic device charging, cable charging is being replaced with wireless charging. For example, in the case of a cable connection scheme, when an electronic device, a docking station, and an external device are all cable-connected with one another, it can cause limitations in connectivity, mobility or operability. Accordingly to this, wireless connection between the devices can provide a convenience of connection between the devices, and can provide a convenience of movement or operation of the devices.

SUMMARY

To address the above-discussed deficiencies, it is a primary object to provide method and apparatus for interworking between electronic devices. Recently, a demand for broadband and ultra high speed of information is increasing. Accordingly, attention is being paid to a frequency band (e.g., a band of 60 giga hertz (GHz)) for high speed close proximity communication of a wireless connection scheme. However, in a case of wireless connection between devices using the high speed close proximity communication, systematic process execution can be difficult due to a limitation of an effective operation distance (e.g., 1 centimeter (cm) to 10 cm). For example, when a user performs another action (e.g., telephony, a message, a game, etc.) in course of performing data communication in connection of devices, the devices may easily get out of the effective operation distance, causing a problem of disconnecting the data communication.

Various exemplary embodiments disclose a method and apparatus capable of enhancing the usability of the electronic device by smoothly providing interworking among a plurality of electronic devices.

Various exemplary embodiments disclose a method and apparatus connecting an electronic device, a docking station, and an external device, and adaptively changing data communication on the basis of a connection state of the electronic device with the docking station and performing the changed data communication.

Various exemplary embodiments disclose a method and apparatus distinguishing external devices to which an electronic device is connected through a docking station and, at occurrence of a new process in course of the progress of the existing process, automatically changing data communication for the external device in accordance with a connection state of high speed close proximity communication with the docking station and processing a multiple process.

Various exemplary embodiments disclose a method and apparatus of, in case where an electronic device is connected to a docking station and thereafter a new process occurs by the electronic device, seamlessly processing the existing process and the new process.

An electronic device according to various exemplary embodiments may include a 1st wireless communication interface configured to perform 1st wireless communication with another electronic device, a 2nd wireless communication interface configured to perform 2nd wireless communication with another electronic device, and a processor operatively coupled with the 1st wireless communication interface and the 2nd wireless communication interface. The processor may be configured to connect with another electronic device by the 1st wireless communication, using the 1st wireless communication interface, execute a 1st process with another electronic device on the basis of the 1st wireless communication, sense a 2nd process during the execution of the 1st process, allocate a resource for processing the 1st process and the 2nd process, in accordance with a corresponding profile, and process at least one process among the 1st process or the 2nd process on the basis of the allocated resource.

A method for operating in an electronic device according to various exemplary embodiments may include connecting with another electronic device by 1st wireless communication, using a 1st wireless communication interface, executing a 1st process with another electronic device on the basis of the 1st wireless communication, sensing a 2nd process during the execution of the 1st process, allocating a resource for processing the 1st process and the 2nd process, in accordance with a corresponding profile, and processing at least one process among the 1st process or the 2nd process on the basis of the allocated resource.

To fix the above drawbacks, various exemplary embodiments of the present disclosure can include a computer-readable recording medium recording a program for executing the above method in a processor.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
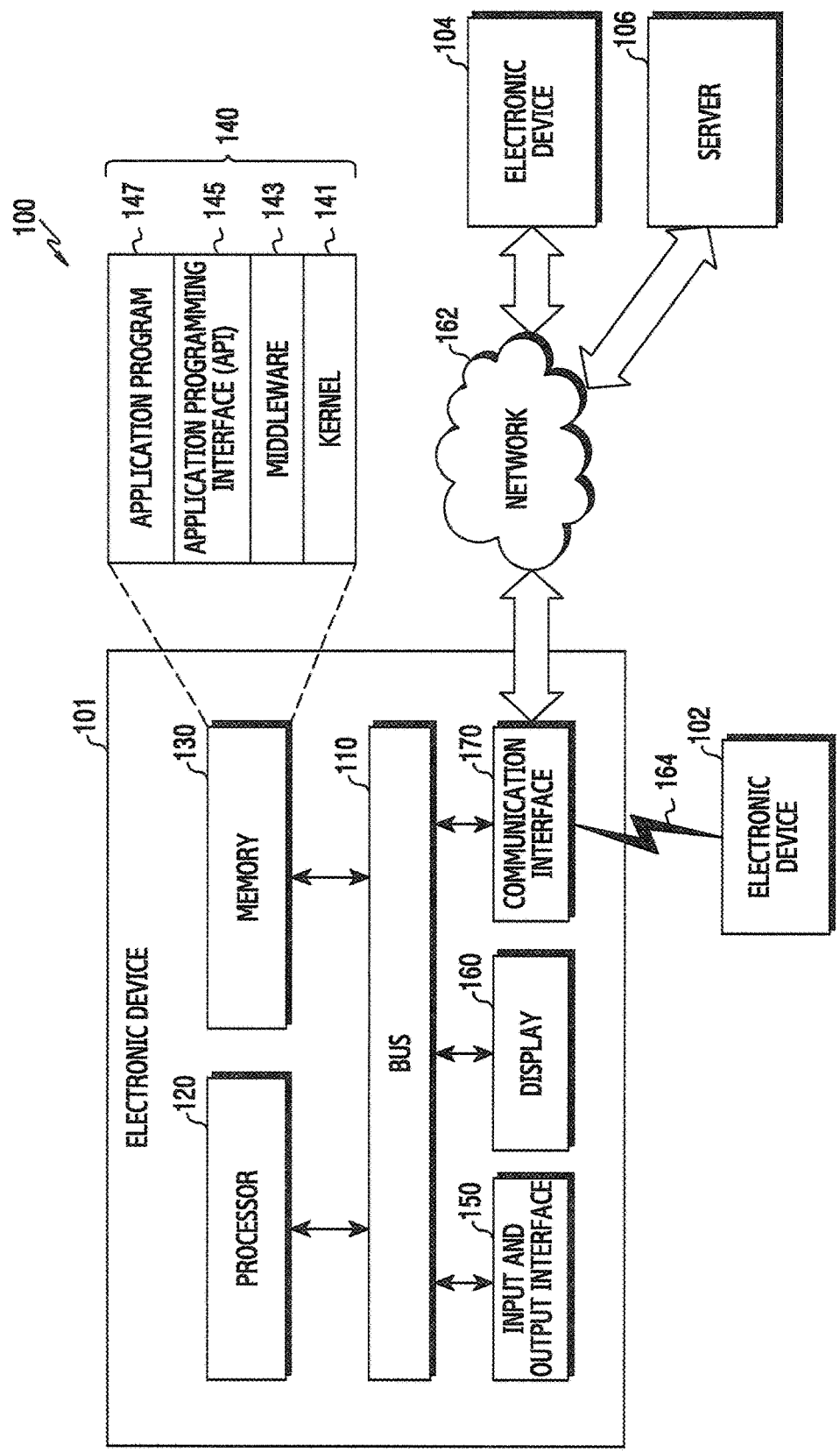
FIG. 1 illustrates a diagram of a network environment including an electronic device according to various exemplary embodiments of the present disclosure.

FIGS. 1 through 27, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The terms "A or B" or "at least one of A or/and B" used in the present disclosure include all possible combinations of the items enumerated therewith. The terms such as "first" and "second" may be used in embodiments of the present disclosure to mark/identify/label various elements regardless of the order and/or importance of the elements, and do not limit the marked/identified/labelled elements in any way. These terms are used to distinguish one element from another. It will be understood that, when an element (e.g., a first element) is mentioned as being "operatively or communicatively coupled with/to" or "connected to" another element (e.g., a second element), the element may be directly coupled or connected to another element, or there may be an intervening element (e.g., a third element) between the element and another element.

The term "configured (or set) to . . . " used in the embodiments may be interchangeably used with the terms "suitable for . . . ," "having the capacity to . . . ," "adapted to . . . ," "made to . . . ," "capable of . . . ," or "designed to" depending on the situation. The term "configured (or set) to . . . " does not necessarily mean "specifically designed to . . . " in a hardware level. Instead, in a certain situation, the term "a device configured to . . . " may refer to a situation in which "the device being capable of . . . " with another device or parts. For example, "a processor configured (set) to perform A, B, and C" may refer, for example, to a dedicated processor (e.g., an embedded processor) for performing a corresponding operation, or a generic-purpose processor (e.g., a central processing unit (CPU) or an application processor (AP)) for performing corresponding operations by executing one or more software programs stored in a memory device.

The term "connected" or "connection" shall also be understood to include a temporary sharing or association of transmission channels, including radio frequency channels, to provide for the transmission of information between two points. The term "wireless connection" shall be understood to include a temporary sharing or association of radio frequency channels to provide for the transmission of information between two points.

Electronic devices can include communication circuits that are capable of wireless communication over a variety of different frequency bands (e.g., a first wireless communication and a second wireless communication). Lower frequency bands are usually associated with higher ranges but lower bit rates. High frequency bands can allow for higher data rates, but have lower ranges. For example, WiFi (802.11ac) commonly operates in the 2.4/5 GHz frequency band, has a range of as high as 250 m/825 ft and a data rate of as high as 433 Mbps, while WiGig (802.11ad) operates in the 60 GHz band, has a data rate as high as 4.6 Gbps, but with a range of only 10-30 m/30-100 ft which cannot penetrate walls.

Development of various proximity services utilizing low-power discovery technology using short-range communication technology is ongoing. Low-power and proximity-based advertisement services using Bluetooth low energy (BLE) beacons are a representative example of such technology.

An electronic device according to various embodiments of the present disclosure may include at least one of, for example, a smart phone, a tablet personal computer (PC), a mobile phone, a video phone, an electronic book reader (e-book reader), a desktop PC, a laptop PC, a netbook computer, a workstation, a server, a personal digital assistant (PDA), a portable multimedia player (PMP), a MPEG-1 audio layer-3 (MP3) player, a mobile medical device, a camera, and a wearable device, or the like, but is not limited thereto. According to various embodiments, the wearable device may include at least one of an accessory type (e.g., a watch, a ring, a bracelet, an anklet, a necklace, a glasses, a contact lens, or a head-mounted device (HMD)), a fabric or clothing integrated type (e.g., an electronic clothing), a body-mounted type (e.g., a skin pad, or tattoo), and a bio-implantable type (e.g., an implantable circuit), or the like, but is not limited thereto.

According to some embodiments, the electronic device may be a home appliance. The home appliance may include at least one of, for example, a television, a digital video disk (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame, or the like, but is not limited thereto.

According to another embodiment, the electronic device may include at least one of various medical devices (e.g., various portable medical measuring devices (a blood glucose monitoring device, a heart rate monitoring device, a blood pressure measuring device, a body temperature measuring device, etc.), a magnetic resonance angiography (MRA), a magnetic resonance imaging (MRI), a computed tomography (CT) machine, and an ultrasonic machine), a navigation device, a global positioning system (GPS) receiver, an event data recorder (EDR), a flight data recorder (FDR), a vehicle infotainment devices, an electronic devices for a ship (e.g., a navigation device for a ship, and a gyro-compass), avionics, security devices, an automotive head unit, a robot for home or industry, an automatic teller's machine (ATM) in banks, point of sales (POS) in a shop, or internet device of things (e.g., a light bulb, various sensors, electric or gas meter, a sprinkler device, a fire alarm, a thermostat, a streetlamp, a toaster, a sporting goods, a hot water tank, a heater, a boiler, etc.), or the like, but is not limited thereto.

According to some embodiments, the electronic device may include at least one of a part of furniture or a building/structure, an electronic board, an electronic signature receiving device, a projector, and various kinds of measuring instruments (e.g., a water meter, an electric meter, a gas meter, and a radio wave meter), or the like, but is not limited thereto. The electronic device according to various embodiments of the present disclosure may be a combination of one or more of the aforementioned various devices. The electronic device according to some embodiments of the present disclosure may be a flexible device. Further, the electronic device according to an embodiment of the present disclosure is not limited to the aforementioned devices, and may include a new electronic device according to the development of technology.

Hereinafter, an electronic device according to various embodiments will be described with reference to the accompanying drawings. As used herein, the term "user" may indicate a person who uses an electronic device or a device (e.g., an artificial intelligence electronic device) that uses an electronic device.

FIG. 1 illustrates a network environment including an electronic device according to various embodiments of the present disclosure.

An electronic device 101 within a network environment 100, according to various embodiments, will be described with reference to FIG. 1. The electronic device 101 may include a bus 110, a processor 120, a memory 130, an input/output interface 150, a display 160, and a communication interface 170. According to an embodiment of the present disclosure, the electronic device 101 may omit at least one of the above components or may further include other components.

The electronic device 101 can establish a wireless connection with the external electronic device 102 using a first frequency band. When it is possible for the electronic device 101 to establish a wireless connection with the external electronic device 102 using a second frequency band, the electronic device 101 and the external electronic device may perform data communication using the second frequency band. However, when it is not possible to establish a connection with the at least one external electronic device using the second frequency band, the electronic device 101 can perform data communication with the external device 102 using the first frequency band.

According to certain embodiments, the communication interface 170 can comprise a first communication circuit configured to perform wireless communication with the external electronic device 102 using a first frequency band, and a second communication circuit configured to perform wireless communication with the external electronic device 102 using a second frequency band.

The bus 110 may include, for example, a circuit which interconnects the components 110 to 170 and delivers a communication (e.g., a control message and/or data) between the components 110 to 170.

The processor 120 may include one or more of a central processing unit (CPU), an application processor (AP), and a communication processor (CP). The processor 120 may carry out, for example, calculation or data processing relating to control and/or communication of at least one other component of the electronic device 101. A processing (or controlling) operation of the processor 120 according to various exemplary embodiments will be described below in detail with reference to the accompanying drawings.

The memory 130 may include a volatile memory and/or a non-volatile memory. The memory 130 may store, for example, commands or data relevant to at least one other component of the electronic device 101. According to an embodiment of the present disclosure, the memory 130 may store software and/or a program 140. The program 140 may include, for example, a kernel 141, middleware 143, an application programming interface (API) 145, and/or application programs (or "applications") 147. At least some of the kernel 141, the middleware 143, and the API 145 may be referred to as an operating system (OS).

The memory 130 may store one or more programs which are executed by the processor 120 and may perform a function of temporarily storing inputted/outputted data. According to various exemplary embodiments, the memory 130 may serve to store acquired data, and may store data acquired in real time in a temporary storage device and may store data determined as being stored in a storage device which can store for a long time. The memory 130 may include a computer-readable recording medium having a program recorded thereon, for executing methods according various exemplary embodiments in the processor 120.

The kernel 141 may control or manage system resources (e.g., the bus 110, the processor 120, or the memory 130) used for performing an operation or function implemented in the other programs (e.g., the middleware 143, the API 145, or the application programs 147). Furthermore, the kernel 141 may provide an interface through which the middleware 143, the API 145, or the application programs 147 may access the individual components of the electronic device 101 to control or manage the system resources.

The middleware 143, for example, may serve as an intermediary for allowing the API 145 or the application programs 147 to communicate with the kernel 141 to exchange data.

Also, the middleware 143 may process one or more task requests received from the application programs 147 according to priorities thereof. For example, the middleware 143 may assign priorities for using the system resources (e.g., the bus 110, the processor 120, the memory 130, or the like) of the electronic device 101, to at least one of the application programs 147. For example, the middleware 143 may perform scheduling or loading balancing on the one or more task requests by processing the one or more task requests according to the priorities assigned thereto.

The API 145 is an interface through which the applications 147 control functions provided from the kernel 141 or the middleware 143, and may include, for example, at least one interface or function (e.g., instruction) for file control, window control, image processing, character control, and the like.

The input/output interface 150, for example, may function as an interface that may transfer commands or data input from a user or another external device to the other element(s) of the electronic device 101. Furthermore, the input/output interface 150 may output the commands or data received from the other element(s) of the electronic device 101 to the user or another external device. For example, the input/output interface 150 may include a wire/wireless headphone port, an external charger port, a wire/wireless data port, a memory card port, an audio input/output port, a video input/output port, an earphone port, or the like.

Examples of the display 160 may include a liquid crystal display (LCD), a light-emitting diode (LED) display, an organic light-emitting diode (OLED) display, a micro electro mechanical systems (MEMS) display, and an electronic paper display, or the like, but is not limited thereto. The display 160 may display, for example, various types of contents (e.g., text, images, videos, icons, or symbols) to users. The display 160 may include a touch screen, and may receive, for example, a touch, gesture, proximity, or hovering input using an electronic pen or a user's body part.

The display 160 may show a visual output to the user, for example. The visual output may be displayed in the form of a text, a graphic, or a video or a combination thereof. The display 160 may display (output) a variety of information processed in the electronic device. For example, the display 160 may display a user interface (UI) or a graphic user interface (GUI) related to the use of the electronic device.

The communication interface 170 may establish communication, for example, between the electronic device 101 and an external device (e.g., a first external electronic device 102, a second external electronic device 104, or a server 106). For example, the communication interface 170 may be connected to a network 162 through wireless or wired communication, and may communicate with an external device (e.g., the second external electronic device 104 or the server 106).

The wireless communication may use at least one of, for example, long term evolution (LTE), LTE-advance (LTE-A), code division multiple access (CDMA), wideband CDMA (WCDMA), universal mobile telecommunications system (UMTS), wireless broadband (WiBro), and global system for mobile communications (GSM), as a cellular communication protocol.

According to one embodiment, the wireless communication may include, for example, at least one of wireless fidelity (WiFi), light fidelity (LiFi), wireless gigabit alliance (WiGig), Bluetooth, Bluetooth low energy (BLE), Zigbee, near field communication (NFC), magnetic secure transmission, radio frequency (RF), or a body area network (BAN).

According to one embodiment, the wireless communication may include a global navigation satellite system (GNSS). For example, the GNSS may be a global positioning system (GPS), a global navigation satellite system (Glonass), a Beidou navigation satellite system (hereinafter, referred to as "Beidou"), Galileo, or the European global satellite-based navigation system. Hereinafter, the "GPS" and the "GNSS" may be used interchangeably. The wire communication may include, for example, at least one of a universal serial bus (USB), a high definition multimedia interface (HDMI), a recommended standard 232 (RS-232), power line communication, or a plain old telephone service (POTS).

The network 162 may include at least one of a telecommunication network such as a computer network (e.g., a LAN or a WAN), the Internet, and a telephone network.

Each of the first external device 102 and second external electronic device 104 may be of a type identical to or different from that of the electronic device 101. According to an embodiment of the present disclosure, the server 106 may include a group of one or more servers. According to various embodiments of the present disclosure, all or some of the operations performed in the electronic device 101 may be executed in another electronic device or a plurality of electronic devices (e.g., the electronic devices 102 and 104 or the server 106). According to an embodiment of the present disclosure, when the electronic device 101 has to perform some functions or services automatically or in response to a request, the electronic device 101 may request another device (e.g., the electronic device 102 or 104 or the server 106) to execute at least some functions relating thereto instead of or in addition to autonomously performing the functions or services. Another electronic device (e.g., the electronic device 102 or 104, or the server 106) may execute the requested functions or the additional functions, and may deliver a result of the execution to the electronic device 101. The electronic device 101 may process the received result as it is or additionally, and may provide the requested functions or services. To this end, for example, cloud computing, distributed computing, or client-server computing technologies may be used.

The server 106 may include, for example, at least one of a certification server, an integration server, a provider server (or a mobile network operator server), a content server, an Internet server, a cloud server, or the like.

Figure 2:
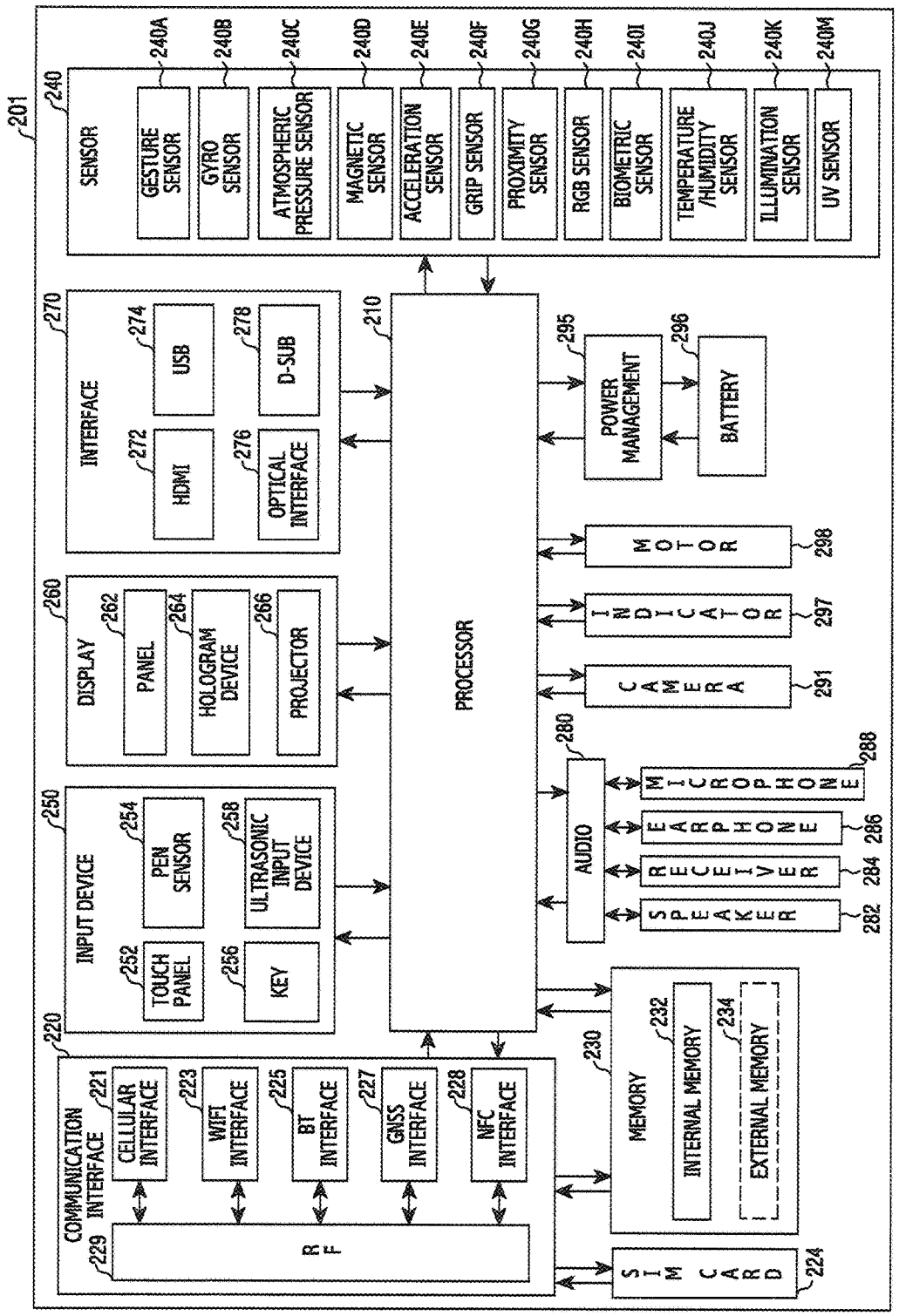
FIG. 2 illustrates a block diagram of a construction of an electronic device according to various exemplary embodiments of the present disclosure.

FIG. 2 illustrates a block diagram of an electronic device according to various embodiments of the present disclosure.

The electronic device 201 may include, for example, all or a part of the electronic device 101 shown in FIG. 1. The electronic device 201 may include one or more processors 210 (e.g., application processors (AP)), a communication interface 220, a subscriber identification module (SIM) 224, a memory 230, a sensor 240, an input device 250, a display 260, an interface 270, an audio 280, a camera 291, a power management 295, a battery 296, an indicator 297, and a motor 298.

The processor 210 may control a plurality of hardware or software components connected to the processor 210 by driving an operating system or an application program, and perform processing of various pieces of data and calculations. The processor 210 may be embodied as, for example, a system on chip (SoC). According to an embodiment of the present disclosure, the processor 210 may further include a graphic processing unit (GPU) and/or an image signal processor. The processor 210 may include at least some (e.g., a cellular interface 221) of the components illustrated in FIG. 2. The processor 210 may load, into a volatile memory, commands or data received from at least one (e.g., a non-volatile memory) of the other components and may process the loaded commands or data, and may store various data in a non-volatile memory. A processing (or controlling) operation of the processor 210 according to various exemplary embodiments will be described in detail with reference to the accompanying drawings.

The communication interface 220 may have a configuration equal or similar to that of the communication interface 170 of FIG. 1. The communication interface 220 may include, for example, a cellular interface 221, a WiFi interface 223, a BT interface 225, a GNSS interface 227 (e.g., a GPS interface 227, a Glonass interface, a Beidou interface, or a Galileo interface), an NFC interface 228, and a radio frequency (RF) module 229. Although not shown, the communication interface 220 may further include a WiGig module (not shown), for example. According to one embodiment, the WiFi interface 223 and the WiGig module (not shown) may be integrated into a single chip.

The cellular interface 221, for example, may provide a voice call, a video call, a text message service, or an Internet service through a communication network. According to an embodiment of the present disclosure, the cellular interface 221 may distinguish and authenticate the electronic device 201 in a communication network using the subscriber identification module 224 (e.g., the SIM card). According to an embodiment of the present disclosure, the cellular interface 221 may perform at least some of the functions that the AP 210 may provide. According to an embodiment of the present disclosure, the cellular interface 221 may include a communication processor (CP). According to an exemplary embodiment, at least some (e.g., two or more) of the cellular interface 221, the WiFi interface 223, the Bluetooth module 225, the GNSS interface 227, or the NFC interface 228 may be included in a single integrated chip (IC) or an IC package.

The RF 229, for example, may transmit/receive a communication signal (e.g., an RF signal). The RF 229 may include, for example, a transceiver, a power amplifier module (PAM), a frequency filter, a low noise amplifier (LNA), and an antenna. According to another embodiment of the present disclosure, at least one of the cellular interface 221, the WiFi interface 223, the BT interface 225, the GNSS interface 227, and the NFC interface 228 may transmit/receive an RF signal through a separate RF.

For example, the WiFi interface 223 may indicate a module for wirelessly accessing the Internet and establishing a wireless LAN link with other external devices (e.g., another electronic device 102 or the server 106). The WiFi interface 223 may be embedded in the electronic device 201 or may be provided outside the electronic device 201. The wireless Internet technology may use WiFi, WiGig, Wibro, world interoperability for microwave access (WiMax), high speed downlink packet access (HSPDA), millimeter Wave (mmWave), or the like. The WiFi interface 223 may interwork with another external device (e.g., another electronic device 104 or the like) connected with the electronic device via a network (e.g., a wireless Internet network) (e.g., the network 162) to transmit various data of the electronic device to the outside or receive data from the outside. The WiFi interface 223 may always maintain an on-state or may be turned on/off according to settings of the electronic device or a user input.

The Bluetooth module 225 and the NFC interface 228 may indicate, for example, short-range communication interfaces for performing short range communication. The short-range communication technology may use Bluetooth, BLE, radio frequency identification (RFID), infrared data association (IrDA), ultra wideband (UWB), Zigbee, or NFC. The short-range communication interface may interwork with another external device (e.g., another electronic device 102) connected with the electronic device via a network (e.g., a short-range communication network) to transmit various data of the electronic device to the external device or receive data therefrom. The short-range communication interface may always maintain an on-state or may be turned on/off according to settings of the electronic device or a user input.

The subscriber identification module 224 may include, for example, a card including a subscriber identity module and/or an embedded SIM, and may contain unique identification information (e.g., an integrated circuit card identifier (ICCID)) or subscriber information (e.g., an international mobile subscriber identity (IMSI)).

The memory 230 (e.g., the memory 130) may include, for example, an embedded memory 232 and/or an external memory 234. The embedded memory 232 may include at least one of a volatile memory (e.g., a dynamic random access memory (DRAM), a static RAM (SRAM), a synchronous dynamic RAM (SDRAM), and the like) and a non-volatile memory (e.g., a one time programmable read only memory (OTPROM), a programmable ROM (PROM), an erasable and programmable ROM (EPROM), an electrically erasable and programmable ROM (EEPROM), a mask ROM, a flash ROM, a flash memory (e.g., a NAND flash memory or a NOR flash memory), a hard disc drive, a solid state drive (SSD), and the like).

The external memory 234 may further include a flash drive, for example, a compact flash (CF), a secure digital (SD), a micro secure digital (Micro-SD), a mini secure digital (Mini-SD), an extreme digital (xD), a multi media card (MMC), a memory stick, or the like. The external memory 234 may be functionally and/or physically connected to the electronic device 201 through various interfaces.

The sensor 240, for example, may measure a physical quantity or detect an operation state of the electronic device 201, and may convert the measured or detected information into an electrical signal. The sensor 240 may include, for example, at least one of a gesture sensor 240A, a gyro sensor 240B, an atmospheric pressure sensor (barometer) 240C, a magnetic sensor 240D, an acceleration sensor 240E, a grip sensor 240F, a proximity sensor 240G, a color sensor 240H (e.g., red, green, and blue (RGB) sensor), a biometric sensor (medical sensor) 240I, a temperature/humidity sensor 240J, an illuminance sensor 240K, and a ultra violet (UV) sensor 240M. Additionally or alternatively, the sensor 240 may include, for example, an E-nose sensor, an electromyography (EMG) sensor, an electroencephalogram (EEG) sensor, an electrocardiogram (ECG) sensor, an Infrared (IR) sensor, an iris scan sensor, and/or a finger scan sensor. The sensor 240 may further include a control circuit for controlling one or more sensors included therein. According to an embodiment of the present disclosure, the electronic device 201 may further include a processor configured to control the sensor 240, as a part of the processor 210 or separately from the processor 210, and may control the sensor 240 while the processor 210 is in a sleep state.

The input device 250 may include, for example, and without limitation, a touch panel 252, a (digital) pen sensor 254, a key 256, or an ultrasonic input device 258. The touch panel 252 may use, for example, at least one of a capacitive type, a resistive type, an infrared type, and an ultrasonic type. The touch panel 252 may further include a control circuit. The touch panel 252 may further include a tactile layer, and provide a tactile reaction to the user.

The (digital) pen sensor 254 may include, for example, a recognition sheet which is a part of the touch panel or is separated from the touch panel. The key 256 may include, for example, a physical button, an optical key or a keypad. The ultrasonic input device 258 may detect, through a microphone (e.g., the microphone 288), ultrasonic waves generated by an input tool, and identify data corresponding to the detected ultrasonic waves.

The display 260 (e.g., the display 160) may include a panel 262, a hologram device 264, or a projector 266, and/or a control circuit for controlling the aforementioned devices.

The panel 262 may be implemented to be, for example, flexible, transparent, or wearable. The panel 262 may be embodied as a single module with the touch panel 252. According to one embodiment, the panel 262 may include a pressure sensor (or a force sensor) for measuring an intensity of pressure on a user's touch. The pressure sensor may be integrated into an integral type with the touch panel 252 or may be implemented as one or more sensors separate from the touch panel 252.

The hologram device 264 may show a three dimensional (3D) image in the air by using an interference of light. The projector 266 may project light onto a screen to display an image. The screen may be located, for example, in the interior of or on the exterior of the electronic device 201. According to an embodiment of the present disclosure, the display 260 may further include a control circuit for controlling the panel 262, the hologram device 264, or the projector 266.

The interface 270 may include, for example, and without limitation, a high-definition multimedia interface (HDMI) 272, a universal serial bus (USB) 274, an optical interface 276, or a D-subminiature (D-sub) 278. The interface 270 may be included in, for example, the communication interface 170 illustrated in FIG. 1. Additionally or alternatively, the interface 270 may include, for example, a mobile high-definition link (MHL) interface, a secure digital (SD) card/multi-media card (MMC) interface, or an infrared data association (IrDA) standard interface.

The audio 280, for example, may bilaterally convert a sound and an electrical signal. At least some components of the audio 280 may be included in, for example, the input/output interface 150 illustrated in FIG. 1. The audio 280 may process voice information input or output through, for example, a speaker 282, a receiver 284, earphones 286, or the microphone 288.

The audio 280 may transmit an audio signal received from the processor 210 to an output device (e.g., the speaker 282, the receiver 284, or the earphone 286), and may transmit an audio signal like a voice which is received from an input device (e.g., the microphone 288) to the processor 210. The audio 280 may convert voice/audio data into an audible sound and output the audible sound through the output device under the control of the processor 210, and may convert an audio signal like a voice received from the input device into a digital signal and transmit the digital signal to the processor 210.

The speaker 282 or the receiver 284 may output audio data which is received from the communication interface 220 or stored in the memory 230. The speaker 282 or the receiver 284 may output an audio signal related to various operations (functions) performed in the electronic device.

The microphone 288 may receive an external audio signal and may process the audio signal into electric voice data. The microphone 288 may implement various noise reduction algorithms for removing a noise occurring in the process of receiving an external audio signal. The microphone 288 may serve to input an audio streaming such as a voice command or the like.

The camera 291 is, for example, a device which may photograph a still image and a video. According to an embodiment of the present disclosure, the camera 291 may include one or more image sensors (e.g., a front sensor or a back sensor), a lens, an image signal processor (ISP) or a flash (e.g., LED or xenon lamp).

The power management 295 may manage, for example, power of the electronic device 201. According to an embodiment of the present disclosure, the power management 295 may include a power management integrated circuit (PMIC), a charger Integrated Circuit (IC), or a battery or fuel gauge. The PMIC may use a wired and/or wireless charging method. Examples of the wireless charging method may include, for example, a magnetic resonance method, a magnetic induction method, an electromagnetic wave method, and the like. Additional circuits (e.g., a coil loop, a resonance circuit, a rectifier, etc.) for wireless charging may be further included. The battery gauge may measure, for example, a residual quantity of the battery 296, and a voltage, a current, or a temperature while charging. The battery 296 may include, for example, a rechargeable battery and/or a solar battery.

The indicator 297 may display a particular state (e.g., a booting state, a message state, a charging state, or the like) of the electronic device 201 or a part (e.g., the processor 210) of the electronic device 201. The motor 298 may convert an electrical signal into a mechanical vibration, and may generate a vibration, a haptic effect, or the like.

Although not illustrated, the electronic device 201 may include a processing device (e.g., a GPU) for supporting a mobile TV. The processing device for supporting a mobile TV may process, for example, media data according to a certain standard such as digital multimedia broadcasting (DMB), digital video broadcasting (DVB), or mediaFLO™.

Each of the above-described component elements of hardware according to the present disclosure may be configured with one or more components, and the names of the corresponding component elements may vary based on the type of electronic device. In various embodiments, the electronic device may include at least one of the above-described elements. Some of the above-described elements may be omitted from the electronic device, or the electronic device may further include additional elements. Also, some of the hardware components according to various embodiments may be combined into one entity, which may perform functions identical to those of the relevant components before the combination.

Figure 3:
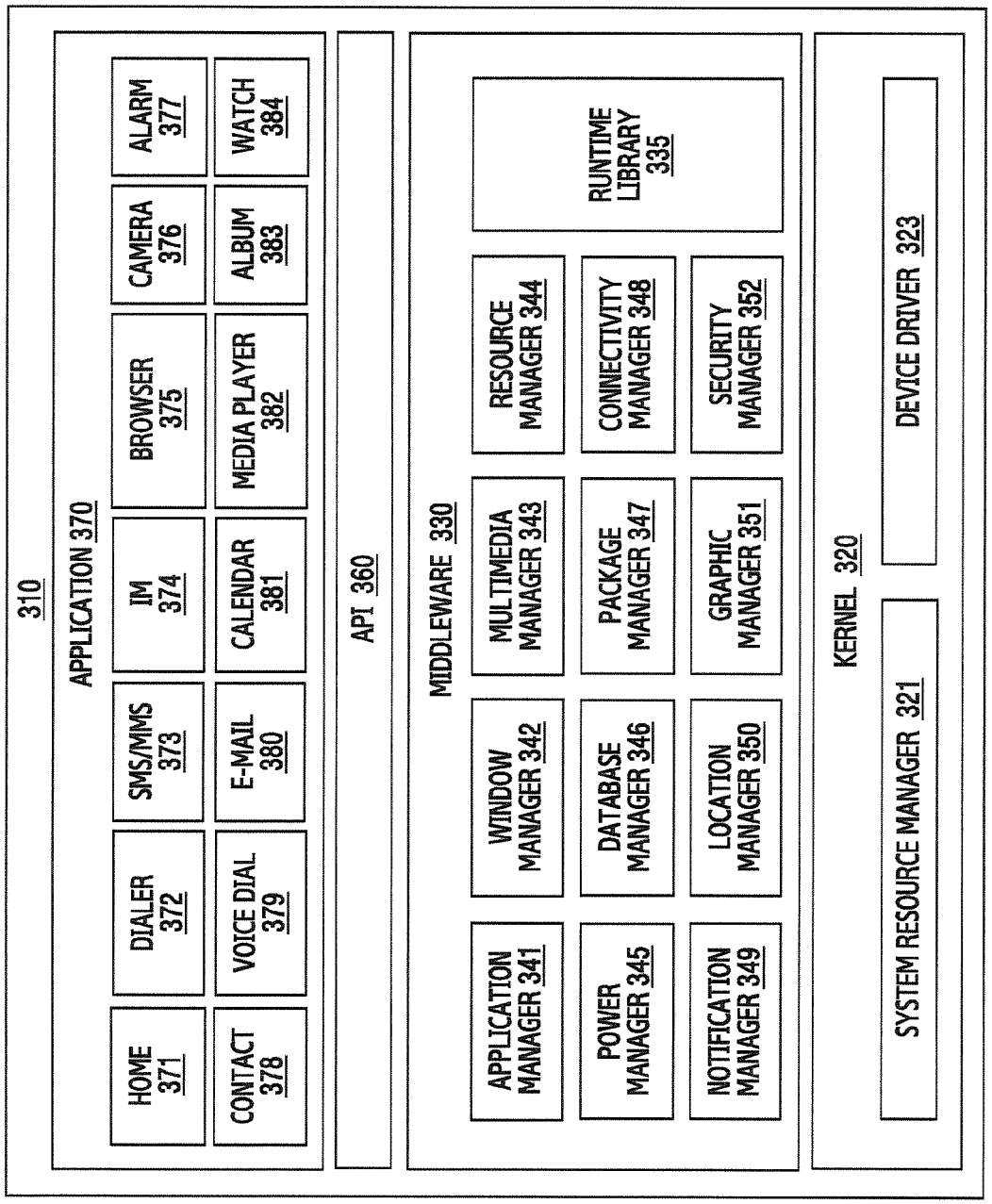
FIG. 3 illustrates a block diagram of a program module according to various exemplary embodiments of the present disclosure.

FIG. 3 illustrates a block diagram of a program module according to various embodiments of the present disclosure.

According to an embodiment of the present disclosure, the program module 310 (e.g., the program 140) may include an operating system (OS) for controlling resources related to the electronic device (e.g., the electronic device 101) and/or various applications (e.g., the application programs 147) executed in the operating system. The operating system may be, for example, Android™, iOS™, Windows™, Symbian™, Tizen™, Bada™, or the like.

Referring to FIG. 3, the program module 310 may include a kernel 320 (e.g., the kernel 141), a middleware 330 (e.g., the middleware 143), an API 360 (e.g., the API 145), and/or an application 370 (e.g., an application program 147). At least some of the program module 310 may be preloaded on an electronic device, or may be downloaded from an external electronic device (e.g., the electronic device 102 or 104, or the server 106).

The kernel 320 (e.g., the kernel 141) may include, for example, a system resource manager 321 and/or a device driver 323. The system resource manager 321 may control, allocate, or collect system resources. According to an embodiment of the present disclosure, the system resource manager 321 may include a process management unit, a memory management unit, a file system management unit, and the like. The device driver 323 may include, for example, a display driver, a camera driver, a Bluetooth driver, a shared memory driver, a USB driver, a keypad driver, a Wi-Fi driver, an audio driver, or an inter-process communication (IPC) driver.

For example, the middleware 330 may provide a function required in common by the applications 370, or may provide various functions to the applications 370 through the API 360 so as to enable the applications 370 to efficiently use the limited system resources in the electronic device.

According to an embodiment of the present disclosure, the middleware 330 (e.g., the middleware 143) may include at least one of a run time library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

The runtime library 335 may include a library module that a compiler uses in order to add a new function through a programming language while an application 370 is being executed. The runtime library 335 may perform input/output management, memory management, the functionality for an arithmetic function, or the like.

The application manager 341 may manage, for example, a life cycle of at least one of the applications 370. The window manager 342 may manage graphical user interface (GUI) resources used by a screen. The multimedia manager 343 may recognize a format required for reproduction of various media files, and may perform encoding or decoding of a media file by using a codec suitable for the corresponding format. The resource manager 344 may manage resources of a source code, a memory, and a storage space of at least one of the applications 370.

The power manager 345 may manage a capacity of a battery or power, for example, and may provide power information necessary for the operation of the electronic device. According to one embodiment, the power manager 34 may interwork with a basic input/output system (BIOS).

The database manager 346 may generate, search for, and/or change a database to be used by at least one of the applications 370. The package manager 347 may manage installation or an update of an application distributed in a form of a package file.

For example, the connectivity manager 348 may manage wireless connectivity such as Wi-Fi or Bluetooth. The notification manager 349 may display or notify of an event such as an arrival message, promise, proximity notification, and the like in such a way that does not disturb a user. The location manager 350 may manage location information of an electronic device. The graphic manager 351 may manage a graphic effect which will be provided to a user, or a user interface related to the graphic effect. The security manager 352 may provide all security functions required for system security, user authentication, or the like.

According to one embodiment, the middleware 330 may include a telephony manager for managing a voice of the electronic device or a video communication function, or a middleware module for forming a combination of the functions of the aforementioned elements. According to an embodiment of the present disclosure, the middleware 330 may provide a module specialized for each type of OS in order to provide a differentiated function. Further, the middleware 330 may dynamically remove some of the existing components or add new components.

The API 360 (e.g., the API 145) is, for example, a set of API programming functions, and may be provided with a different configuration according to an OS. For example, in the case of Android™ or iOS™, one API set may be provided for each platform. In the case of Tizen™, two or more API sets may be provided for each platform.

For example, the application 370 may include applications such as a home 371, a dialer 372, a short message service (SMS)/multimedia messaging service (MMS) 373, an instant message (IM) 374, a browser 375, a camera 376, an alarm 377, a contact 378, a voice dial 379, an email 380, a calendar 381, a media player 382, an album 383, a watch 384, or the like. According to various exemplary embodiments, the application 370 may include a health care application (e.g., for measuring exercise or blood glucose) or an environmental information (e.g., atmospheric pressure, humidity, or temperature information) providing application, or the like.

According to an embodiment of the present disclosure, the applications 370 may include an application (hereinafter, referred to as an "information exchange application" for convenience of description) that supports exchanging information between the electronic device (e.g., the electronic device 101) and an external electronic device (e.g., the electronic device 102 or 104). The information exchange application may include, for example, a notification relay application for transferring specific information to an external electronic device or a device management application for managing an external electronic device.

For example, the notification relay application may transmit notification information generated in another application of the electronic device to an external electronic device, or may receive notification information from an external electronic device and provide the notification information to the user.

The device management application may manage (e.g., install, delete, or update), for example, at least one function of an external electronic device (e.g., the electronic device 102 or 104) communicating with the electronic device (e.g., a function of turning on/off the external electronic device itself (or some components) or a function of adjusting the brightness (or a resolution) of the display), applications operating in the external electronic device, and services provided by the external electronic device (e.g., a call service or a message service).

According to an embodiment of the present disclosure, the applications 370 may include applications (e.g., a health care application of a mobile medical appliance or the like) designated according to an external electronic device (e.g., attributes of the electronic device 102 or 104).

According to an embodiment of the present disclosure, the applications 370 may include an application received from an external electronic device (e.g., the server 106, or the electronic device 102 or 104).

At least a portion of the program module 310 may be implemented (e.g., executed) by software, firmware, hardware (e.g., the processor 210), or a combination of two or more thereof, and may include, for example, modules, programs, routines, sets of instructions, or processes, or the like for performing one or more functions.

The term "module" used herein may represent, for example, a unit including hardware, software and firmware. The term "module" may be interchangeably used with the terms "logic," "logical block," "component" and "circuit." The "module" may be a minimum unit of an integrated component or may be a part thereof. The "module" may be a minimum unit for performing one or more functions or a part thereof. The "module" may be implemented mechanically or electronically. For example, the "module" may include an application-specific IC (ASIC) chip, field-programmable gate arrays (FPGAs), and a programmable-logic device for performing some operations, which are known or will be developed.

According to various embodiments of the present disclosure, at least a portion of an apparatus (e.g., modules or functions thereof) or a method (e.g., operations) according to various embodiments of the present disclosure, for example, may be implemented by instructions stored in a computer-readable storage media (e.g., the memory 130) in the form of a programmable module. The instruction, when executed by one or more processors (e.g., the application processor 120), may perform a function corresponding to the instruction.

The computer-readable recording media may include a hard disk, a floppy disk, a magnetic media (e.g., a magnetic tape), an optical recording media (e.g., compact disc read only memory (CD-ROM) and a digital versatile disc (DVD, a magneto-optical media (e.g., a floptical disk), and an internal memory. Also, an instruction may include a code generated by a compiler or a code executable by an interpreter. A module or a program module according to various embodiments of the present disclosure may include at least one of the above elements, or a portion of the above elements may be omitted, or additional other elements may be further included.

According to various exemplary embodiments, the recording medium may include a computer-readable recording medium having a program recorded thereon, for executing various methods described below in the processor 120, 210.

Operations performed by a module, a program module, or other elements according to various embodiments of the present disclosure may be executed sequentially, in parallel, repeatedly, or in a heuristic method, or at least some operations may be executed or a different order or omitted, or other operations may be added.

An electronic device according to various exemplary embodiments of the present disclosure may include all devices that support a communication function and use one or more of various processors such as an AP, a CP, a GPU, a CPU, etc. For example, the electronic device according to various exemplary embodiments may include all of information communication devices, multimedia devices, wearable devices, internet of things (IoT) devices, or appliances thereof that support the communication function.

An operation method and apparatus according to various exemplary embodiments of the present disclosure will be described below with reference to the accompanying drawings. However, it should be noted that since various exemplary embodiments of the present disclosure are not limited or restricted by the following description, the various exemplary embodiments are applicable on the basis of the following exemplary embodiment. In the various exemplary embodiments of the present disclosure described below, a hardware access method will be described as an example. However, since the various exemplary embodiments of the present disclosure include a technology using all hardware and software, the various exemplary embodiments of the present disclosure do not exclude a software-based access method.

Figure 4:
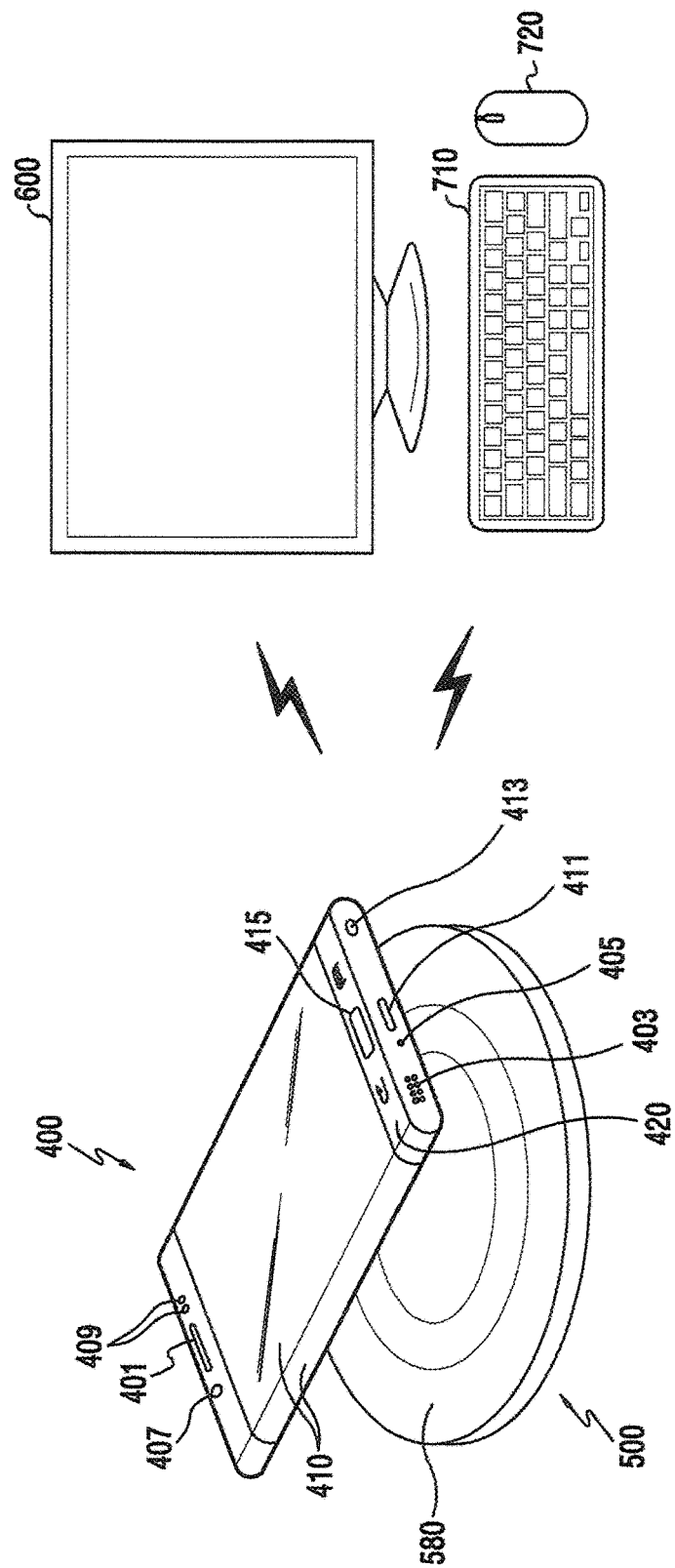
FIG. 4 illustrates a schematic diagram of a system environment according to various exemplary embodiments of the present disclosure.

FIG. 4 illustrates a schematic diagram of a system environment according to various exemplary embodiments of the present disclosure.

Referring to FIG. 4, a system according to various exemplary embodiments may include an electronic device 400, a docking station 500 and an external device 600. For example, FIG. 4 may illustrate an example in which the electronic device 400, the docking station 500, and at least one external device 600 connected to the docking station 600 are connected with one another.

In various exemplary embodiments, the electronic device 400 may include a display 410, a housing (or body) 420 in which the display 410 is safely mounted and combined, a supplementary device formed in the housing 420 and performing a function of the electronic device 400, and the like. In various exemplary embodiments, the supplementary device may include a 1st speaker 401, a 2nd speaker 403, a microphone 405, a sensor (e.g., a front camera 407, an illumination sensor 409, etc.), a communication interface (e.g., a charging or data input/output port 411, an audio input/output port 413, etc.), a button 415, etc.

In various exemplary embodiments, the display 410 may include a flat type display, or a bended display that can curve or bend or roll a thin flexible substrate without damages like a paper. The bended display may be combined to the housing 420 and maintain a bent form. In various exemplary embodiments, the electronic device 400 may be implemented as a display device that a user is free to bend and unbend like a flexible display, inclusive of the form of the bended display as well. In various exemplary embodiments, the display 410 may provide foldable flexibility, by substituting a plastic film for a glass substrate that wraps up a liquid crystal in a liquid crystal display (LCD), a light emitting diode (LED), an organic LED (OLED), an active matrix OLED (AMO-LED), etc.

In various exemplary embodiments, the electronic device 400 may be connected with the docking station 500. In various exemplary embodiments, the electronic device 400 may be connected with the docking station 500 based on a wireless communication (e.g., 1st wireless communication or 2nd wireless communication) technology. In various exemplary embodiments, the 1st wireless communication, ultra high speed close proximity communication, may include wireless communication that uses a frequency band of 60 GHz, for example. In various exemplary embodiments, the 2nd wireless communication, short-range wireless communication, may include communication such as Bluetooth, BLE, WiFi, WiGig, etc., for example.

In various exemplary embodiments, the electronic device 400 may be connected with the docking station 500 using at least one of 1st wireless communication or 2nd wireless communication. For example, the electronic device 400 may transmit data related to the external device 600 to the docking station 500 using the 1st wireless communication, or transmit the data related to the external device 600 to the docking station 500 using the 2nd wireless communication, or transmit the data related to the external device 600 to the docking station 500 using the 1st wireless communication and the 2nd wireless communication.

In various exemplary embodiments, if the electronic device 400 is connected with the docking station 500, the electronic device 400 may judge device information of the external devices 600 that are connected to the docking station 500. In various exemplary embodiments, the electronic device 400 may distinguish the external devices 600 on the basis of the device information of the external devices 600, and perform a process (or a work, an operation, etc.) corresponding to a user's request with the external devices 600 through the docking station 500. For example, the electronic device 400 may operate with the external device 600 in a PC mode, a video mode, an audio mode, etc., and may process a process of transmitting data according to each mode to the docking station 500 using the 1st wireless communication.

The docking station 500 may receive data from the electronic device 400 using the 1st wireless communication, and forward the received data to the external device 600 using another communication (e.g., cable communication (e.g., HDMI), wireless communication (e.g., WiFi), etc.) that is connected with the external device 600. The external device 600 may receive data from the docking station 500 using another communication, and process data output (e.g., video output, audio output, etc.) corresponding to the external device 600.

In various exemplary embodiments, the electronic device 400 may sense the occurrence of an event related to a 2nd process (e.g., a new process) in course of performing a 1st process (e.g., the existing process) in connection of 1st wireless communication with the docking station 500. In various exemplary embodiments, the electronic device 400 may maintain, stop or change the existing 1st process correspondingly to the 2nd process, and process the new 2nd process.

In accordance with various exemplary embodiments, when the electronic device 400 interworks with other devices (e.g., the docking station 500 and the external device 600) to perform a process, the electronic device 400 may process one or more processes on the basis of profiles corresponding to various contexts. According to one exemplary embodiment, when the electronic device 400 controls an operation of the docking station 500 related to the 1st process and/or 2nd process, the electronic device 400 may reallocate (distribute) resources required for processing the 1st process and/or 2nd process on the basis of the profile, to process the processes. In accordance with one exemplary embodiment, the electronic device 400 may reallocate the resources to the 1st process carried out on the basis of the 1st wireless communication with the docking station 500, in consideration of a connection state with the docking station 500, and keep processing an operation related to the 1st process on the basis of the 2nd wireless communication as well.

An operation in which the electronic device 400 processes a process in accordance with various exemplary embodiments will be described in detail with reference to the drawings described later. For example, examples in which the electronic device 400 controls an operation in accordance with a connection state of 1st wireless communication with the docking station 500 and a new process in various exemplary embodiments will be described through the drawings described later.

In various exemplary embodiments, the electronic device 400 may be charged (e.g., cable charging or wireless charging) by interworking with the docking station 500. For example, when the electronic device 400 is safely mounted in the docking station 500, the electronic device 400 may perform a charging operation on the basis of a voltage supplied from the docking station 500. According to one exemplary embodiment, the electronic device 400 may receive, through an electrical circuitry of the electronic device 400, applied power which has been transmitted through an electrical circuitry of the docking station 500 from the docking station 500, and charge an internal battery of the electronic device 400 based on the applied power.

According to various exemplary embodiments, the electronic device 400 may use communication to exchange information (e.g., power information) related to charging power (e.g., a charging voltage and a charging current) with the docking station 500. For example, the electronic device 400 and the docking station 500 may perform communication for information transmission/reception through respective electrical circuits thereof. Or, the electronic device 400 and the docking station 500 may perform communication for information transmission/reception through 1st wireless communication (e.g., ultra high speed (or 60 GHz) close proximity communication) or 2nd wireless communication (e.g., BLE, Zigbee, NFC, etc.).

According to various exemplary embodiments, the electronic device 400 may selectively receive at least one charging power among a plurality of charging power from the docking station 500. The electronic device 400 may process battery charging by the selected at least one charging power. For example, the electronic device 400 may receive 1st charging power (e.g., general charging power) from the docking station 400, and perform charging correspondingly to the received 1st charging power.

Through communication with the docking station 500, the electronic device 400 may send the docking station 500 a request for 2nd charging power (e.g., a high speed charging power) greater than 1st charging power that is used for general charging. Accordingly to this, the electronic device 400 may receive a supply of power corresponding to the 2nd charging power from the docking station 500. According to various exemplary embodiments, the electronic device 400 may perform high speed charging by using the 2nd charging power that is supplied from the docking station 500. According to one exemplary embodiment, if the requested 2nd charging power is not supplied, the electronic device 400 may perform the general charging by power (e.g., the 1st charging power) that is supplied from the docking station 500.

According to various exemplary embodiments, a battery of the electronic device 400 may be charged by directly receiving a supply of output power of a power supply device (e.g., a travel adapter (TA) or a power supply) that supplies a power source as well.

The electronic device 400 according to various exemplary embodiments may wirelessly receive a supply of power from the docking station 500. The electronic device 400 may include at least one coil that can wirelessly receive a supply of power from the docking station 500. The docking station 500 may include at least one coil that can wirelessly provide power to the electronic device 400. Or, the electronic device 400 may receive a ping signal, a trigger signal or data from the docking station 500. While wireless charging is performed, the electronic device 500 may perform data transmission/reception with the docking station 500.

The docking station 500 may wirelessly provide power to the electronic device 400. In course of wirelessly providing the power, the docking station 500 may transmit/receive data with the electronic device 400. The docking station 500 may be wiredly or wirelessly connected with at least one external device 600, 710 or 720. The docking station 500 may forward data that are transmitted/received between the electronic device 400 and the at least one external device 600, 710 or 720.

In accordance with various exemplary embodiments, the docking station 500 may transmit and/or receive data with the electronic device 400 within a predefined frequency range. In various exemplary embodiments, data may include non-compressed audiovisual data. In various exemplary embodiments, the predefined frequency range may include a range of 55 GHz to 66 GHz. Various exemplary embodiments have described that the predefined frequency range includes the range of 55 GHz to 66 GHz, but may include a range less or greater than the range of 55 GHz or 66 GHz, as well as the range of 55 GHz or 66 GHz.

In various exemplary embodiments, the docking station 500 may represent a device that is connected with the electronic device 400 by 1st wireless communication to receive data (e.g., a video, an audio, etc.) from the electronic device 400, and forwards the received data to the external device 600 through communication that is connected with the external device 600.

In various exemplary embodiments, the docking station 500 may include a housing (or body) 580. For example, the housing 580 may include a part in which the electronic device 400 is installed or safely mounted to be detachable, a speaker, a power interface, a control circuitry, a battery, a wireless communication circuitry (e.g., a communication circuitry for ultra high speed close proximity communication and a communication circuitry for short-range wireless communication), a memory, a processor or the like. According to one exemplary embodiment, the docking station 500 may be a charging device.

In various exemplary embodiments, the docking station 500 may be connected with the electronic device 400 using at least one of 1st wireless communication or 2nd wireless communication. For example, the docking station 500 may receive data related to the external device 600 from the electronic device 400 using the 1st wireless communication, or receive the data related to the external device 600 from the electronic device 400 using the 2nd wireless communication, or receive the data related to the external device 600 from the electronic device 400 using the 1st wireless communication and the 2nd wireless communication.

In various exemplary embodiments, the docking station 500 may include at least one battery, and may include a charging circuitry for charging the electronic device 400. In various exemplary embodiments, the docking station 500 may include a coil for wireless charging. According to various exemplary embodiments, if a direct current (DC) power source is supplied from a power supply device (not shown) (e.g., a travel adapter (TA) or a power supply), the docking station 500 may perform an operation of converting the DC power source into alternating current (AC) power and transmitting the power to the electronic device 400 through an electrical circuitry (e.g., a charging terminal) (or a transmission coil for wireless charging). In various exemplary embodiments, the power supply device may be included as a device united with the docking station 500, or be implemented as a separate device (e.g., an electric charger).

According to various exemplary embodiments, the docking station 500 may receive a request for 2nd charging power greater than 1st charging power from the electronic device 400 through communication with the electronic device 400. According to one exemplary embodiment, the docking station 500 may forward the request for the 2nd charging power to a power supply device through communication with the power supply device, and control the power supply device to supply the 2nd charging power. For example, the docking station 500 may send the power supply device a request for an output voltage higher than at general charging of the electronic device 400, and control the power supply device to supply the output voltage higher than at the general charging.

The external device 600 may include various devices that are connected with the docking station 500 in at least one wired or wireless communication scheme, and receive data that the electronic device 400 transmits from the docking station 500 and output the received data. For example, the external device 600 may be various devices in which data output is available, such as a display device (e.g., a monitor and/or a virtual reality (VR) device), an audio output device, etc. In accordance with various exemplary embodiments, the external device 600 may be wiredly or wirelessly connected with a peripheral device (e.g., a mouse, a keyboard, etc.)

In various exemplary embodiments, the docking station 500 and the external device 600 are illustrated as independent constructions, but are not limited to this. According to one exemplary embodiment, the docking station 500 and the external device 600 may be implemented as one device as well. For example, the external device 600 may be configured as a device including the docking station 500.

As mentioned above with reference to FIG. 4, the electronic device 400 and the docking station 500 may be mutually connected based on various wireless communication technologies. For example, the electronic device 400 and the docking station 500 may be mutually connected through at least one of 1st wireless communication or 2nd wireless communication. In various exemplary embodiments, the 1st wireless communication, which is high speed close proximity communication, may include 60 GHz close proximity communication. And, the 2nd wireless communication, which is short-range wireless communication other than the 1st wireless communication, may include various short range communications such as WiFi, WiGig, Bluetooth, BLE or the like, for example.

The recent demand for broadband and ultra high speed of information is increasing. To meet this demand, researches on a millimeter wave band (e.g., 30 GHz to 300 GHz) are actively being made. A band of 20 GHz to 40 GHz that is a boundary between the millimeter wave band and a microwave band is now being extended for a fixed type or mobile type on the basis of a developed technology of the past satellite communication, etc. Recent attention is being increasingly paid to a frequency band of 60 GHz (approximately 55 GHz to 65 GHz). Table 1 below shows the characteristics of ultra high speed close proximity communication (e.g., 60 GHz) and short range communication (e.g., WiFi and WiGig).

TABLE 1

| | | ultra high speed close proximity communication (60 GHz) | WiGig/WiFi |
|---|---|---|---|
| Quality | Latency | Within 20 mS | >70 mS (expected) |
| | Data rate | 3 Gbps (No screen breaks) | Max 3 Gbps (Variable depending on usage environment) Breaks according to environment changes |
| | Screen broken | | |
| Communication distance | | <10 cm | Within 10 m |
| Connect | | Connect without setting, Instant connection | Need setting |

As shown in Table 1, because a carrier frequency is high, an allowable frequency bandwidth is available even up to a few GHz, so ultra high speed close proximity communication (60 GHz band) may be suitable to ultra high speed (e.g., Giga bits per second (Gbps) class) data transmission or multimedia data transmission. The propagation characteristic of the 60 GHz band is that a co-channel interference probability is decreased because of a phenomenon of absorption by oxygen molecules in the air. Accordingly, the same frequency is reused, so economic system configuration may be available. Also, because a wavelength of the 60 GHz band is the unit of millimeter and is very small, an antenna and an RF transmitter may be miniaturized and get lightweight. Accordingly, to forward a transmission signal to a receive antenna, a high gain antenna may be used. Because a beam width of an electronic wave emitted from the antenna is inversely proportional to a diameter of the antenna, the antenna may be manufactured smaller as a wavelength becomes shorter. Also, device minimization is available, because even an element having a size proportional to a wavelength such as a waveguide provides a miniaturization effect. Also, a signal of the 60 GHz band basically uses low power (e.g., the unit of dozens milli Watt (mW)).

The electronic device 400 may use the 1st wireless communication mentioned earlier, to instantaneously transmit an ultra high definition (e.g., full high definition (FHD)) non-compressed video. According to one exemplary embodiment, the electronic device 400 may transmit a two-hour movie (e.g., about 650 mega byte (Mb)) stored in the electronic device 400, to another device (e.g., the docking station 500 or another electronic device) that is within a distance of 10 cm, for one second or so, and may provide high definition video streaming without transmission delay or picture quality degradation.

Figure 5:
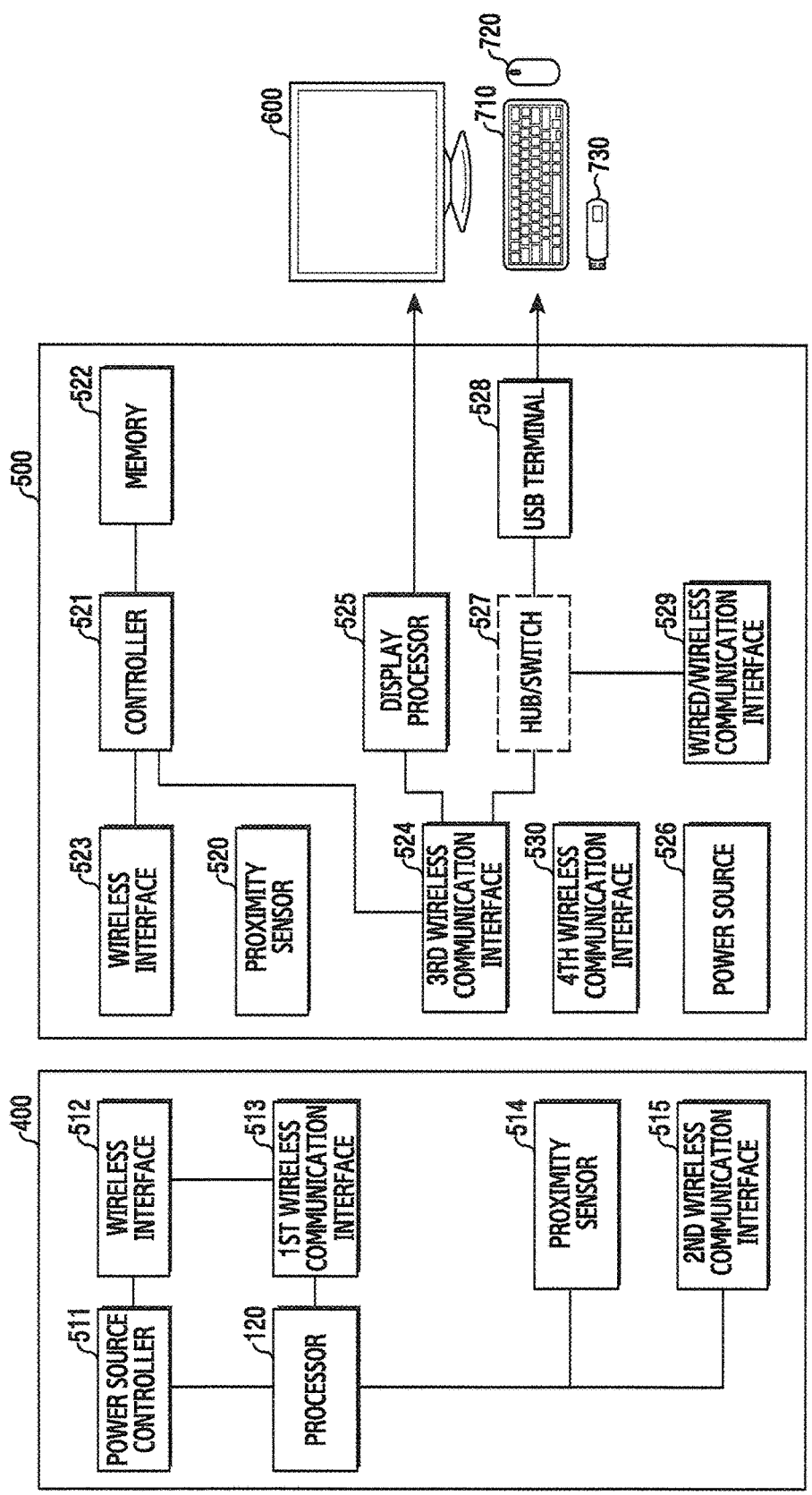
FIG. 5 illustrates a diagram of constructions of devices in a system according to various exemplary embodiments of the present disclosure.

FIG. 5 illustrates a diagram of constructions of devices in a system according to various exemplary embodiments of the present disclosure.

Referring to FIG. 5, the electronic device 400 according to various exemplary embodiments may, for example, include a power source controller 511 (e.g., a processor including a power processing circuitry), a wireless charger 512, a 1st wireless communication interface 513 (e.g., a proximity communication interface), a proximity sensor 514, a 2nd wireless communication interface 515, and a processor 120 (e.g., a processor including a processing circuitry).

Close proximity wireless communication (e.g., 60 GHz, WiGig, WiFi, etc.) is available between the electronic device 400 and the docking station 500, and wireless charging may be accomplished. Cable or wireless connection may be made among the docking station 500 and external devices 600, 710, 720, and 730. The docking station 500 may be exclusively connected with a mouse 710, a keyboard 720, a USB 730, and a monitor 600 (or a TV, etc.). In various exemplary embodiments, because the constructions illustrated in FIG. 5 are not essential, the electronic device 400 may be implemented to have constructions more than the constructions illustrated in FIG. 5 or have constructions less than them. For example, the electronic device 400 may have the same or similar construction with the electronic device of FIG. 1 or FIG. 2.

According to various exemplary embodiments, the power source controller 511 may supply a power source to one or a plurality of batteries (not shown) that are arranged in the housing 420 of the electronic device 400, in accordance with the control of the processor 120. The one or plurality of batteries (not shown) may be included in the power source controller 511 and may supply a power source to the electronic device 400. According to one exemplary embodiment, the power source controller 511 may supply a power source, which is inputted from an external power source (not shown), to the electronic device 400 through a cable. According to one exemplary embodiment, the power source controller 511 may supply a power source, which is wirelessly inputted from the docking station 500, to the electronic device 400 through wireless charging as well. The power source controller 511 may wirelessly receive a supply of power from the docking station 500 through a wireless power transmission/reception conductive pattern (or coil) of the wireless charger 512.

According to various exemplary embodiments, the wireless charger 512 may wirelessly receive a supply of power through an interface for receiving power from the docking station 500, inductive coupling (or coupling), a laser, light or the like.

When the wireless charger 512 receives power, the wireless charger 512 may perform data communication using an available communication resource. For example, in the case of using a reserved region of inband data communication, the wireless charger 512 may transmit/receive the existence or non-existence of proximity communication (e.g., ultra high speed close proximity communication) and initial information, and this may be used for recognizing a supported function of the docking station 500.

Or, in case where the electronic device 400 is connected with the docking station 500 that is available for video play, the electronic device 400 may automatically transmit video related information to the docking station 500. If the docking station 500 is available for music play, the electronic device 400 may automatically transmit music related information to the docking station 500.

The wireless charger 512 may include a charging circuitry wirelessly receiving a supply of power from the docking station 500. The wireless charger 512 may receive, from the docking station 500, at least a part of information about the docking station 500 or information about the external devices 600, 710, 720 and 730 connected to the docking station 500. The wireless charger 512 may receive a ping signal from the docking station 500 correspondingly to the sensing of the docking station 500.

The wireless charger 512 may, for example, include a battery, a battery level measuring circuitry (e.g., a fuel gauge), a power management integrated circuit (PMIC), a boosting circuitry, a charger integrated circuit (IC), etc. According to various exemplary embodiments, the wireless charger 512 may include a charger IC for a wireless charging scheme. In various exemplary embodiments, the wireless charging scheme may be, for example, an electromagnetic resonance scheme, a magnetic induction scheme, an electromagnetic wave scheme, or the like. A supplementary circuitry for wireless charging, for example, a coil, a coil loop, a resonance circuitry, a circuitry such as a rectifier, etc. may be added. In accordance with various exemplary embodiments, the electronic device 400 may include a battery. The battery of the electronic device 400 may be wirelessly charged through the docking station 500. According to various exemplary embodiments, the battery of the electronic device 400 may be charged by directly receiving a supply of output power of a power supply device (e.g., a travel adapter (TA) or a power supply) supplying a power source as well.

According to various exemplary embodiments, the 1st wireless communication interface 513 may perform data communication through an external input/output and/or storage device, a USB hub, a network connection unit, a display coupling unit or a micro controller including a converter chip. And, the 1st wireless communication interface 513 may configure a communication hub through a peripheral component interconnect express (PCIe) scheme and a USB scheme.

The 1st wireless communication interface 513 may transmit and/or receive data with the docking station 500 through a wireless communication circuitry that supports wireless communication having a frequency range that is predefined with the docking station 500. In various exemplary embodiments, the predefined frequency range may include a range of 55 GHz to 66 GHz. In accordance with various exemplary embodiments, the predefined frequency range may include a range less than or greater than the range of 55 GHz to 66 GHz, as well as the range of 55 GHz to 66 GHz.

The 1st wireless communication interface 513 may receive, from the docking station 500, at least a part of information about the docking station 500 or information about at least one external device 600, 710, 720 or 730 connected to the docking station 500. If the electronic device 400 is available to perform proximity communication with the docking station 500 through the 1st wireless communication interface 513, the electronic device 400 may establish a connection of the proximity communication with the docking station 500 through the 1st wireless communication interface 513, and receive detailed information of the docking station 500 from the docking station 500.

According to one exemplary embodiment, the 1st wireless communication interface 513 may include a module of making available 1st wireless communication (e.g., ultra high speed close proximity communication of a 60 GHz band) between the electronic device 400 and the docking station 500. For example, as referring to the aforementioned Table 1, the 1st wireless communication interface 513 may perform wireless transmission at a USB 3.0 data rate (e.g., 3 Gbps) using 4-channel of the 60 GHz band that is an industrial scientific medical (ISM) band. The 1st wireless communication interface 513 may, for example, have a bandwidth of 2.16 GHz and an effective distance of 0 cm to 10 cm, and the electronic device 400 may be configured to instantly recognize and drive the docking station 500 by getting close to the docking station 500.

The 1st wireless communication interface 513 may transmit and/or receive a wireless signal with the docking station 500. The wireless signal can include a voice signal, a data signal, or control signals of various forms. In response to a user request, the 1st wireless communication interface 513 may transmit various data required for an operation of the electronic device 400, to the docking station 500. The 1st wireless communication interface 513 may be advantageous in aspect of power consumption. And, the electronic device 400 and the docking station 500 may get in contact with each other within the effective distance, to provide the 1st wireless communication.

According to various exemplary embodiments, the proximity sensor 514 may include at least one sensor. The proximity sensor 514 may perform at least one operation or function that is carried out in the sensor 240 of FIG. 2. The proximity sensor 514 may further include a control circuitry for controlling at least one or more sensors belonging therein. In some exemplary embodiment, the electronic device 400 may further include a processor configured to control the sensor 240, as a part of the processor 120 or separately, thereby controlling the sensor 240 while the processor 120 is in a sleep state.

The proximity sensor 514 may receive a trigger signal from the docking station 500. The electronic device 400 may detect the docking station 500 using at least one of Bluetooth low energy (BLE), a pressure sensor, a proximity sensor, a magnet, near field communication (NFC) or WiGig. Also, the electronic device 400 may detect the docking station 500 in various methods other than the aforementioned, and may receive a trigger signal corresponding to this detecting of the docking station 500 from the docking station 500.

According to various exemplary embodiments, the 2nd wireless communication interface 515 may, for example, have the same or similar construction to the WiFi interface 223 of FIG. 2. The 2nd wireless communication interface 515 may, for example, include a module for performing millimeter Wave (mmWave) communication (e.g., WiGig communication) as well. The 2nd wireless communication interface 515 may, for example, include a module for performing short range communication as well. In various exemplary embodiments, the short range communication technology may, for example, use Bluetooth, BLE, radio frequency identification (RFID), infrared data association (IrDA), ultra wideband (UWB), ZigBee, NFC, etc.

The 2nd wireless communication interface 515 may transmit and/or receive a wireless signal on the basis of 2nd wireless communication between the electronic device 400 and the docking station 500, or between the electronic device 400 and the external device 600.

In accordance with various exemplary embodiments, the 2nd wireless communication interface 515 may represent a block that supports other various communication schemes supportable in the electronic device 400, aside from the 1st wireless communication (e.g., ultra high speed close proximity communication). In various exemplary embodiments, the electronic device 400 and the docking station 500 may further configure and connect additional communication in a basic state of connecting the 1st wireless communication, thereby extending the usability of the electronic device 400. For example, the 2nd wireless communication interface 515 may provide sub assistance in a 2nd wireless communication scheme, in that the electronic device 400 performs connection with the docking station 500 or the external device 600. According to one exemplary embodiment, a case where a contact between the electronic device 400 and the docking station 500 is released and thus the 1st wireless communication is released (e.g., a case where the electronic device 400 and the docking station 500 keep off for a while) may occur. In this case, in various exemplary embodiments, instead of the connection of the 1st wireless communication, the 2nd wireless communication of the 2nd wireless communication interface 515 may be used to maintain connection between the electronic device 400 and the docking station 500 or support another additional connection.

According to various exemplary embodiments, the processor 120 may perform at least one operation or function that is carried out in the processor 120 of FIG. 1. The processor 120 may execute or control an operation or data processing about the control and communication of at least one another constituent element of the electronic device 400 and/or a wireless power transmission/reception mode.

For example, the processor 120 may, for example, drive an operating system or an application program, to control a majority of hardware or software constituent elements that are coupled to the processor 120, and perform various data processing and operations. The processor 120 may control the proximity sensor 514, the wireless charger 512 and the 1st wireless communication interface 513. The proximity sensor 514 includes at least one sensor. The wireless charger 512 includes a charging circuitry that wirelessly receives power from the docking station 500. The 1st wireless communication interface 513 transmits data to the docking station 500 through a wireless communication circuitry that supports wireless communication having a frequency range that is predefined with the docking station 500. Through information received from the docking station 500, the processor 120 may change setting to correspond to the docking station 500.

The processor 120 may control at least one of the wireless charger 512 and the 1st wireless communication interface 513, to receive, from the docking station 500, at least a part of information about the docking station 500 or information about at least one external device 600, 710, 720 or 730 that is connected to the docking station 500.

If a ping signal is received from the docking station 500 through the wireless charger 512 correspondingly to the sensing of the docking station 500, the processor 120 may judge the availability or non-availability of proximity communication (e.g., ultra high speed close proximity communication) of the docking station 500 and the availability or non-availability of wireless charging from the received ping signal. For example, if the processor 120 is available for proximity communication with the docking station 500, the processor 120 may establish a connection of the proximity communication with the docking station 500. And, the processor 120 may receive detailed information of the docking station 500 from the docking station 500 through the proximity communication connection. And, the processor 120 may execute the change of setting and an application required for the docking station 500 based on at least a part of at least one of the ping signal or the detailed information.

If a trigger signal is received from the docking station 500 through the proximity sensor 514, the processor 120 may establish a connection of proximity communication (e.g., ultra high speed close proximity communication) with the docking station 500. And, the processor 120 may receive information about the docking station 500 received from the docking station 500 through the proximity communication connection. And, based on at least a part of the received information about the docking station 500, the processor 120 may execute the change of setting change and an application that are required for the docking station 500.

If the ping signal is not received from the docking station 500 for a predetermined time in a state where a connection with the docking station 500 is kept, the processor 120 may change a data path with the docking station 500 and a user interface, and inactivate the 1st wireless communication interface 513.

If the external device connected to the docking station 500 is a video output device (e.g., 600), the processor 120 may configure a screen displayed on the display (e.g., 160 or 410) as a screen outputted from the video output device, and transmit the screen to the docking station 500. And, the processor 120 may check whether the docking station 500 is a device having which character (or specification or property). And, the processor 120 may judge whether the docking station 500 performs which operation, etc., and perform the judged operation.

The processor 120 may control a general operation of the electronic device 400. In various exemplary embodiments, the processor 120 may, for example, have the same or similar construction to the processor 120 of FIG. 1 or the processor 210 of FIG. 2. In various exemplary embodiments, the processor 120 may process an operation related with data communication between the electronic device 400 and the docking station 500 or between the electronic device 400 and the external device 600, 710, 720 or 730.

In accordance with various exemplary embodiments, when the processor 120 performs an operation according to interworking between the electronic device 400 and another device (e.g., the docking station 500 or the external device 600), the processor 120 may allocate (distribute) a resource to a process on the basis of a corresponding profile, to process the process.

According to one exemplary embodiment, the processor 120 may control a connection among the electronic device 400, the docking station 500 and the external device 600, 710, 720 or 730. And, the processor 120 may control an operation related to adaptively changing and performing data communication by the electronic device 400 on the basis of a connection state with the docking station 500.

According to one exemplary embodiment, the processor 120 may distinguish external devices (e.g., 600) to which the electronic device 400 is connected through the docking station 500. At occurrence of a new process in course of the progress of the existing process, the processor 120 may automatically change data communication for the external device (e.g., 600) in accordance with a connection state of the 1st wireless communication (e.g., ultra high speed close proximity communication) with the docking station 500, to control an operation related to processing a multiple process. For example, if the electronic device 400 is connected to the docking station 500 and thereafter a new process occurs by the electronic device 400, the processor 120 may control an operation related to seamlessly processing the existing process and the new process.

The control operation of the processor 120 according to various exemplary embodiments of the present disclosure is described in detail with reference to the drawings described later. According to various exemplary embodiments of the present disclosure, the processor 120 may be implemented as one or more processors that execute one or more programs stored in a memory (e.g., the memory 130 of FIG. 1 or the memory 230 of FIG. 2), to control an operation of the electronic device 400 according to various exemplary embodiments of the present disclosure.

The docking station 500 according to various exemplary embodiments may include a proximity sensor 520, a wireless charger 523, a memory 522, a display processor 525, a 3rd wireless communication interface 524 (e.g., a proximity communication interface), a 4th wireless communication interface 530, a hub/switch unit 527, a USB terminal 528, a power source unit 526, a wired/wireless communication interface 529, and a controller 521 (e.g., a processor including a processing circuitry), for example. The docking station 500 may be connected with at least one of various external devices (e.g., the monitor (or TV, etc.) 600, the keyboard 710, the mouse 720 and the USB 730. The docking station 500 may be exclusively connected with the external device 600, 710, 720 or 730.

If the docking station 500 is connected with at least one of the external devices 600, 710, 720 or 730, the docking station 500 may transmit information notifying that the docking station 500 has been connected, to the electronic device 400. In various exemplary embodiments, the information may include information about the connected at least one external device 600, 710, 720 or 730 and/or setting information of the interface (e.g., USB) connected with the at least one external device 600, 710, 720 or 730.

In accordance with one exemplary embodiment, the external device (e.g., the monitor or TV 600) may be connected to the display processor 525 of the docking station 500, and the external devices (e.g., the keyboard 710, the mouse 720 and the USB 730) may be connected to the USB terminal 528 of the docking station 500. In various exemplary embodiments, because the constructions illustrated in FIG. 5 are not essential, the docking station 500 may be implemented to have constructions more than the constructions illustrated in FIG. 5 or have constructions less than them. For example, the docking station 500 may have a similar construction corresponding to the electronic device of FIG. 1 or FIG. 2.

According to various exemplary embodiments, the proximity sensor 520 may include at least one sensor. The proximity sensor 520 may further include a control circuitry for controlling at least one or more sensors belonging therein. The proximity sensor 520 may transmit a trigger signal to the electronic device 400. The docking station 500 may detect the electronic device 400 using at least one of BLE, a pressure sensor, a proximity sensor, a magnet, NFC or WiGig. The docking station 500 may detect the electronic device 400 in various methods other than the aforementioned, and may transmit a trigger signal corresponding to this detecting of the electronic device 400, to the electronic device 400.

According to various exemplary embodiments, the wireless charger 523 may wirelessly supply power through an interface for wirelessly providing power to the electronic device 400, inductive coupling, a laser, light or the like. And, when the wireless charger 523 supplies power, the wireless charger 523 may perform data communication using an available communication resource. For example, in the case of using a reserved region of inband data communication, the wireless charger 523 may transmit/receive the existence or non-existence of proximity communication (e.g., ultra high speed close proximity communication) and initial information, and this may be used for recognizing a supported function of the docking station 400. Or, the wireless charger 523 may transmit video related data received from the external device (e.g., TV 600) that is available for video play, to the electronic device 400, and may transmit music related information received from the external device that is available for music play, to the electronic device 400.

The wireless charger 523 may include a charging circuitry for providing power to the electronic device 400. The wireless charger 523 may transmit at least a part of information about the docking station 500 or information about the at least one external device 600, 710, 720 or 730 that is connected to the docking station 500, to the electronic device 400. The wireless charger 523 may transmit a ping signal to the electronic device 400 correspondingly to the sensing of the electronic device 400.

The wireless charger 523 may include a coil for wireless charging. If a direct current (DC) power source is supplied from a power supply device (not shown) (e.g., a travel adapter (TA) or a power supply), the wireless charger 523 may perform an operation of converting the DC power source into alternating current (AC) power and transmitting the power to the electronic device 400 through an electrical circuitry (e.g., a charging terminal) (or a transmission coil for wireless charging).

In accordance with various exemplary embodiments, the wireless charger 523 may support a function of transmitting/receiving the existence or non-existence of 1st wireless communication (e.g., ultra high speed close proximity communication) and initial information between the electronic device 400 and the docking station 500. Through this, in various exemplary embodiments, the wireless charger 523 may exchange information required for recognizing a supported function of the electronic device 400 or the external device 600 or connecting the electronic device 400 or the external device 600, 710, 720 or 730, between the electronic device 400 and the docking station 500 as well.

According to various exemplary embodiments, the memory 522 may store an identifier of the external device 600, 710, 720 or 730. Or, the memory 522 may store information that groups at least one external device 600, 710, 720 or 730. Or, the memory 522 may store data that is transmitted and/or received between the electronic device 400 and the at least one external device 600, 710, 720 or 730.

According to various exemplary embodiments, the 3rd wireless communication interface 524 may transmit and/or receive data with the electronic device 400 through a wireless communication circuitry. The wireless communication circuitry supports wireless communication having a predefined frequency range. In various exemplary embodiments, the predefined frequency range may include a range of 55 GHz to 66 GHz. Or, the predefined frequency range includes a range less than or greater than the range of 55 GHz to 66 GHz, as well as the range of 55 GHz to 66 GHz.

The 3rd wireless communication interface 524 may transmit, to the electronic device 400, at least a part of information about the docking station 500 or information about the at least one external device 600, 710, 720 or 730 that is connected to the docking station 500. If the docking station 500 is available to perform proximity communication with the electronic device 400 through the 3rd wireless communication interface 524, the docking station 500 may establish a connection of the proximity communication with the electronic device 400 through the 3rd wireless communication interface 524, and transmit detailed information of the docking station 500 to the electronic device 400. The 3rd wireless communication interface 524 may perform data communication with the electronic device 400 through an external input/output and/or storage device, a USB hub, a network connection unit, a display coupling unit or a micro controller including a converter chip. And, the 3rd wireless communication interface 524 may be easily connected with the electronic device 400.

In various exemplary embodiments, the 3rd wireless communication interface 524 may include a module of making available 1st wireless communication (e.g., ultra high speed close proximity communication of a 60 GHz band) between the electronic device 400 and the docking station 500. For example, the 3rd wireless communication interface 524 may receive data that are transmitted through the 1st wireless communication, from the electronic device 400. The 3rd wireless communication interface 524 may forward, to the external device 600, data that is received through the 1st wireless communication, using a USB scheme or a PCIe based scheme. In various exemplary embodiments, the 3rd wireless communication interface 524 may correspond to the aforementioned construction of the 1st wireless communication interface 513 of the electronic device 400 and therefore, its detailed description is omitted.

The 4th wireless communication interface 530 may, for example, include a module that supports another 2nd wireless communication that the docking station 500 is available to support, apart from the 1st wireless communication. In various exemplary embodiments, the 4th wireless communication interface 530 may directly communicate with the electronic device 400, or support a connection with the external device 600, 710, 720 or 730. The 4th wireless communication interface 530 may not be included in the docking station 500 as well. The 4th wireless communication interface 530 may correspond to the aforementioned construction of the 2nd wireless communication interface 515 of the electronic device 400 and thus, its detailed description is omitted.

According to various exemplary embodiments, the display processor 525 may transmit video related data received from the electronic device 400, to the external device 600 such as the monitor, the TV, etc. The display processor 525 may transmit the video related data to a video play device through a USB or HDMI terminal.

According to various exemplary embodiments, the hub/switch unit 527 may switch the USB terminal 528 and the wired/wireless communication interface 529, to control data transmission/reception. For example, if the external device playing transmitted/received data is connected with the docking station 500 by the USB terminal 528, the hub/switch unit 527 may switch the transmitted/received data to the USB terminal 528. Or, if the external device playing the transmitted/received data is connected with the docking station 500 through the wired/wireless communication interface 529, the hub/switch unit 527 may switch the transmitted/received data to the wired/wireless communication interface 529.

According to various exemplary embodiments, the USB terminal 528 may include a terminal that may connect at least one USB. The USB terminal 528 may be connected with at least one of the external devices (e.g., the keyboard 710, the mouse 720 or the USB 730). Or, the USB terminal 528 may be connected with the external device 600 (e.g., the monitor and the TV).

According to various exemplary embodiments, the wired/wireless communication interface 529 may be connected with at least one external device through a LAN or WiFi, to perform communication. Or, the wired/wireless communication interface 529 may include another communication interface that may perform communication with the external device 600, 710, 720 or 730, other than the LAN or WiFi. For example, the wired/wireless communication interface 529 may include an HDMI, a USB, an optical interface, a D-sub or the like.

According to various exemplary embodiments, the power source unit 526 may receive an applied AC power source (e.g., 220V) from the external, and convert the received AC power source into a DC power source. The power source unit 526 may generally receive a supply of power from the external, by inserting a terminal (e.g., an adapter) of the docking station 500 into a wall outlet that is installed in a wall. And, the power source unit 526 may convert an AC power source of 220 voltage (V) supplied from the external, into a DC power source of 5V or 9V. The power source unit 526 may include a variable DC/DC element that may boost the converted DC power source 5V or 9V into 10V to 20V.

According to various exemplary embodiments, the controller 521 may control a general operation of the docking station 500 in order to wirelessly provide power to the electronic device 400 through an electrical conductive coil that is configured in a surface of the docking station 500. The controller 521 may transmit at least a part of information about the docking station 500 or information about at least one external device 600, 710, 720 or 730 connected to the docking station 500, to the electronic device 400 through at least one of the wireless charger 523 or the 1st wireless communication interface 524.

In response to a response signal of the electronic device 400 responsive to a ping signal transmitted to the electronic device 400, the controller 521 may judge the availability or non-availability of proximity communication (e.g., ultra high speed close proximity communication) of the electronic device 400 and the availability or non-availability of wireless charging. For example, if the electronic device 101 is available for proximity communication, the controller 521 may transmit detailed information of the docking station 500 to the electronic device 400 through the wireless charger 523. In various exemplary embodiments, the detailed information may include at least one of information related to an identifier of the docking station 500, a state thereof, a specification thereof, an authentication thereof, a security thereof or the like.

If the electronic device 400 nor requiring charging is sensed, the controller 521 may transmit information about the docking station 500 to the electronic device 400 through the 1st wireless communication interface 524. If information including an identifier of at least one external device is received corresponding to connection with the at least one external device, the controller 521 may classify the at least one external device through the received identifier, and transmit the classification result to the electronic device 400. The controller 521 may classify the connected at least one external device in accordance with the priority or type of the at least one external device.

If a response signal responsive to a ping signal transmitted by the docking station 500 is not received from the electronic device 400 for a predetermined time in a state where a connection of the docking station 500 with the electronic device 400 is kept, the controller 521 may inactivate proximity communication (e.g., ultra high speed close proximity communication) with the electronic device 400. The controller 521 may discern the electronic device 400. And, the controller 521 may transmit information of the docking station 500 to the electronic device 400 such that the docking station 500 may be recognized. And, the controller 521 may convert the docking station 500 into a communication available state. And, the controller 521 may perform an operation associated with wireless charging or proximity communication, on the basis of the information of the docking station 500.

The controller 521 can control a general operation of the docking station 500. In various exemplary embodiments, the controller 521 may, for example, have the same or similar construction to the processor 210 of FIG. 2. In various exemplary embodiments, the controller 521 may process an operation related to data communication between the docking station 500 and the electronic device 400 or between the docking station 500 and the external device 600, 710, 720 or 730. In accordance with various exemplary embodiments, the controller 521 may control a connection among the electronic device 400, the docking station 500 and the external device 600, 710, 720 or 730, and control an operation related to adaptively changing and performing data communication on the basis of a connection state of the docking station 500 with the electronic device 400.

The control operation of the controller 521 according to various exemplary embodiments of the present disclosure is described in detail with reference to the drawings described later. According to various exemplary embodiments of the present disclosure, the controller 521 may be implemented as one or more processors that execute one or more programs stored in the memory 522 to control an operation of the electronic device 500 according to various exemplary embodiments of the present disclosure.

In various exemplary embodiments, the external device 600, 710, 720 or 730 may include various constructions (e.g., a wired communication circuitry, a wireless communication circuitry, a processor, a display, an input device, an output device, etc.) corresponding to the type of the external device 600, 710, 720 or 730.

The external device 600, 710, 720 or 730 may communicate with another device (e.g., the electronic device 400 or the docking station 500) based on a wired or wireless connection. According to one exemplary embodiment, the external device 600, 710, 720 or 730 may be connected with another device (e.g., the docking station 500 or the electronic device 400) in a wireless scheme (e.g., RF, near-field magnetic induction (NFMI), BT, audible over Bluetoothlow energy (AoBLE), etc.). According to one exemplary embodiment, the external device 600, 710, 720 or 730 may be connected with another device (e.g., the docking station 500) in a wired scheme (e.g., an HDMI).

The external device 600, 710, 720 or 730 may receive provided data from wiredly or wirelessly connected another device, and output related information (e.g., video data, audio data, etc.). In accordance with one exemplary embodiment, the external device 600, 710, 720 or 730 may receive data, which is forwarded through 1st wireless communication between the electronic device 400 and the docking station 500, from the docking station 500 through wired communication. The external device 600, 710, 720 or 730 may output the received data correspondingly to the type (e.g., a display device, an audio output device, etc.) of the external device 600, 710, 720 or 730.

In accordance with one exemplary embodiment, if the external device 600, 710, 720 or 730 is a display device, the external device 600 may be connected with the docking station 500 by an HDMI or USB. And, if the external device 600 is an audio output device, the external device 600 may be connected with the docking station 500 by an auxiliary port (AUX), an optical output terminal, etc.

In accordance with one exemplary embodiment, the external device 600 710, 720 or 730 may additionally support a wireless connection with the electronic device 400 or the docking station 500 as well. For example, the external device 600, 710, 720 or 730 may further include a 5th wireless communication interface (not shown) for supporting 2nd wireless communication, like the 2nd wireless communication interface 515 of the electronic device 400 or the 4th wireless communication interface 530 of the docking station 500. The external device 600, 710, 720 or 730 may directly connect with the electronic device 400 through the 5th wireless communication interface, or may connect with the docking station 500.

As mentioned above with reference to FIG. 4 and FIG. 5, the electronic device 400 and the docking station 500 may use at least one of the 1st wireless communication or the 2nd wireless communication, to perform data communication with each other and provide wireless charging. The docking station 500 and the external device 600, 710, 720 or 730 may use the wired communication (e.g., HDMI, USB, etc.) or the wireless communication (e.g., WiFi, WiGig, BT, etc.), to perform data communication with each other.

In accordance with various exemplary embodiments, if the electronic device 400 and the docking station 500 are connected with each other, the electronic device 400 and the docking station 500 may check information such as the existence or non-existence of proximity communication, the type of the communication, a function that the docking station 500 supports, a basic mode of the docking station 500, etc. through inband communication of wireless charging, and may activate a proximity communication circuitry unit, and may use the information of the docking station 500 and the electronic device 400, to transmit/receive a signal suitable to this.

In accordance with various exemplary embodiments, if the electronic device 400 and the docking station 500 are connected with each other, the electronic device 400 may transmit the existence or non-existence of the electronic device 400 and related information, to the docking station 500 by wireless charging power. And, if the information transmission is completed, the electronic device 400 may begin charging. At this time, inband communication may proceed to transmit and/or receive the related information, and may be additionally used for communication using the inband communication's idle frame (e.g., a reserved region). According to various exemplary embodiments, this proximity communication (e.g., ultra high speed close proximity communication) between the electronic device 400 and the docking station 500 may make available fast transmission of large capacity data. Also, the electronic device 400 may provide a streaming service to the docking station 500 or the external device (e.g., the video play device) that is connected to the docking station 500.

As described above, the docking station 500 according to various exemplary embodiments includes housing, an electrical conductive coil, a wireless charger, an electrical connection part, a communication interface, and a processor (e.g., the controller 521). The housing includes a 1st surface facing a 1st direction and a 2nd surface facing a 2nd direction different from the 1st direction wherein at least a part of the 1st surface is configured to get in contact (or non-contact) with a surface of a 1st electronic device (e.g., the electronic device 400). The electrical conductive coil is located within the housing to be closer to the 1st surface than the 2nd surface. The wireless charger includes a charging circuitry that receives power from an external power source and wirelessly provides power to the 1st electronic device through the 1st surface via the coil. The electrical connection part is exposed to the housing. The communication interface includes a wireless communication circuitry and a wired communication circuitry. The wireless communication circuitry supports wireless communication with the 1st electronic device wherein the wireless communication has a predefined frequency range. The wired communication circuitry receives data from the 1st electronic device using the wireless communication circuitry, and transmits data to at least one 2nd electronic device (e.g., external device 600) through the connection part. The processor (e.g., the controller 521) generally controls an operation of the docking station so as to provide wireless charging to the 1st electronic device.

According to one exemplary embodiment, the docking station may not include a display unit for displaying an image. According to one exemplary embodiment, the connection part may include an HDMI terminal and/or a USB terminal. According to one exemplary embodiment, the data received from the 1st electronic device may include non-compressed audiovisual data. According to one exemplary embodiment, the predefined frequency range may include a range of 55 GHz to 66 GHz.

According to one exemplary embodiment, the processor may transmit at least a part of information about the docking station or information about the 2nd electronic device that is connected to the docking station, to the 1st electronic device through at least one of the wireless charger or the communication interface. According to one exemplary embodiment, if the 1st electronic device requiring charging is sensed, the wireless charger may transmit a ping signal including the information about the docking station to the 1st electronic device. According to one exemplary embodiment, the information about the docking station may include at least one of the existence or non-existence of proximity communication, the type of a communication scheme, the existence or non-existence of a memory, or the type of data that the charging device supports. According to one exemplary embodiment, the processor may judge the availability or non-availability of proximity communication of the 1st electronic device and the availability or non-availability of wireless charging correspondingly to a received response signal responsive to the transmitted ping signal. According to one exemplary embodiment, if the 1st electronic device is available for proximity communication, the processor may transmit detailed information of the docking station to the 1st electronic device through the wireless charger. According to one exemplary embodiment, the detailed information may include at least one of an identifier of the docking station, a state thereof, a specification thereof, an authentication thereof or a security thereof. According to one exemplary embodiment, if the 1st electronic device not requiring charging is sensed, the processor may transmit the information about the docking station to the 1st electronic device through the communication interface.

According to one exemplary embodiment, if information including an identifier of at least one 2nd electronic device is received correspondingly to a connection of the docking station with the at least one 2nd electronic device, the processor may classify the at least one 2nd electronic device through the received identifier, and transmit the classified result to the 1st electronic device. According to one exemplary embodiment, the processor may classify the connected at least one 2nd electronic device in accordance with the priority or type of the at least one 2nd electronic device. According to one exemplary embodiment, if a response signal responsive to the transmitted ping signal is not received from the 1st electronic device for a predetermined time in a state where a connection of the docking station with the 1st electronic device is kept, the processor may inactivate proximity communication with the 1st electronic device.

As described above, the electronic device 400 according to various exemplary embodiments may include a display, a sensor unit, a wireless charger, a communication interface, and a processor. The sensor unit includes at least one sensor. The wireless charger includes a charging circuitry wirelessly receiving power from the docking station. The communication interface transmits data to the docking station through a wireless communication circuitry. The wireless communication circuitry supports wireless communication having a frequency range that is predefined with the docking station. The processor changes setting to correspond to the docking station through information received from the docking station.

According to one exemplary embodiment, the data may include non-compressed audiovisual data. According to one exemplary embodiment, the predefined frequency range may include a range of 55 GHz to 66 GHz. According to one exemplary embodiment, at least one of the wireless charger and the communication interface may receive, from the docking station, at least a part of information about the docking station or information about the 2nd electronic device (e.g., the external device 600) that is connected to the docking station.

According to one exemplary embodiment, if a ping signal is received from the docking station through the wireless charger correspondingly to the sensing of the docking station, the processor may judge the availability or non-availability of proximity communication of the docking station and the availability or non-availability of wireless charging from the received ping signal.

According to one exemplary embodiment, if the processor is available for proximity communication with the docking station, the processor may establish a connection of proximity communication (e.g., ultra high speed close proximity communication) with the docking station. And, the processor may receive detailed information of the docking station from the docking station through the proximity communication connection. And, the processor may execute the change of setting and an application that are required for the docking station based on at least a part of at least one of the ping signal or the detailed information.

According to one exemplary embodiment, if a trigger signal is received from the docking station through the sensor unit, the processor may establish a connection of proximity communication with the docking station. And, the processor may receive information about the docking station that is received from the docking station through the proximity communication connection. And, the processor may execute the change of setting and an application that are required for the docking station based on at least a part of the received information about the docking station.

According to one exemplary embodiment, if a ping signal is not received for a predetermined time from the docking station in a state where a connection of the electronic device 400 with the docking station is kept, the processor may change a data path with the docking station and a user interface, and inactivate the proximity communication with the docking station.

According to one exemplary embodiment, if the 2nd electronic device is a video output device, the processor may configure a screen displayed on a display as a screen outputted from the video output device, and transmit the screen to the docking station.

As described above, an electronic device 400 according to various exemplary embodiments may include a 1st wireless communication interface configured to perform 1st wireless communication with another electronic device, a 2nd wireless communication interface configured to perform 2nd wireless communication with another electronic device, and a processor operatively coupled with the 1st wireless communication interface and the 2nd wireless communication interface. The processor may be configured to connect with another electronic device by the 1st wireless communication, using the 1st wireless communication interface, execute a 1st process with another electronic device on the basis of the 1st wireless communication, sense a 2nd process during the execution of the 1st process, allocate a resource for processing the 1st process and the 2nd process, in accordance with a corresponding profile, and process at least one process among the 1st process or the 2nd process on the basis of the allocated resource.

In accordance with various exemplary embodiments, the 1st wireless communication may be configured to include high speed close proximity communication, and the 2nd wireless communication may be configured to include one or more wireless communication other than the 1st wireless communication.

In accordance with various exemplary embodiments, the processor may be configured to, when sensing the 2nd process during the execution of the 1st process, execute connection of the 2nd wireless communication with another electronic device, in accordance with a connection state of the 1st wireless communication.

In accordance with various exemplary embodiments, the processor may be configured to execute the 1st process with another electronic device, on the basis of the 2nd wireless communication that use the 2nd wireless communication interface, in accordance with a connection state of the 1st wireless communication with another electronic device.

In accordance with various exemplary embodiments, the processor may be configured to, when the connection with another electronic device is released, change the 1st process to correspond to the 2nd wireless communication, and execute the changed 1st process with another electronic device, using the 2nd wireless communication interface.

In accordance with various exemplary embodiments, the processor may be configured to maintain, stop or change the 1st process, and execute the 2nd process.

In accordance with various exemplary embodiments, the processor may be configured to if the 2nd process occurs, judge a resource of the electronic device, reallocate a resource required for processing of the 1st process and the 2nd process, and execute at least one process among the 1st process or the 2nd process in accordance with the reallocated resource.

In accordance with various exemplary embodiments, the processor may be configured to, if the 2nd process is ended, restore a resource for the 1st process to execute the 1st process.

In accordance with various exemplary embodiments, the processor may be configured to store execution information about the 1st process in response to the sensing of the 2nd process, and continuously execute the 1st process with another electronic device in accordance with the execution information, in response to the ending of the 2nd process.

In accordance with various exemplary embodiments, the processor may be configured to confirm an identifier of another electronic device in response to the ending of the 2nd process, and initialize the connection according to the 1st wireless communication or resume the 1st process with another electronic device, on the basis of the identifier of another electronic device.

An example of an operation of processing a process in accordance with the interworking of the electronic device 400, the docking station 500, and the external device 600 in various exemplary embodiments will be described below. For example, in various exemplary embodiments, while the electronic device 400 and the docking station 500 are connected (e.g., connected by 1st wireless communication) with each other and execute a 1st process, in case where a new 2nd process occurs, the 1st process and the 2nd process may be processed seamlessly systematically. In various exemplary embodiments, the following description is made for a method for, if sensing the occurrence of the 2nd process in course of the execution of the 1st process, notifying this, a method for processing the 2nd process and the 1st process sequentially, independently or in parallel, a method for again returning to previous context (e.g., the 1st process) after the ending of the 2nd process, and the like.

Figure 6A:
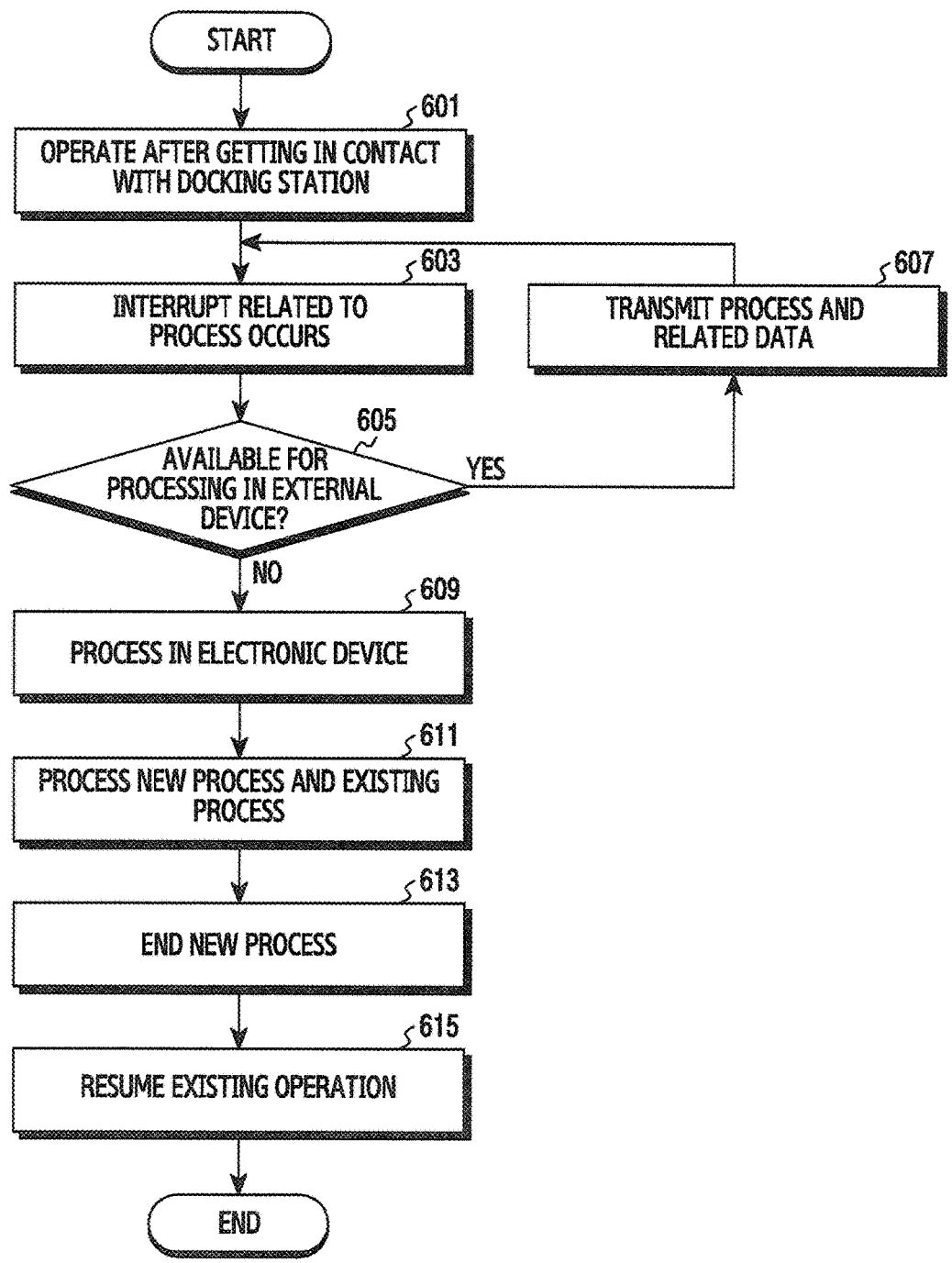
FIG. 6A illustrates a flowchart of an operation of an electronic device in a system in which the electronic device, a docking station, and an external device are connected with one another according to various exemplary embodiments of the present disclosure.

FIG. 6A illustrates a flowchart of an operation of an electronic device in a system in which the electronic device, a docking station, and an external device are connected with one another according to various exemplary embodiments of the present disclosure.

According to various exemplary embodiments, in FIG. 6A, it may be assumed that the electronic device 400 and the docking station 500 are connected with each other, and the external device 600 (e.g., a display device) is connected to the docking station 500. FIG. 6A may represent an example of an operation of the electronic device 400, when a new process occurs in a state where the electronic device 400 operates, for example, in a PC mode and processes the existing process. According to one exemplary embodiment, in the above system, the electronic device 400 may transmit played video data to the external device 600 through the connected docking station 500 and, in a state where the external device 600 is receiving the played video data from the electronic device 400 to display a related screen, the electronic device 400 may receive a phone call.

Referring to FIG. 6A, in operation 601, the electronic device 400 may be in a state of getting in contact and connecting with the docking station 500. For example, the electronic device 400 may be in a state in which proximity communication is connected based on the 1st wireless communication interface 513 of the electronic device 400 and the 3rd wireless communication interface 524 of the docking station 500. According to one exemplary embodiment, the electronic device 400 may be in a state of connecting with the docking station 500 and operating in a PC mode, to transmit played video data to the docking station 500 through the 1st wireless communication (e.g., ultra high speed close proximity communication) and enable the external device 600 connected to the docking station 500 to display the video data. That is, the electronic device 400 may be in a state of processing a 1st process (e.g., the existing process, for example, a process related to playing and transmitting of video data) in response to the connection with the docking station 500. According to one exemplary embodiment, the electronic device 400 may get in contact with the docking station 500, and perform the existing process of transmitting and receiving data through a connection procedure of wireless charging and/or proximity communication with the docking station 500. In accordance with various exemplary embodiments, the data may be transmitted as data of several forms such as a voice, a video, etc., and may provide a function to a user through the external device 600.

In operation 603, the electronic device 400 may sense the occurrence of an interrupt related to a 2nd process (e.g., a new process, for example, a process related to phone call incoming), in course of processing the 1st process. According to various exemplary embodiments, in case where the electronic device 400 is connected with the docking station 500 and thereafter some new process occurs in course of processing the existing process, the electronic device 400 may seamlessly process the existing process and the new process. The electronic device 400 may first recognize the arrival of the new process and notify this to a user. According to one exemplary embodiment, if the new process occurs in course of performing the existing process, the electronic device 400 may perform the step of notifying this to the user. For example, in operation 603, the electronic device 400 may provide the user with a notification of the occurrence of the new process such as phone call incoming, in course of processing the existing process such as transmitting video data to the external device 600 through the docking station 500. A method for notifying the new process according to various exemplary embodiments is described in detail with reference to the drawings described later.

In operation 605, the electronic device 400 may judge if the new process is available to be processed by the external device 600. According to one exemplary embodiment, after the electronic device 400 provides a notification of the occurrence of the new process (e.g., phone call incoming) to the user, if the user accepts the corresponding notification, the electronic device 400 may decide to process the new process based at least partially on whether the new process is a process available to be processed by the external device 600, whether it is a state where the external device 600 is set to process the new process, or the like. According to one exemplary embodiment, the electronic device 400 may determine a resource and method required for accepting the new process. In this process, the docking station 500 may notify the electronic device 400 whether the external device 600 is which device or whether the external device 600 is a device having a processing capability of which extent, and may support to determine a portion that the electronic device 400 may support. The electronic device 400 may determine resources of the external device 600 and the electronic device 400 and searching available resources of the external device 600 and the electronic device 400, to check if the new process is a process available to be jointly processed. If the joint processing is not available, the electronic device 400 may select the priority of the existing process and the new process, and differentially allocate the resource to the existing process and the new process, and perform the existing process and the new process in accordance with the selected priority.

If it is judged that the new process is available to be processed by the external device 600 in operation 605 ('Yes' of operation 605), in operation 607, the electronic device 400 may transmit the new process and related data to the external device 600 through the docking station 500. The external device 600 may receive the new process and the related data, and perform the processing of the received new process and related data.

If it is judged that the new process is not available to be processed by the external device 600 in operation 605 ('No' of operation 605), in operation 609, the electronic device 400 may decide that the electronic device 400 processes the new process. According to one exemplary embodiment, the electronic device 400 may decide to operate in the PC mode for the existing process while concurrently processing and performing a phone call for the new process. According to various exemplary embodiments, when the electronic device 400 decides that the electronic device 400 processes the existing process and the new process, the electronic device 400 may decide the priority of the existing process and the new process and then process the existing process and the new process in accordance with the decided priority as well.

In operation 611, the electronic device 400 may process the existing process and the new process. According to one exemplary embodiment, in response to the deciding of the processing of the new process, while operating in the PC mode for the existing process, the electronic device 400 may concurrently process a phone call for the new process. According to various exemplary embodiments, to process the new process, the electronic device 400 may determine a capacity available in the system, and determine priority. Thereafter, the electronic device 400 may allocate a capacity enough to execute all of the new process and the existing process and process the new process and the existing process. For example, the electronic device 400 may judge how to operate the existing process and the new process together on the at least partial basis of various conditions. A processing method for concurrently performing the existing process and the new process according to various exemplary embodiments is described in detail with reference to the drawings described later.

In operation 613, the electronic device 400 may sense the ending of the new process. For example, the electronic device 400 may sense the ending of the new process in course of processing the existing process and the new process. According to one exemplary embodiment, while executing the existing process of transmitting video data to the external device 600 in the PC mode and the new process of performing a phone call, the electronic device 400 may sense the ending of the new process in accordance with the ending of the phone call.

In operation 615, in response to the sensing of the ending of the new process, the electronic device 400 may resume the existing process. According to one exemplary embodiment, if a phone call is ended, the electronic device 400 may operate in the PC mode and restore to the existing ongoing state, to resume an operation according to the PC mode. For example, if the new process is ended, the electronic device 400 may reallocate a resource related to the processing of the existing process, and process the existing process. In accordance with various exemplary embodiments, when the existing process is restored, the electronic device 400 may resume the existing process in various schemes in consideration of a connection state of the electronic device 400 and the docking station 500. Examples of an operation of restoring and processing the existing process in accordance with various exemplary embodiments are described in detail with reference to the drawings described later.

Figure 6B:
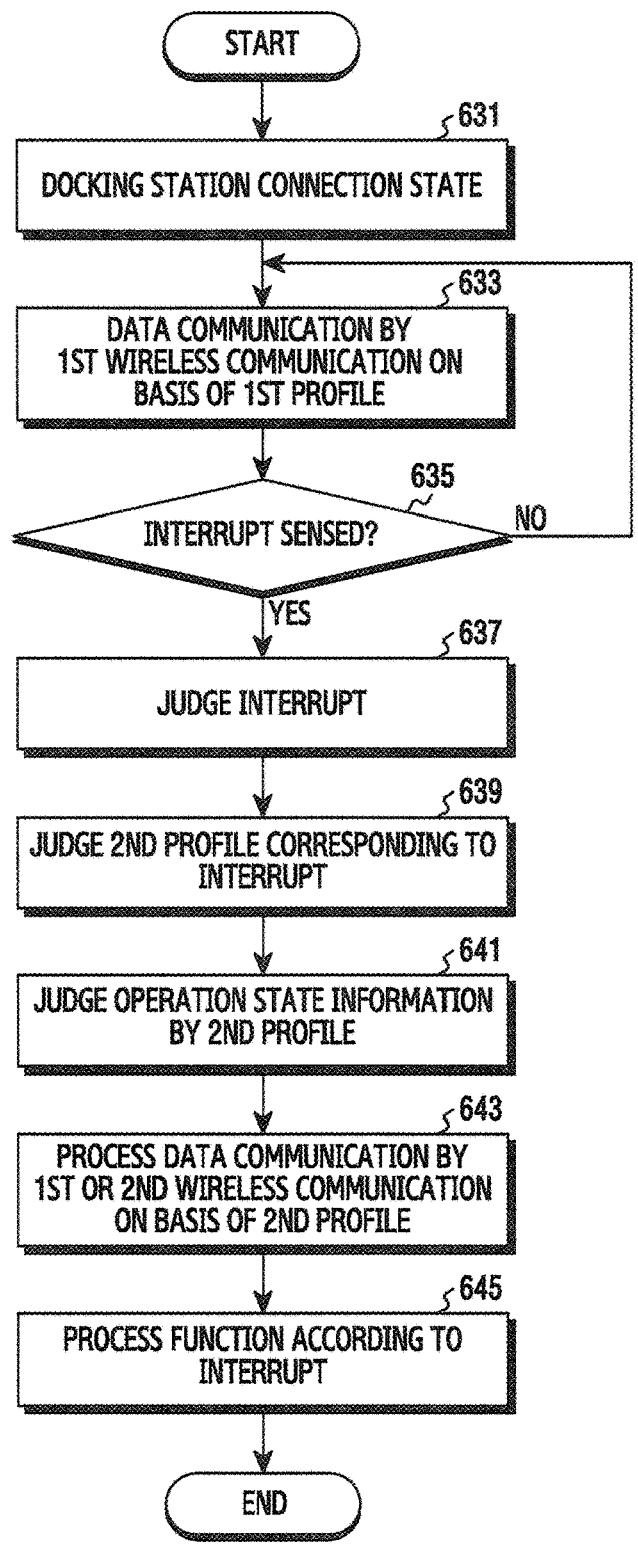
FIG. 6B illustrates a flowchart of a method of performing a multiple process in an electronic device according to various exemplary embodiments of the present disclosure.

FIG. 6B is a flowchart of a method of performing a multiple process in an electronic device according to various exemplary embodiments of the present disclosure.

Referring to FIG. 6B, in operation 631, the electronic device 400 is in a state of connecting with the docking station 500. In operation 633, the processor 120 of the electronic device 400 may perform a 1st process. For example, the processor 120 may perform data communication by 1st wireless communication on the basis of a 1st profile. For example, the processor 120 may perform the 1st process (e.g., data communication) with the docking station 500, on the basis of the 1st profile for interworking with the external device 600 connected through the docking station 500. A profile according to various exemplary embodiments is described in detail with reference to the drawings described later.

In operation 635, the processor 120 may judge the occurrence or non-occurrence of an interrupt related to a 2nd process in course of processing the 1st process. According to one exemplary embodiment, the processor 120 may sense a new 2nd process (e.g., call event reception) other than the 1st process, in course of the data communication according to the 1st process with the docking station 500.

If the interrupt for the 2nd process is not sensed in operation 635 ('No' of operation 635), the processor 120 may return to operation 633, and process the execution of operation 633 and subsequent operations.

If the interrupt for the 2nd process is sensed in operation 635 ('Yes' of operation 635), in operation 637, the processor 120 may judge the interrupt. According to one exemplary embodiment, the processor 120 may judge if the interrupt corresponds to at least one of call incoming, call sending, operation mode conversion (e.g., video mode→PC mode, etc.) or the like. For example, the processor 120 may judge the type of the interrupt for the 2nd process.

In operation 639, the processor 120 may judge a 2nd profile corresponding to the interrupt. For example, the processor 120 may search and extract a preset profile available for operation correspondingly to the interrupt type. In accordance with various exemplary embodiments, the processor 120 may judge the profile on the at least partial basis of the interrupt type and device information of the external device that is connected through the docking station 500.

In operation 641, the processor 120 may judge operation state information by the 2nd profile. For example, the processor 120 may judge the operation state information related to a capability that is available by the 2nd profile, hardware, external device interworking or non-interworking, data conversion scheme, and the like.

In operation 643, the processor 120 may process data communication according to the 1st process by at least one communication among 1st wireless communication or 2nd wireless communication, on the basis of the 2nd profile.

In operation 645, the processor 120 may process a function according to the interrupt. For example, while processing the 1st process, the processor 120 may start the 2nd process related to the interrupt.

Figure 7:
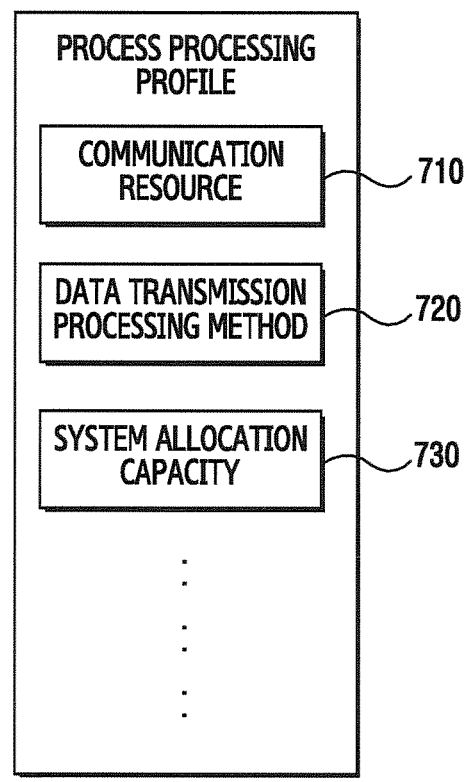
FIG. 7 and FIG. 8 illustrate diagrams of a profile according to various exemplary embodiments of the present disclosure.
Figure 8:
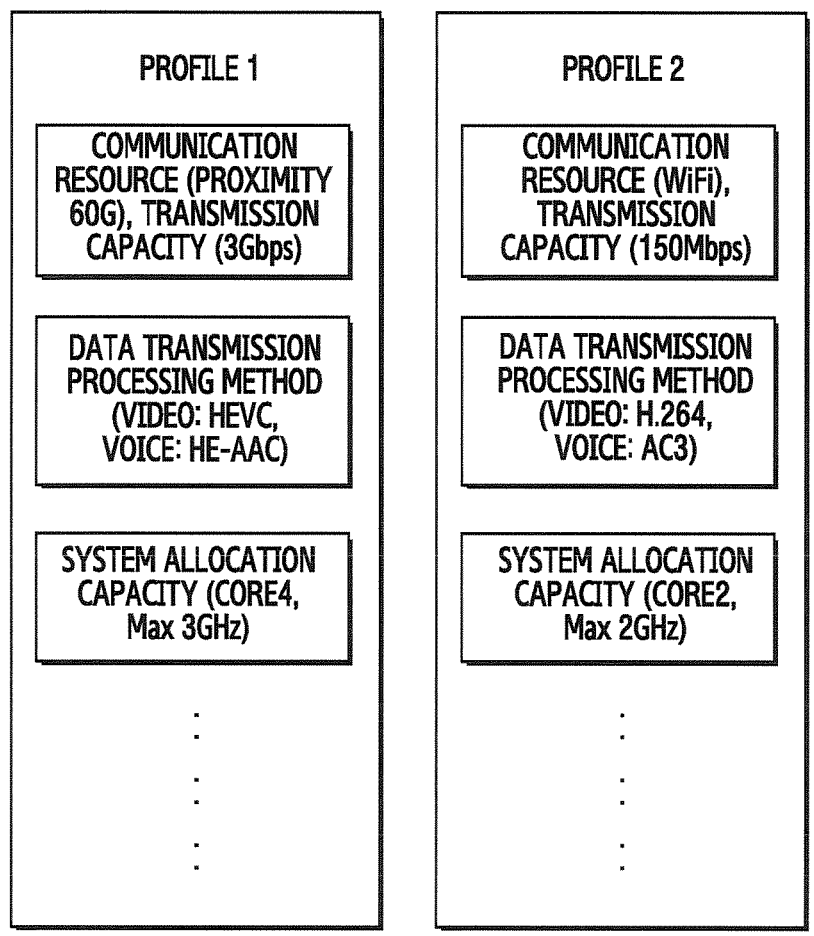

FIG. 7 and FIG. 8 illustrate diagrams of a profile according to various exemplary embodiments of the present disclosure.

According to various exemplary embodiments, the electronic device 400 may previously configure and store one or more profiles, and may operate adaptively to the context of the electronic device 400 on the basis of the corresponding profile, whereby fast and efficient corresponding may be available in accordance with the context of the electronic device 400.

Referring to FIG. 7, in various exemplary embodiments, the profile may be configured on the at least partial basis of a communication resource 710, a data transmission processing method 720, a system allocation capacity 730 and the like. For example, the profile may be configured in a scheme of distinguishing a capacity and type of data transmitted, a system capacity, a communication method and the like. The profile may be variously configured in accordance with context.

In various exemplary embodiments, the profile may have detailed information that is designated every each item such as the communication resource 710, the data transmission processing method 720, the system allocation capacity 730 and the like. For example, as illustrated in FIG. 8, the profile may be configured as in an example of a 1st profile or a 2nd profile.

According to one exemplary embodiment, in case where the electronic device 400 executes two main processes, the electronic device 400 may make selective use of the 1st profile and the 2nd profile. For example, in case where the electronic device 400 executes a 2nd process in course of executing a 1st process, the electronic device 400 may change the exiting 1st profile into the new 2nd profile to make use of the new 2nd profile. If the electronic device 400 executes the 2nd process in course of executing the 1st process of outputting a video by 1st wireless communication, the electronic device 400 may change the 1st process in accordance with the 2nd profile and operate. In one example, in the 1st profile, the electronic device 400 may use the 1st wireless communication (e.g., 60 GHz proximity communication) to output a video, and may correspond to this to allocate and use a codec and a system as in an example of the 1st profile of FIG. 8. In another example, in the 2nd profile, the electronic device 400 may use 2nd wireless communication (e.g., WiFi) to output a video, and may correspond to this to allocate and use a codec and a system as in an example of the 2nd profile of FIG. 8.

According to various exemplary embodiments, the electronic device 400 may judge a new process and configure a profile and, accordingly to the profile, the electronic device 400 may allocate or distribute a resource and operate as well. Also, according to various exemplary embodiments, the docking station 500 includes a separate operation processor (not shown) and storage unit (not shown). The electronic device 400 may operate in such a manner that the docking station 500 judges context and guides the electronic device 400 to use the profile.

Figure 9:
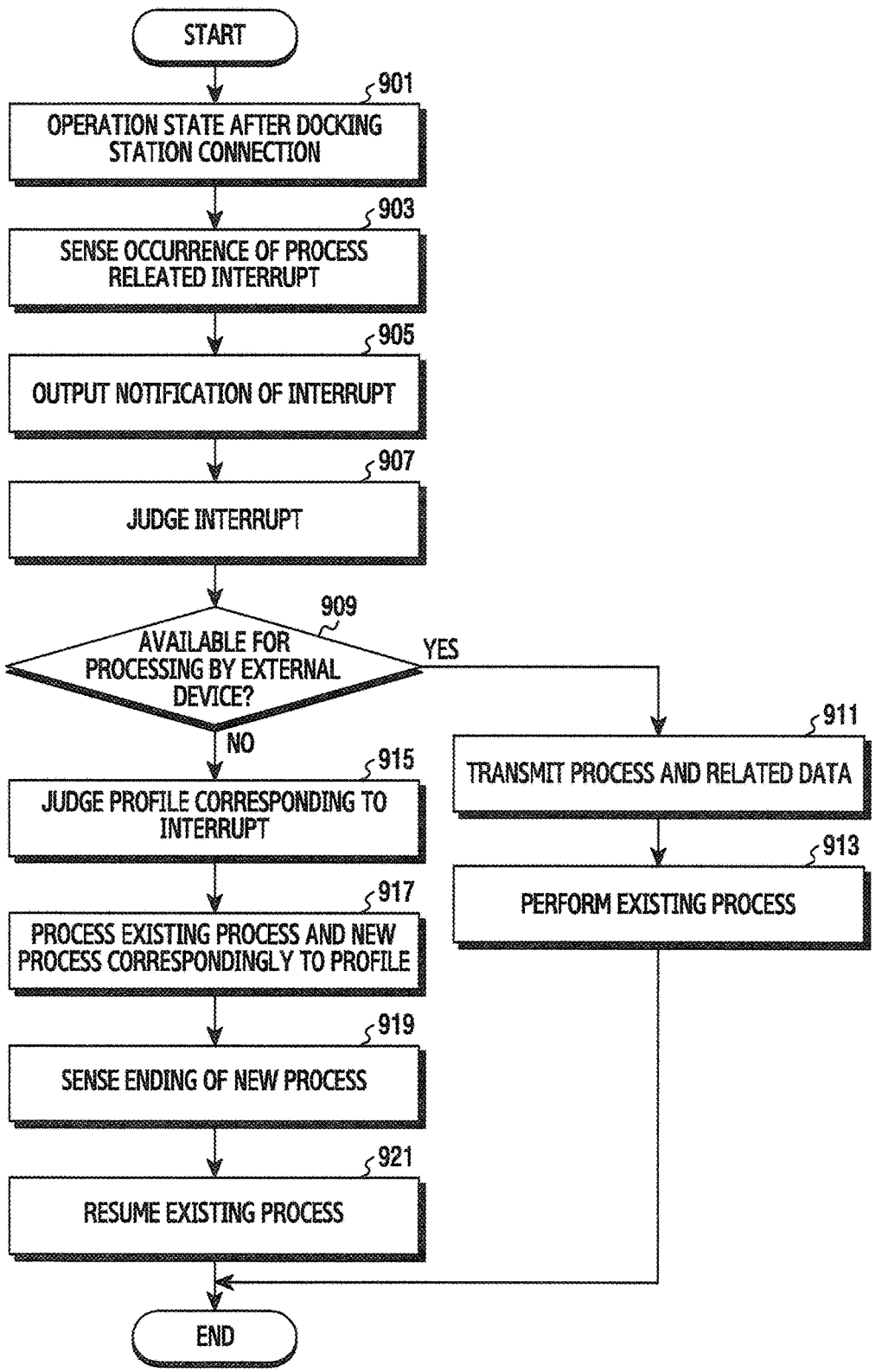
FIG. 9 illustrates a flowchart of a method for operating in an electronic device according to various exemplary embodiments of the present disclosure.

FIG. 9 illustrates a flowchart of a method for operating in an electronic device according to various exemplary embodiments of the present disclosure.

Referring to FIG. 9, in operation 901, the processor 120 of the electronic device 400 may be in a specific operation state after connection with the docking station 500. For example, the processor 120 may be in a state of performing a 1st process (e.g., transmitting an FHD video through 1st wireless communication) with the docking station 500.

In operation 903, the processor 120 may sense the occurrence of an interrupt related to a new process. For example, the processor 120 may sense the occurrence of an interrupt related to additionally executing a 2nd process (e.g., phone call incoming, message reception, a motion of the electronic device 400, operation mode conversion, etc.), in course of performing the 1st process.

In operation 905, the processor 120 may output a notification related to the interrupt. For example, if the 2nd process corresponds to phone call incoming, the processor 120 may output a notification related to the phone call incoming and, if the 2nd process corresponds to message reception, the processor 120 may output a notification related to the message reception. In various exemplary embodiments, the processor 120 may process to output the notification related to the interrupt through at least one of the electronic device 400 or the external device 600 on the basis of various context (e.g., the type of the interrupt, the type of the external device 600, current context (e.g., whether it is a public place, whether it is conference context, etc.) and the like). In accordance with various exemplary embodiments, the outputting of the notification related to the interrupt is described in detail with reference to the drawings described later.

In operation 907, the processor 120 may judge the interrupt. In operation 909, the processor 120 may judge if the interrupt is available to be processed by the external device 600. For example, if the processor 120 senses the execution of the 2nd process in course of the execution of the 1st process, the processor 120 may judge if the 2nd process is a process available to be processed by the external device 600.

If it is judged that the interrupt is an interrupt available to be processed by the external device 600 in operation 909 ("Yes" of operation 909), in operation 911, the processor 120 may process to transmit a process, which is executed in accordance with the interrupt, and related data, to the external device 600. For example, the processor 120 may execute the 2nd process, and provide information and data related to the 2nd process to the external device 600 through the docking station 500. In accordance with various exemplary embodiments, the processor 120 may transmit the process and the related data on the basis of at least a part of 1st wireless communication or 2nd wireless communication.

In operation 913, the processor 120 may process the execution of the existing process. For example, the processor 120 may process to execute the 2nd process by the external device 600, and keep processing the 1st process. For example, the 1st process may be in a state of being kept being carried out by the electronic device 400.

If it is judged that the interrupt is an interrupt that is not available to be processed by the external device 600 in operation 909 ("No" of operation 909), that is, if it is judged that the interrupt is an interrupt that has to be processed by the electronic device 400, in operation 915, the processor 120 may judge a profile corresponding to the interrupt. For example, the processor 120 may decide the priority of the interrupt for the electronic device 400 and decide the processing of the interrupt within the electronic device 400. When the processor 120 decides to process the interrupt within the electronic device 400, the processor 120 may judge the profile corresponding to the interrupt. According to one exemplary embodiment, the processor 120 may judge current context (e.g., the type of the 1st process that is in execution, the type of the connected external device 600, resource information required for execution of the 2nd process, and the like), and may search and select a profile corresponding to the judgment result among preset profiles.

In operation 917, the processor 120 may process the existing process and a new process correspondingly to the profile. For example, the processor 120 may reallocate a resource to the 1st process in accordance with the profile and process the 1st process, and process the execution of the 2nd process. According to one exemplary embodiment, in case where the processor 120 is transmitting an FHD video through the 1st wireless communication, the processor 120 may select and decide a capacity and type of data, a codec, a core or the like, and process changed video transmission through the 2nd wireless communication. The processor 120 may process the 1st process in accordance with the profile while concurrently processing the 2nd process. Examples of an operation of processing the existing process and the new process in accordance with various exemplary embodiments are described in detail with reference to the drawings described later.

In operation 919, the processor 120 may sense the ending of the new process. For example, the processor 120 may sense the ending of the 2nd process in course of processing the 1st process and the 2nd process. According to one exemplary embodiment, while executing the 1st process of transmitting video data to the external device 600 and the 2nd process of performing a phone call, the processor 120 may sense the ending of the 2nd process in accordance with the ending of the phone call.

In operation 921, if the processor 120 senses the ending of the new process, the processor 120 may resume the existing process. For example, if the 2nd process is ended in course of processing the 1st process in accordance with the changed profile, the processor 120 may reallocate a resource to the 1st process on the basis of the non-changed original profile, and process the 1st process. In accordance with various exemplary embodiments, at the time of the restoring of the 1st process, the processor 120 may resume the 1st process in various schemes in consideration of a connection state of the electronic device 400 and the docking station 500. Examples of an operation of restoring and processing the existing process in accordance with various exemplary embodiments are described in detail with reference to the drawings described later.

As mentioned above, according to various exemplary embodiments, first, the electronic device 400 and the docking station 500 get in contact with each other, and go through a connection procedure of wireless charging or 1st wireless communication (e.g., ultra high speed close proximity communication of a 60 GHz band), and perform a process of exchanging data between the electronic device 400 and the docking station 500. In various exemplary embodiments, the data may, for example, include data of several forms such as a voice, a video, etc., and provide a related function to a user through the external device 600.

Next, in accordance with various exemplary embodiments, if the new process occurs, the electronic device 400 may perform the step of notifying the occurrence of the new process to the user. Thereafter, if an approval to the notification is inputted by the user selectively or automatically, the electronic device 400 may determine a resource (e.g., capacity) available in a system and determine the priority of the new process, in order to process the new process. In accordance with various exemplary embodiments, the electronic device 400 may allocate a resource for the execution of all the new process and the existing process, and process the new process and the existing process. Also, after one process (e.g., the new process) is finished or completed, the electronic device 400 may resume the existing process. In various exemplary embodiments, the electronic device 400 may further perform the step of again allocating a resource to the existing process and deciding whether to resume the existing process.

Figure 10:
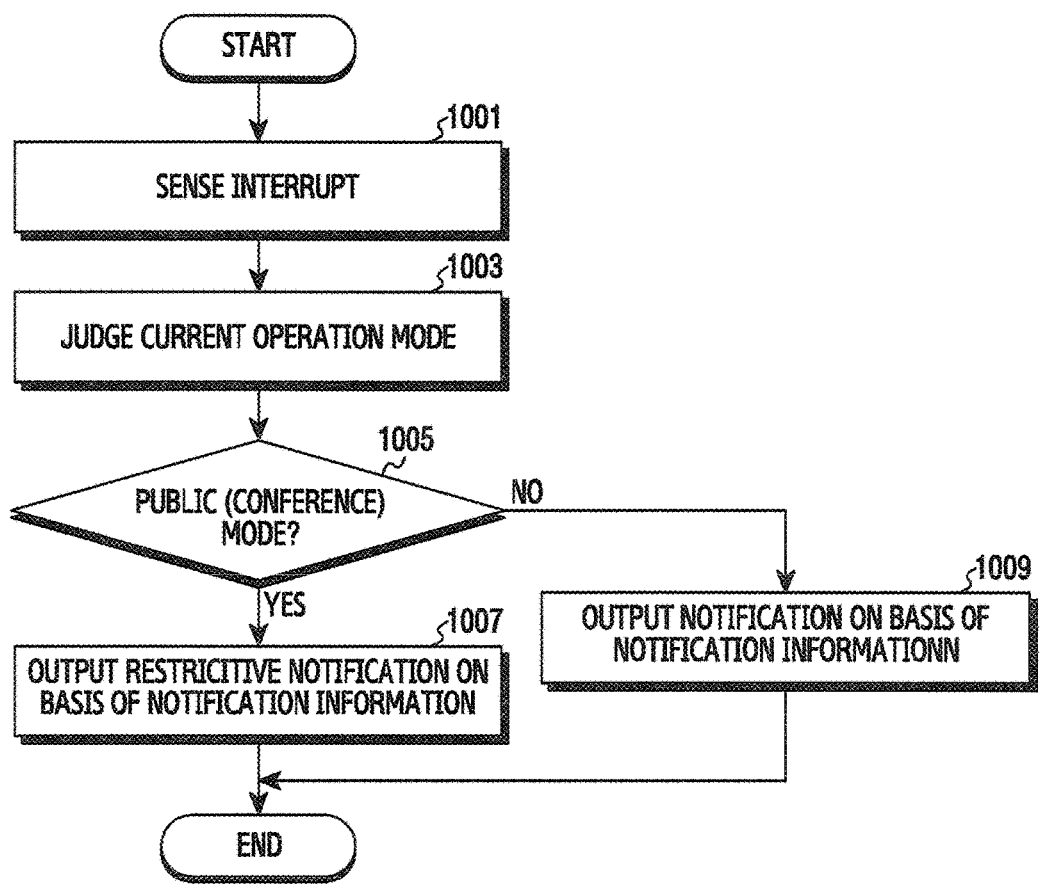
FIG. 10 illustrates a flowchart of a method for outputting a notification of an interrupt in an electronic device according to various exemplary embodiments of the present disclosure.

FIG. 10 illustrates a flowchart of a method for outputting a notification of an interrupt in an electronic device according to various exemplary embodiments of the present disclosure.

Referring to FIG. 10, in operation 1001, the processor 120 of the electronic device 400 may sense an interrupt. For example, the processor 120 may sense the occurrence of the interrupt for executing a new 2nd process, in course of executing a 1st process.

In operation 1003, the processor 120 may judge a current operation mode of the electronic device 400. In operation 1005, the processor 120 may judge if the electronic device 400 is operating in a public (or conference) mode. According to one exemplary embodiment, the processor 120 may judge an operation mode of the electronic device 400 on the at least partial basis of current position information of the electronic device 400, identification information (e.g., an ID, etc.) of the docking station 500, public (or conference) mode setting information, presentation operation information, peripheral context information acquired by various sensors, or the like.

If it is judged that the electronic device 400 is operating in the public mode in operation 1005 ("Yes" of operation 1005), in operation 1007, the processor 120 may process a restrictive notification output for the interrupt. For example, assuming that the interrupt is phone call incoming, and the notification output is set to a bell sound mode, and it is a scheme of notification output by the external device 600, the processor 120 may process to automatically change setting into a vibration mode or mute mode, and output a call incoming notification only within the electronic device 400.

If it is judged that the electronic device 400 is not operating in the public mode in operation 1005 ("No" of operation 1005), in operation 1009, the processor 120 may process the notification output in accordance with a set scheme. For example, assuming that the interrupt is the phone call incoming, and the notification output is set as the bell sound mode, and it is the notification output scheme by the external device 600, the processor 120 may process to perform a notification output of the bell sound mode, and a notification output of the external device 600.

Figure 11:
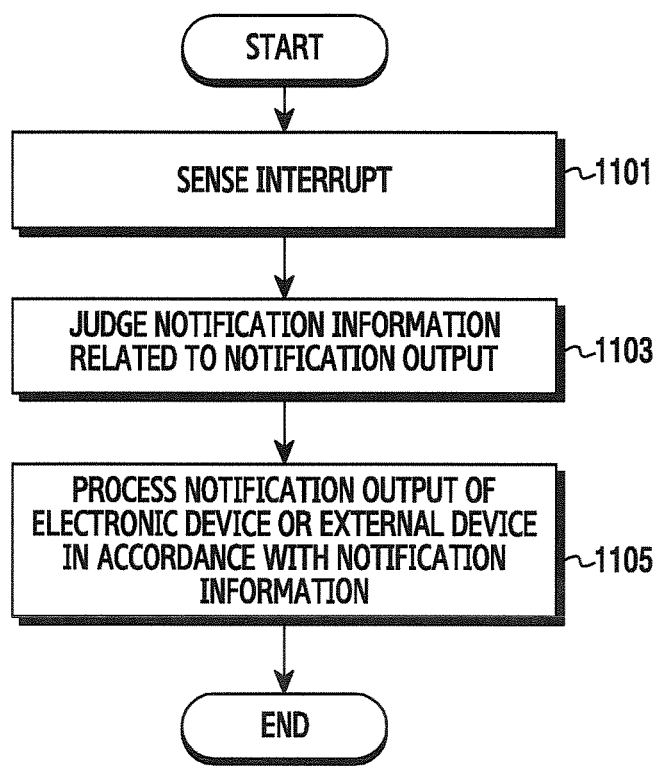
FIG. 11 illustrates a flowchart of a method for notification at process occurrence in an electronic device according to various exemplary embodiments of the present disclosure.

FIG. 11 illustrates a flowchart of a method for notification at process occurrence in an electronic device according to various exemplary embodiments of the present disclosure.

Referring to FIG. 11, in operation 1101, the processor 120 of the electronic device 400 may sense an interrupt. For example, the processor 120 may sense the occurrence of the interrupt for executing a new 2nd process, in course of performing a 1st process.

In operation 1103, the processor 120 may judge notification information related to a notification output for the interrupt. For example, the processor 120 may judge if a notification output scheme is by a vibration mode, a mute mode or a bell sound mode, on the basis of the set notification information.

In operation 1105, the processor 120 may process the notification output based on at least one of the electronic device 400 or the external device 600 in accordance with the judged notification information. Examples of an operation of processing the notification output in accordance with the notification information in various exemplary embodiments are illustrated in FIG. 12 and FIG. 13.

Figure 12:
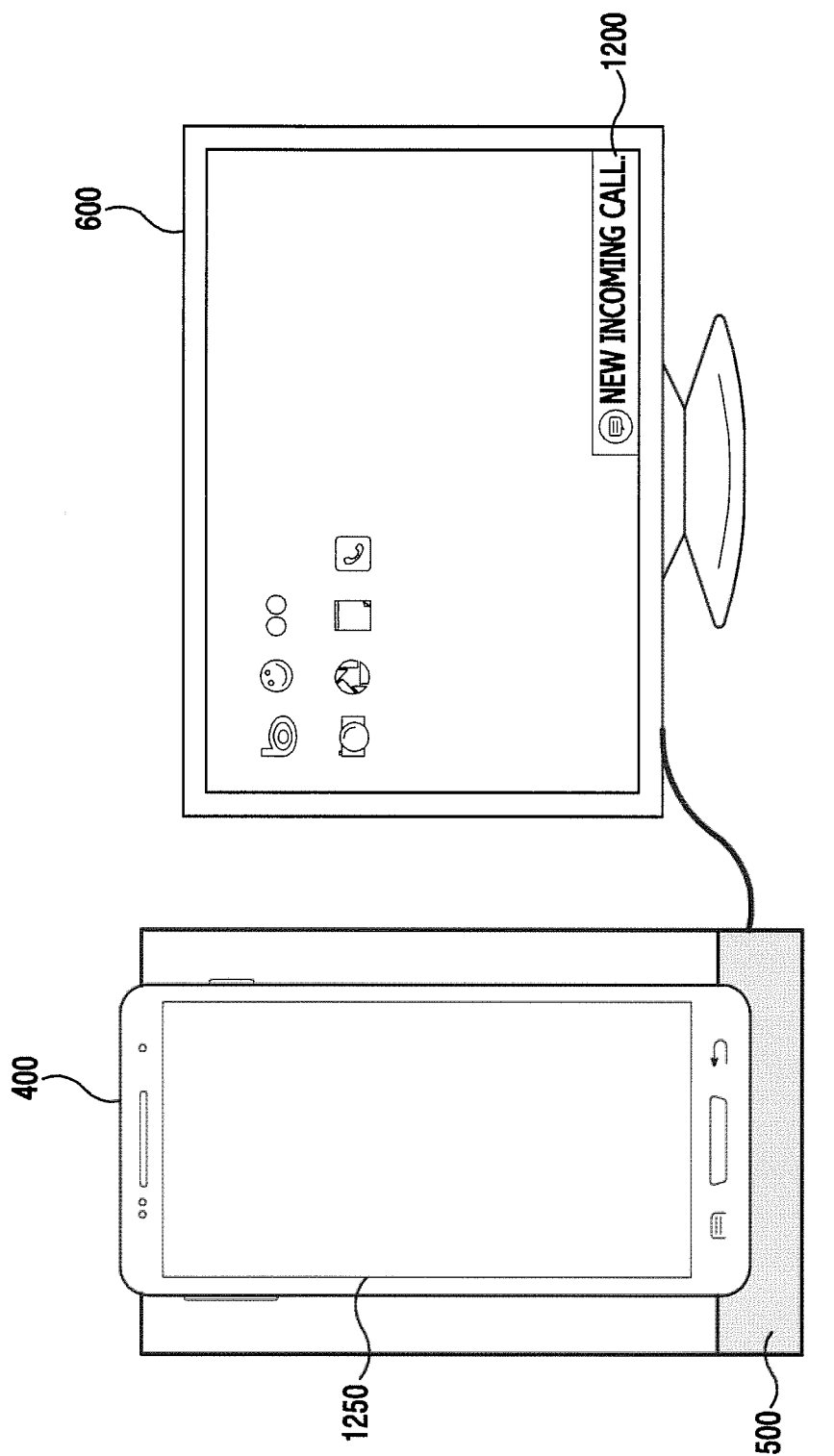
FIG. 12 and FIG. 13 illustrate diagrams of a method for notification at process occurrence in an electronic device according to various exemplary embodiments of the present disclosure.
Figure 13:
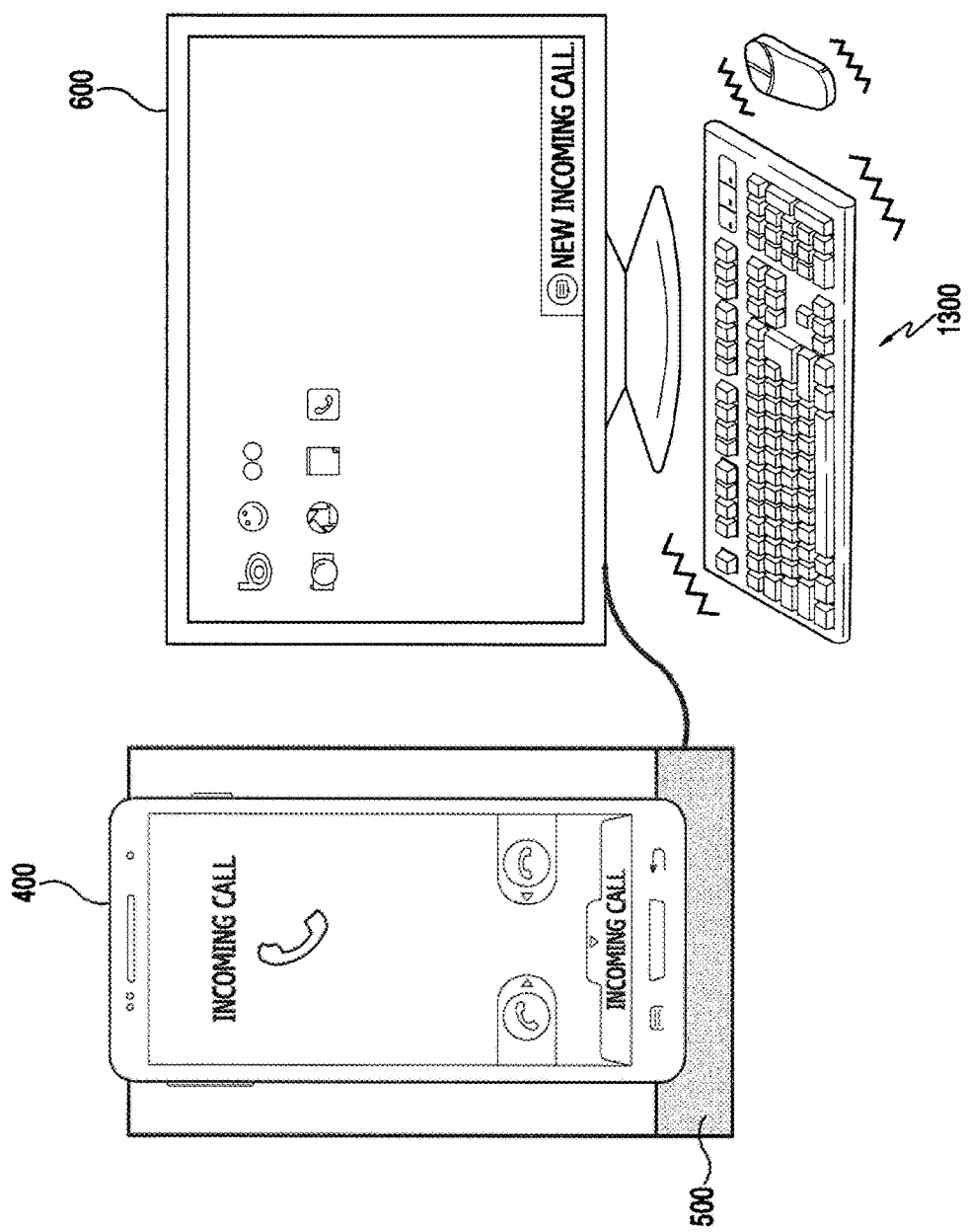

FIG. 12 and FIG. 13 illustrate diagrams a method for notification at process occurrence in an electronic device according to various exemplary embodiments of the present disclosure.

Referring to FIG. 12, FIG. 12 may represent an example of an operation of processing a notification output using a display.

As illustrated in FIG. 12, the electronic device 400 may output a notification of an interrupt through the external device 600. According to one exemplary embodiment, in a state where a display 1250 of the electronic device 400 is off (e.g., screen off), the processor 120 may forward data related to the notification, to the external device 600 through the docking station 500. The external device 600 may output (display) the notification of the interrupt in the form of pop-up 1200, on the basis of the received data related to the notification. According to one exemplary embodiment, the processor 120 may provide related control information to differently output a notification position (e.g., a screen edge, a screen center, etc.) within the display 1270 of the external device 600 on the at least partial basis of a significance of a sender, a correlation, the content of the notification, the type of the notification, or the like. According to one exemplary embodiment, the processor 120 may vary a notification output (display) time and an output (display) method (e.g., flickering, etc.), and may vary an output (display) in accordance with the type of a corresponding process according to an interrupt as well. In one example, the processor 470 may process to output a notification message (e.g., "there is a new incoming call," "there is a new video call," "there is a new message," etc.) in the form of pop-up 1200 at a right lower end of the display 1270 of the external device 600.

Referring to FIG. 13, FIG. 13 may represent an example of an operation of processing a notification output using a vibration.

In case where the electronic device 400 outputs a notification of an interrupt by a vibration, a 1st wireless communication connection between the electronic device 400 and the docking station 500 may be made unstable, because the electronic device 400 and the docking station 500 are deviated from a position (or a distance, etc.). Also, in case where the electronic device 400 is under wireless charging through the docking station 500, the vibration of the electronic device 400 may bring about the inefficient progress of the wireless charging. Accordingly, in various exemplary embodiments, in case where the electronic device 400 and the docking station 500 are connected with each other, the electronic device 400 may process not to directly output the notification by the vibration.

According to one exemplary embodiment, in case where the processor 120 judges that the electronic device 400 and the docking station 500 are connected with each other, the processor 120 may automatically convert a vibration scheme that has been set for an interrupt into another scheme (e.g., a bell sound and a lamp), to process a notification output. Also, as illustrated in FIG. 13, the processor 120 may transmit data related to the notification output to the external device 600 connected through the docking station 500 or to a peripheral device 1300 (e.g., a keyboard and a mouse) of the external device 600, to enable the external device 600 or the peripheral device 1400 to perform the notification output by a vibration. According to various exemplary embodiments, while the external device 600 displays notification information through a display of the external device 600 on the basis of the received data, the external device 600 may operate to output a notification vibration through the peripheral device 1300 connected with the external device 600.

According to various exemplary embodiments, a notification output method may be implemented variously besides the aforementioned method.

According to one exemplary embodiment, the processor 120 may process a notification output through the electronic device 400. For example, in case where the electronic device 400 interworks with the external device 600 through the docking station 500 in a very public place (e.g., a conference room, an office, etc.), the processor 120 may operate to perform a notification output (display) within a display of the electronic device 400, without performing a notification output (display) of the external device 600, for the sake of privacy protection. According to various exemplary embodiments, to prevent a decrease of a concentration of many people who are watching the external device 600 in a public place and protect a user individual's privacy, etc., the processor 120 may perform the notification output in various schemes of applying the display of the electronic device 400. For example, in case where a conference room is dark, the processor 120 may display a notification small or dark.

According to one exemplary embodiment, the processor 120 may process a notification output using a bell sound. In various exemplary embodiments, the processor 120 may sense a connection state of the electronic device 400 and the docking station 500, to differently output the bell sound for a notification. For example, in case where the electronic device 400 is connected to the docking station 500 and is used in an office or at a home, the processor 120 may differently output the bell sound in accordance with the docking station 500 to which the electronic device 400 is connected. In one example, the processor 120 may output a discontinuous bell sound not to decrease the concentration of other people in a common space such as an office, and may output a continuous bell sound in a personal space such as a home. As mentioned above, in various exemplary embodiments, the processor 120 may differently perform the notification output in accordance with the docking station 500 to which the electronic device 400 is connected.

According to one exemplary embodiment, the processor 120 may differently process a notification output in accordance with the external device 600. For example, the processor 120 may selectively perform at least one notification output among a display notification output, a sound notification output, or a vibration notification output in accordance with the type of the external device 600 such as a screen display device, a sound output device such as a speaker, a display device with a speaker, or the like.

According to one exemplary embodiment, the processor 120 may process a notification output using a lamp. For example, all devices such as the electronic device 400, the docking station 500, the external device 600, a peripheral device (e.g., a keyboard, a mouse, etc.) connected with the external device 600 or the like may each include a lamp (e.g., an LED lamp) that displays a state of the corresponding device. Accordingly, in various exemplary embodiments, the processor 120 may process a notification output of an interrupt according to a new process, using a lamp installed in at least one device among various devices interworking with one another. According to one exemplary embodiment, the processor 120 may process the notification output of the interrupt using an optical unit for an optical mouse, a key related LED for a keyboard, and a power related LED for a monitor. Also, when processing the notification output using the lamp, the processor 120 may process variously the notification output of the interrupt by changing the number of flickering or a length of light emitting or changing LED color (e.g., red to green).

As mentioned above, according to various exemplary embodiments, when a new process occurs in course of the execution of the existing process, the electronic device 400 may notify the occurrence of the new process to a user in various schemes. For example, in case where the docking station 500 gets in contact with the electronic device 400 and thereafter an interrupt related to the new process occurs in the electronic device 400, the processor 120 may provide a notification to the user in several ways. For example, the processor 120 may notify in all schemes of providing the notification to the user through the electronic device 400 and/or the external device 600, based at least partially on a display, a bell sound, a vibration, a lamp, etc. Also, in various exemplary embodiments, the processor 120 may provide a notification of another scheme in accordance with the docking station 500 or in accordance with the external device 600 connected with the docking station 500. Also, in various exemplary embodiments, when providing a notification of a process to the user, the processor 120 may differently provide this in accordance with context.

Also, in various exemplary embodiments, the operation of providing a notification of a new process has been described in FIG. 10, FIG. 11, FIG. 12 and FIG. 13 independently, but various exemplary embodiments are not limited to this. For example, the processor 120 may perform the operation of the notification related to the new process in parallel or sequentially by at least one combination of FIG. 10, FIG. 11, FIG. 12 or FIG. 13 as well.

Figure 14:
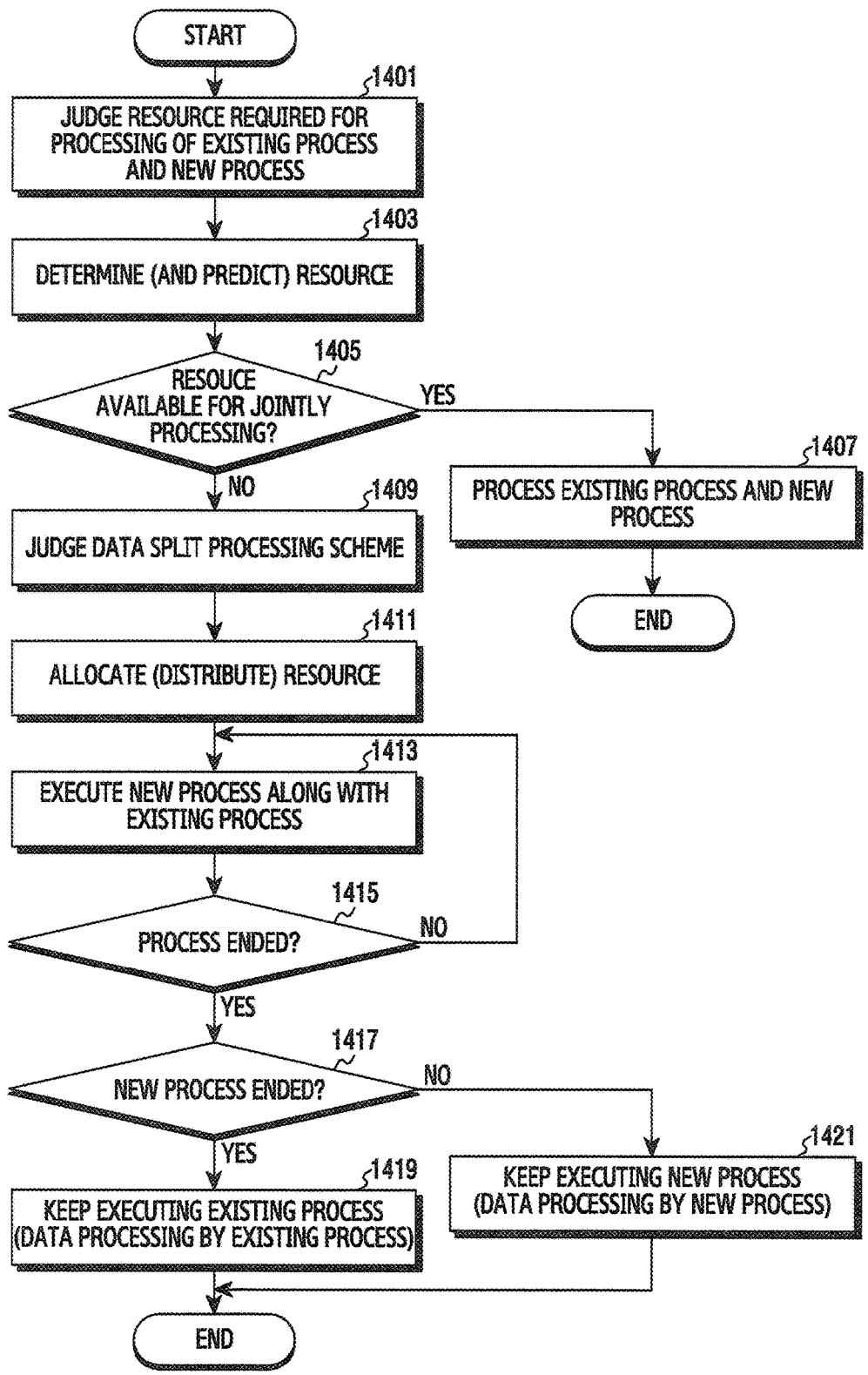
FIG. 14 illustrates a flowchart of a method for executing a process in an electronic device according to various exemplary embodiments of the present disclosure.

FIG. 14 illustrates a flowchart of a method for executing a process in an electronic device according to various exemplary embodiments of the present disclosure.

As illustrated in FIG. 14, FIG. 14 illustrates a diagram of an operation method of processing the existing process (e.g., a 1st process) and a new process (e.g., a 2nd process).

Referring to FIG. 14, in operation 1401, the processor 120 of the electronic device 400 may judge a resource required for processing the existing process and the new process. For example, the processor 120 may judge a resource required for processing the 1st process and the 2nd process, in response to the occurrence of an interrupt related to the execution of the 2nd process in course of an operation by the 1st process (e.g., transmitting an FHD video to the docking station 500 by 1st wireless communication).

In operation 1403, the processor 120 may determine (or predict) the judged resource.

In operation 1405, the processor 120 may judge if the determined resource is a range of a resource of an extent that is available to jointly process the existing process and the new process.

If it is judged that the resource is a resource available for jointly processing in operation 1405 ("Yes" of operation 1405), in operation 1407, the processor 120 may process the existing process and the new process.

If it is judged that the resource is not the resource available for jointly processing in operation 1405 ("No" of operation 1405), in operation 1409, the processor 120 may judge a data split processing scheme. For example, the processor 120 may judge the split (allocation) processing scheme for data that the electronic device 400 transmits to the docking station 500 through the 1st wireless communication.

In operation 1411, the processor 120 may allocate (distribute) the resource to each process based on the judgment result. In accordance with various exemplary embodiments, an operation of allocating (distributing) the resource according to the data split processing scheme is described in detail with reference to the drawings described later.

In operation 1413, the processor 120 may execute the new process along with the existing process. For example, the processor 120 may keep performing data transmission related to the 1st process correspondingly to the resource allocation (distribution), and may process the 2nd process correspondingly to the resource allocation (distribution).

In operation 1415, the processor 120 may judge the ending or non-ending of the process. For example, the processor 120 may sense the occurrence or non-occurrence of an interrupt of ending at least one process among the existing process or the new process.

If the ending of the process is not sensed in operation 1415 ("No" of operation 1415), the processor 120 may return to operation 1413, and process the execution of operation 1413 and subsequent operations.

If the ending of the process is sensed in operation 1415 ("Yes" of operation 1415), in operation 1417, the processor 120 may judge the ended process. For example, the processor 120 may judge if the ended process is the existing process or the new process.

If it is judged to be the ending of the new process in operation 1417 ("Yes" of operation 1417), in operation 1419, the processor 120 may process to keep executing the existing process. For example, the processor 120 may end the new process, and keep executing the data transmission operation of the existing process. In accordance with various exemplary embodiments, when ending the new process, the processor 120 may reallocate (redistribute) a resource to the existing process. For example, the processor 120 may process data transmission on the basis of the resource that is allocated to the existing process before the execution of the new process.

If it is judged to be the ending of the existing process in operation 1417 ("No" of operation 1417), in operation 1421, the processor 120 may process to keep executing the new process. For example, the processor 120 may end the existing process, and keep executing an operation for the new process. In accordance with various exemplary embodiments, when ending the existing process, the processor 120 may reallocate (redistribute) a resource to the new process. For example, the processor 120 may allocate more resources related to the execution of the new process, to improve performance, speed, or the like according to the processing of the new process.

Figure 15:
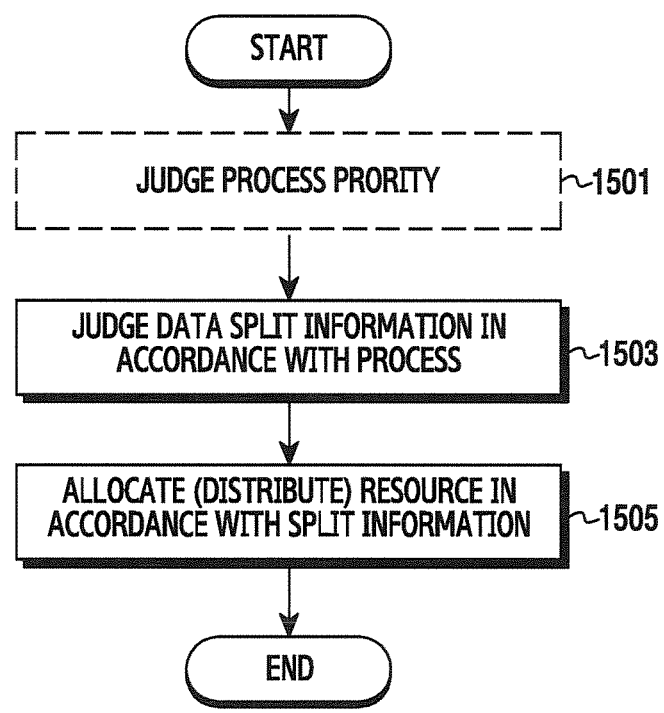
FIG. 15 illustrates a flowchart of a method for executing a process in an electronic device according to various exemplary embodiments of the present disclosure.

FIG. 15 illustrates a flowchart of a method for executing a process in an electronic device according to various exemplary embodiments of the present disclosure.

Referring to FIG. 15, in operation 1501, the processor 120 of the electronic device 400 may judge process priority. For example, if a resource is not included in a resource range capable of jointly processing a new process along with the existing process (e.g., "No" of operation 1405 of FIG. 14), the processor 120 may judge the process priority for the existing process and the new process. In various exemplary embodiments, the judging of the process priority of operation 1501 may be performed selectively. For example, the processor 120 may jump directly to operation 1503, without performing operation 1501 in FIG. 15.

In operation 1503, the processor 120 may judge data split information correspondingly to the process. In various exemplary embodiments, the data split information is described in detail with reference to the drawings described later.

In operation 1505, the processor 120 may allocate (distribute) a resource that will process the process on the basis of the judged data split information. For example, the processor 120 may allocate an available resource to each of the existing process and the new process, on the basis of the data split information.

According to various exemplary embodiments, the processor 120 of the electronic device 400 may concurrently operate the existing process and the new process. For example, the electronic device 400 may sense an interrupt according to a 2nd process, in course of connecting with the docking station 500 and executing an operation related to a 1st process. If the electronic device 400 senses the interrupt according to the 2nd process in course of executing the 1st process, the electronic device 400 may judge a resource and method required for accepting the 2nd process. In this process, the docking station 500 may provide the electronic device 400 with device information (e.g., the type of the device, ability thereof, the performance thereof, a capability thereof, etc.) about whether the external device 600 is which device, and may determine and provide a portion that the electronic device 400 may support as well. The processor 120 of the electronic device 400 may determine resources of the external device 600 and the electronic device 400 and search available resources of the external device 600 and the electronic device 400, thereby checking if the new process is a process that is available to be jointly processed. In case where the new process is not available to be jointly processed, the processor 120 may select (decide) process priority for the existing process and the new process, and differentially allocate the resource to the existing process and the new process, and perform the existing process and the new process in accordance with the selected priority.

Examples of an operation of allocating (distributing) a resource to a process in accordance with various exemplary embodiments will be described below.

According to various exemplary embodiments, the processor 120 may adjust video data to adjust a capacity of the video data. In various exemplary embodiments, in millimeter wave (mmWave) communication (e.g., proximity 64 GHz, WiGig, etc.), a data rate may be a 3 Gbps class and, in a next generation communication, a 10 Gbps class may be available. This data rate may control the capacity of data in accordance with at least a part of a compress rate, the number of frames, a resolution of a picture quality, or the like. According to one exemplary embodiment, the processor 120 may adjust and set a resolution to HD, full HD (FHD), quad HD (QHD), ultra HD (UHD) and 8K, and may adjust the capacity by another compress rate in accordance with each resolution. Table 2 below may represent an example of controlling the capacity of data in various exemplary embodiments.

TABLE 2

| Resolution | Bandwidth(bits) | | | | | | | |
|---|---|---|---|---|---|---|---|---|
| Compress | Raw data | | 1/3 Compress | | 1/4 Compress | | 1/5 Compress | |
| fps/bits | 30 fps/24 bits | 60 fps/24 bits | 30 fps/24 bits | 60 fps/24 bits | 30 fps/24 bits | 60 fps/24 bits | 30 fps/24 bits | 60 fps/24 bits |
| HD | 663,552,000 | 1,327,104,000 | 221,184,000 | 442,368,000 | 165,888,000 | 331,776,000 | 132,710,400 | 265,420,800 |
| Full HD | 1,492,992,000 | 2,985,984,000 | 497,664,000 | 995,328,000 | 373,248,000 | 746,496,000 | 298,598,400 | 597,196,800 |
| QHD | 2,654,208,000 | 5,308,416,000 | 884,736,000 | 1,769,472,000 | 663,552,000 | 1,327,104,000 | 530,841,600 | 1,061,683,200 |
| UHD | 5,971,968,000 | 11,943,936,000 | 1,990,656,000 | 3,981,312,000 | 1,492,992,000 | 2,985,984,000 | 1,194,393,600 | 2,388,787,200 |
| 8K | 23,887,872,000 | 47,775,744,000 | 7,962,624,000 | 15,925,248,000 | 5,971,968,000 | 11,943,936,000 | 4,777,574,400 | 9,555,148,800 |

As shown in the example of Table 2, Table 2 represents a required data rate according to a resolution, a frame, and a compress. Referring to Table 2, according to one exemplary embodiment, the processor 120 may control a desired data capacity by a compress rate of 1/3, 1/4, and 1/5. Also, according to one exemplary embodiment, the processor 120 may adjust the data capacity by adjusting a frame of 30 frames per second (fps), 60 fps, etc. as well. In accordance with various exemplary embodiments, on the assumption that the data capacity is 10 Gbps, the processor 120 may support like a marked (or hatched) portion of Table 1 by each compress rate and frame count. According to one exemplary embodiment, the processor 120 may process RAW data by non-compression up to FHD, and ma process higher high resolution QHD, UHD and 8K data by loss-less compression. Also, according to various exemplary embodiments, in addition to a compression scheme, the processor 120 may change the existing frame rate (e.g., change a 60 fps video into a 30 fps video) to decrease the data capacity, for transmission as well.

According to various exemplary embodiments, the processor 120 may adjust the data capacity by adjusting audio data. For example, the processor 120 may adjust the data capacity by selecting a compress rate through a codec for various audio qualities as in Table 3 below.

TABLE 3

| Audio quality | Compression |
|---|---|
| 32 kbps | AM quality |
| 96 kbps | FM quality |
| 192 kbps | DAB (digital audio broadcasting) quality |
| 224~320 kbps | CD quality |
| 96~640 kbps | Bitrate range of Dolby Digital (AC3) standard among loss data compression |
| 1,536 kbps | DTS (digital theater system), PCM sound format of compact disk-digital audio |
| 6,000 kbps | Maximum Bitrate range of DTS-HD High Resolution AUDIO standard among loss data compression |
| 18,000 kbps | Lossless data compression -> Maximum Bitrate of among Dolby TRUE HD standard (VBR) |
| 24,500 kbps | Lossless data compression -> Maximum Bitrate of DTS-HD MASTER AUDIO standard (VBR) |

In various exemplary embodiments, as in the example of Table 3, the processor 120 may, for example, select a compress rate in accordance with each scheme of an audio codec in Table 4 below. This may be a scheme of selecting the codec to select the compress rate, and decide the data capacity correspondingly to this.

TABLE 4

| | | Data compression implementation and compression software | |
|---|---|---|---|
| Video codec | Loss | MPEG-4 ASP | 3ivx, DivX, FFmpeg MPEG-4, HDX4, Xvid |
| | | H.264/MPEG-4 AVC | CoreAVC, HDX4, QuickTime H.264, x264 |
| | | etc | Cinepak, FFmpeg, Dirac, Indeo, VP3, VP7, Pixlet, Tarkin, Theora, WMV |
| | Lossless | CorePNG, FFV1, Huffyuv, Lagarith, MSU Lossless | |
| Audio codec | Normal | Dolby Digital, ADPCM, ATRAC, Musepack, TwinVQ, Vorbis, WMA | |
| | Pronunciation/ Voice | iLBC, IMBE, iSAC, QCELP, Speex | |
| | Lossless | Apple Lossless, Dolby TRUE HD, DTS-HD Master Audio (MA), OptimFROG, FLAC, APE, TTA, WavePack, WMA Lossless | |
| Compression software | Open source | 7-Zip, File Roller, KGB, PeaZip, The Unarchiver | |
| | Freeware | DaZip, Bandizip, Bbangzip, KongZip, DGCA, FilZip, GCA, IZArc, TUGZip, Zipeg, ZipGenius | |
| | Common use | ALZip, PowerArchiver, BOMArchiveHelper, MacBinary, Squeez, Stuffit, V3 Zip, WinAce, WinRAR, WinRK, WinZip | |
| | Command line | ARC, ARJ, JAR, bzip2, compress, gzip, Infor-ZIP, LHA, lzop, NABOB, PAQ, PKZIP, RAR, SBC, UPX | |

In various exemplary embodiments, the processor 120 may adjust the entire capacity including a video and a voice, by suitably selecting context in accordance with at least a part of formats of several schemes, video and voice codec or the like illustrated in the example of Table 4.

According to various exemplary embodiments, the processor 120 may adjust the capacity through separation and processing by circuitry (e.g., a core, a processor, a communication resource, etc.) of the electronic device 400. Examples thereof will be described with reference to the drawings.

Figure 16:
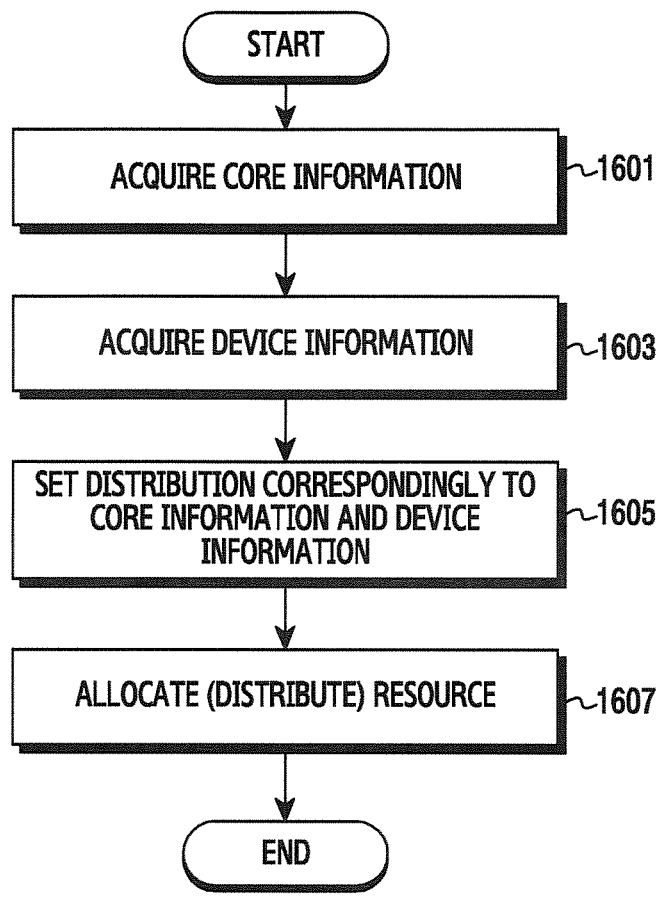
FIG. 16 illustrates a flowchart of allocating a resource in an electronic device according to various exemplary embodiments of the present disclosure.

FIG. 16 illustrates a flowchart of allocating a resource in an electronic device according to various exemplary embodiments of the present disclosure.

As illustrated in FIG. 16, FIG. 16 may represent an example of a case of separating and processing by core of the processor 120 of the electronic device 400.

Referring to FIG. 16, in operation 1601, the processor 120 can acquire core information about the processor 120. In various exemplary embodiments, the core information may include the number of cores of the processor 120, clock set information (e.g., CPU clock information) or the like.

In operation 1603, the processor 120 may acquire device information related to the external device 600. For example, the processor 120 may acquire the number of external devices 600 connected to the docking station 500, the type (ability) of the external device 600 and the like through the docking station 500. Or, at initial connection with the docking station 500, the processor 120 may extract the device information about the external device 600 that is acquired through the docking station 500 and is stored in the electronic device 400.

In operation 1605, the processor 120 may set distribution for a process correspondingly to the core information and the device information. For example, the processor 120 may differentially distribute an available resource to each of the existing process and a new process, in consideration of the core information and the device information.

In operation 1607, the processor 120 may allocate (distribute) the resource that will process the process on the basis of the distribution setting.

In accordance with various exemplary embodiments, an operation of separating and processing by core may be achieved as follows. For example, the electronic device 400 may acquire the number of cores of the internal processor 120, clock set information and the like, and receive the characteristic of a supportable external device through the docking station 500. Thereafter, the electronic device 400 may decide an operating method based on the device information of the external device 600. According to one exemplary embodiment, the electronic device 400 may detect the number and capacities of current available cores of the electronic device 400 and check the supportable performance of each external device 600. Next, the electronic device 400 may proceed with the core distribution setting by external device 600. For example, it is assumed that the number of cores of the processor 120 of the electronic device 400 is totally eight, and the number of available cores is six, and it is assumed that the number of the external devices 600 (e.g., external display devices) is two. And, assuming that a 1st external display device supports FHD and a 2nd external display device supports wide quad HD (WQHD), the electronic device 400 may allocate two cores to the 1st external display device and allocate four cores to the 2nd external display device. At this time, each core of the electronic device 400 may be different in performance, so the electronic device 400 may change and allocate the number of cores in accordance with the performance of the core.

In various exemplary embodiments, in case where the number and capacities of cores of the electronic device 400 fail to satisfy the performance of the connected external device 600, for example, in case where a throughput decreases due to a limitation of a load, etc. of a network or the electronic device 400 during the display processing, the electronic device 400 may keep the performance of the external device 600 by downscaling transmission data as well. This is made available in a method of reducing or compressing data as mentioned above.

Figure 17:
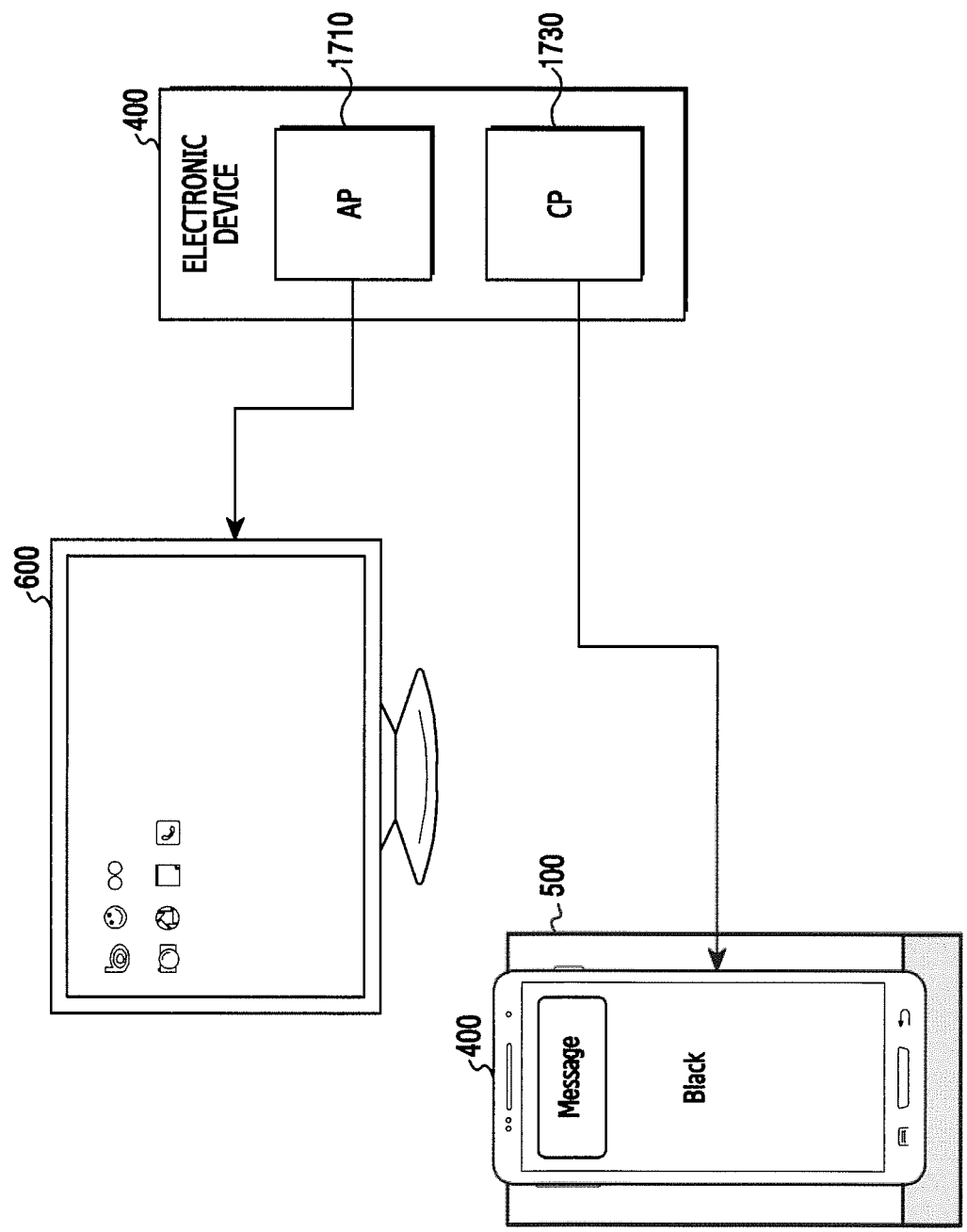
FIG. 17 illustrates a diagram of allocating a resource in an electronic device according to various exemplary embodiments of the present disclosure.

FIG. 17 illustrates a diagram of allocating a resource in an electronic device according to various exemplary embodiments of the present disclosure.

As illustrated in FIG. 17, FIG. 17 may represent an example of a case of separating and processing by processor (e.g., an AP and a CP).

Referring to FIG. 17, distinguishing processors (e.g., AP 1710 and CP 1730) and separating and processing processes may be carried out in a similar way with the aforementioned separating of the cores. For example, according to various exemplary embodiments, data may be processed by AP 1710 and CP 1730 in accordance with a quality of the data and the type thereof.

According to one exemplary embodiment, the AP 1710 and the CP 1730 all have cores and accordingly may separate and process the same type of data, but all the data may converge (or be concentrated) on the AP 1710. Accordingly, in various exemplary embodiments, to decrease a load of the electronic device 400, a simple work may be enabled to be processed in the CP 1730. For example, in case where video data is transmitted through the external device 600, works such as message (e.g., short message service (SMS)) reception or calling may be enabled to be immediately processed in the CP 1730 without needing to go through the AP 1710.

In one example, as illustrated in FIG. 17, the AP 1710 may be used to transmit video data to the external device 600 connected with the docking station 500, and the CP 1730 may be used to immediately display a simple work such as an SMS, etc. in the electronic device 400. By doing so, the electronic device 400 may efficiently process a resource of the electronic device 400.

Figure 18:
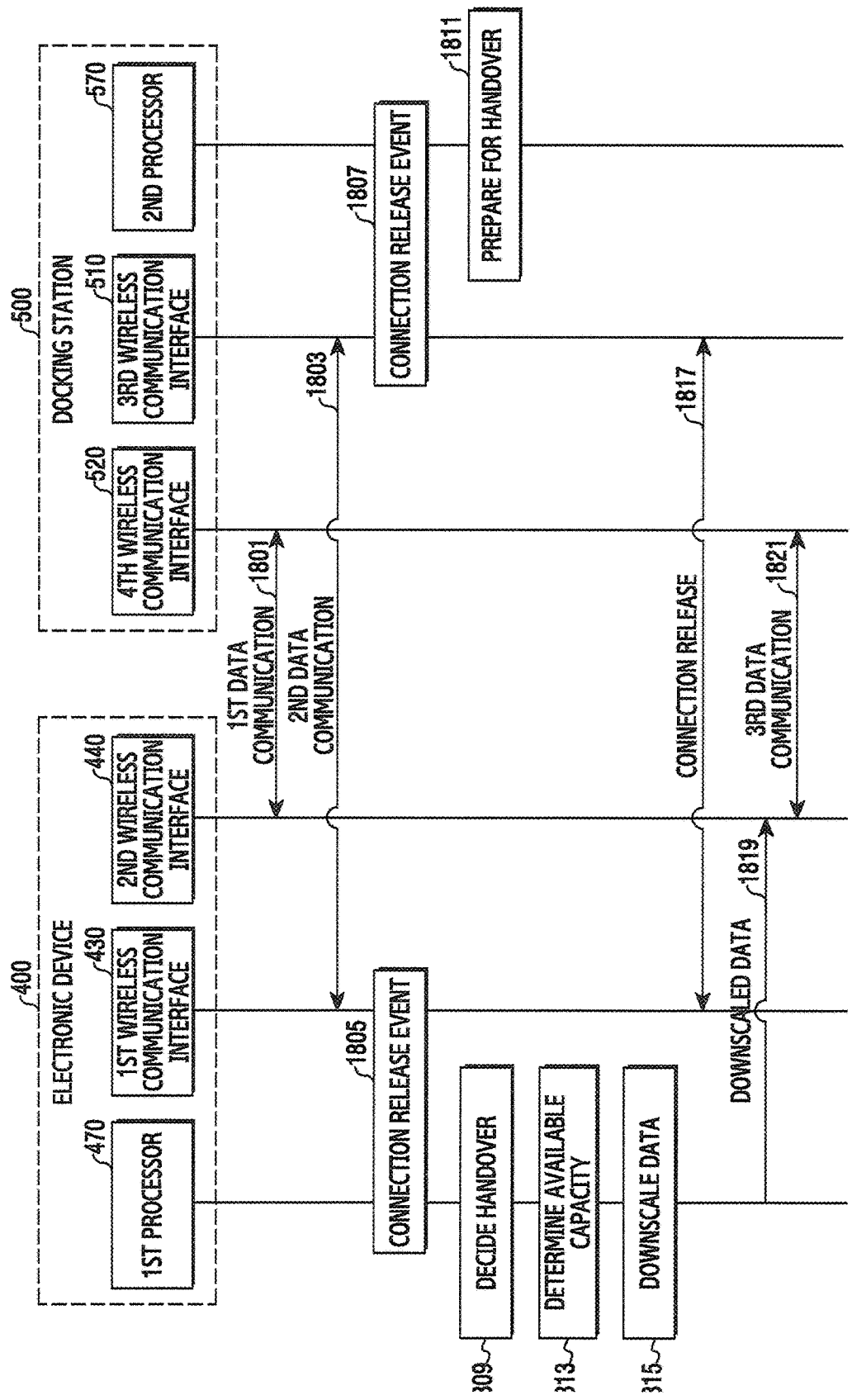
FIG. 18 illustrates a diagram of allocating a resource in a system according to various exemplary embodiments of the present disclosure.

FIG. 18 illustrates a diagram of allocating a resource in a system according to various exemplary embodiments of the present disclosure.

As illustrated in FIG. 18, FIG. 18 may represent an example of a case of separating and processing by communication resource. FIG. 18 illustrates the electronic device 400 and the docking station 500 connected with the electronic device 400 as an example, but an operation according to FIG. 18 may be carried out even between the electronic device 400 and the external device 600. For example, in FIG. 18, the docking station 500 may be replaced with the external device 600 as well.

Referring to FIG. 18, in operation 1801, the electronic device 400 and the docking station 500 may perform 1st data communication by 2nd wireless communication (e.g., BT, WiGig, WiFi, etc.). And, in operation 1803, the electronic device 400 and the docking station 500 may perform 2nd data communication by 1st wireless communication (e.g., ultra high speed close proximity communication). According to one exemplary embodiment, the electronic device 400 may transmit 2nd data through a 1st wireless communication interface 430, and may transmit 1st data through a 2nd wireless communication interface 440. The docking station 500 may receive the 2nd data through a 3rd wireless communication interface 510, and may receive the 1st data through a 4th wireless communication interface 520. In accordance with various exemplary embodiments, the 1st data and the 2nd data may be data into which one piece of data is split in accordance with resource allocation, or may be mutually different pieces of data.

In operation 1805 and operation 1807, a 1st processor 470 of the electronic device 400 and a 2nd processor 570 of the docking station 500 may sense the occurrence of a connection release event. For example, in case where a distance between the electronic device 400 and the docking station 500 becomes distant greater than a communication-available distance, the 1st processor 470 of the electronic device 400 may judge a release of connection with the docking station 500. Also, in case where the distance between the docking station 500 and the electronic device 400 becomes distant greater than the communication-available distance, the 2nd processor 570 of the docking station 500 may judge a release of connection with the electronic device 400.

In operation 1817, the electronic device 400 and the docking station 500 may be connection released. In accordance with various exemplary embodiments, the connection release between the electronic device 400 and the docking station 500 may be automatically made at a time point of being out of a supportable distance.

In operation 1809, the 1st processor 470 may decide handover for data that is being transmitted using the 1st wireless communication interface 430. For example, the 1st processor 470 may decide the handover to seamlessly transmit, through the 2nd wireless communication using the 2nd wireless communication interface 440, the data that is being transmitted through the 1st wireless communication using the 1st wireless communication interface 430.

In operation 1811, the 2nd processor 570 may prepare handover for data that is being received using the 3rd wireless communication interface 510. For example, the 2nd processor 570 may prepare the handover to seamlessly receive, through the 2nd wireless communication using the 4th wireless communication interface 520, the data that is being received through the 1st wireless communication using the 3rd wireless communication interface 510.

In operation 1813, the 1st processor 470 can determine an available capacity. For example, the 1st processor 470 may determine a capacity that is available to be processed in a 2nd wireless communication scheme.

In operation 1815, the 1st processor 470 may downscale data that is being transmitted with performance corresponding to the 1st wireless communication, into data of performance corresponding to the 2nd wireless communication. For example, the 1st processor 470 may downscale the existing data by FHD, high compression or the like.

In operation 1819, the 1st processor 470 may process to transmit the downscaled data to the docking station 500 through the 2nd wireless communication using the 2nd wireless communication interface 440. In accordance with various exemplary embodiments, for example, in case where the data according to the 1st data communication and the data according to the 2nd data communication are mutually different data, the 1st processor 470 may process to maintain data transmission according to the 2nd data communication using the 2nd wireless communication interface 440 while transmitting the downscaled data. Or, for example, in case where the data according to the 1st data communication and the data according to the 2nd data communication are the same data and are data that are split according to resource distribution, the 1st processor 470 may process to combine the data that uses the 2nd wireless communication interface 440 with the data that uses the 1st wireless communication interface 430, and downscale the combined data, and transmit the downscaled data as one piece of data.

In operation 1821, the electronic device 400 and the docking station 500 may perform 3rd data communication by the 2nd wireless communication. According to one exemplary embodiment, the electronic device 400 may transmit 3rd data independently or as one piece of data by the 2nd wireless communication through the 2nd wireless communication interface 440. The docking station 500 may receive the 3rd data by the 2nd wireless communication through the 4th wireless communication interface 520.

According to various exemplary embodiments, connection is basically made between the electronic device 400 and the docking station 500 by the 1st wireless communication (e.g., ultra high speed close proximity communication). And, in addition to this, additional communication such as the 2nd wireless communication (e.g., BT, WiGig, WiFi, etc.) may be further configured and connected to enhance the usability of the electronic device 400. This addition communication connection may be made between the electronic device 400 and the docking station 500, or between the electronic device 400 and the external device 600, or between the docking station 500 and the external device 600. And, the connection between the respective devices may be given a sub assistance as well. And, in case where main connection (e.g., connection of the 1st wireless communication) is temporarily released (e.g., in case where the docking station 500 and the electronic device 400 are far away for a while), instead of the 1st wireless communication (e.g., ultra high speed close proximity communication), the 2nd wireless communication may be used to maintain the connection, and may assist in advance a contact process of the 1st wireless communication and wireless charging as well.

According to one exemplary embodiment, in case where a 2nd wireless communication scheme is WiFi, the electronic device 400 may support maximum 150 Mbps that is the currently most widely used 802.11n WiFi standard. If supporting MIMO, for example, the electronic device 400 may support 600 Mbps to the maximum. In this case, the electronic device 400 may transmit and process HD video data or FHD compression data.

According to one exemplary embodiment, in case where the 2nd wireless communication scheme is WiGig, the electronic device 400 may provide a data rate similar to a data rate of the 1st wireless communication (e.g., ultra high speed close proximity communication). For example, the WiGig may support maximum 7 Gbps, and may have very high linearity and directivity. According to various exemplary embodiments, the 1st wireless communication (e.g., ultra high speed close proximity communication) and the 2nd wireless communication (e.g., WiGig) are connected together, for example, to guarantee twice data rate and exhibit a synergy effect as well. In accordance with one exemplary embodiment, as mentioned above, the electronic device 400 may more smoothly support an 8K moving picture or a UHD moving picture. Or, even in case where a contact between the electronic device 400 and the docking station 500 is released and thus the 1st wireless communication is disconnected and only the 2nd wireless communication (e.g., WiGig) performs data transmission, the electronic device 400 may transmit constant data without any problems within a constant area.

According to one exemplary embodiment, in case where the 2nd wireless communication scheme is Bluetooth or other communication schemes, the electronic device 400 may be hard to provide a large size video due to a capacity limit. However, the electronic device 400 may play a role of using the 2nd wireless communication to transmit voice data, or enabling the 2nd wireless communication to more smoothly assist the connection of the 1st wireless communication or extend the usability of the electronic device 400. For example, in case where the contact between the electronic device 400 and the docking station 500 is released using BLE, the electronic device 400 may use the 2nd wireless communication scheme for assisting in detecting user's intentions about whether to immediately again connect or completely release the contact as well.

In accordance with various exemplary embodiments, for the purpose of the efficient use of the aforementioned communication method that uses the 1st wireless communication and the 2nd wireless communication in parallel, the electronic device 400 may employ a method of increasing a data rate by performing data communication in combination of the 1st wireless communication and the 2nd wireless communication, and a method of enabling the 2nd wireless communication to assist the 1st wireless communication to keep maintaining connection between the electronic device 400 and the docking station 500. For example, even in case where a contact between the electronic device 400 and the docking station 500 has been released, when the electronic device 400 performs handover for a corresponding communication means so as to keep transmitting video data by the 1st wireless communication, the seamless handover may be performed. This example will be described with reference to FIG. 19.

Figure 19:
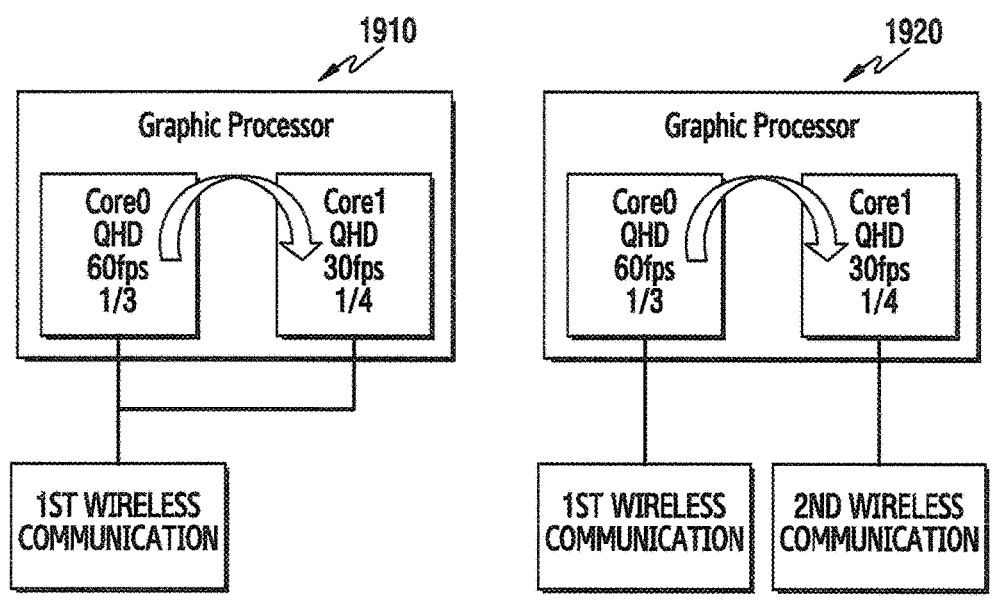
FIG. 19 illustrates a diagram of allocating a resource in an electronic device according to various exemplary embodiments of the present disclosure.

FIG. 19 illustrates a diagram of allocating a resource in an electronic device according to various exemplary embodiments of the present disclosure.

Referring to FIG. 19, as illustrated in an example 1910, in case where the electronic device 400 fails to keep a 2 Gbps class due to the change of a network environment in course of processing QHD video data and performing communication by 1st wireless communication at a Core0 of a graphic processor, a case where the electronic device 400 stops displaying the video data may occur. Accordingly, in various exemplary embodiments, as illustrated in an example 1920, the electronic device 400 may use 2nd wireless communication. For example, the electronic device 400 may downscale and process the existing video data by FHD, high compression, etc. at a Core1, and while monitoring the Core0, when smooth processing is not performed at the Core0, the Core0 is shifted to the Core1 to maintain the displaying of the video data. At this time, a communication means may be kept as the same means, and may perform handover to another means as well.

In various exemplary embodiments, the electronic device 400 may configure a profile suitable to context to correspond to an available scenario, at the time of data transmission among the electronic device 400, the docking station 500 and the external device 600 through the aforementioned several methods.

For example, referring to FIG. 19, FIG. 19 may represent an example of an operating scheme of a case where a new process (e.g., a process using WiFi) occurs in course of performing data transmission by 1st wireless communication. As illustrated in FIG. 19, the existing profile may be divided into two profiles (e.g., a profile 1 and a profile 2 of FIG. 8), to support 1st wireless communication (e.g., ultra high speed close proximity communication) and 2nd wireless communication (e.g., WiFi communication) respectively. According to one exemplary embodiment, the example 1920 of FIG. 19 is an example of dividing and processing a system (e.g., Core0 and Core1), a frame rate (e.g., 30 fps and 60 fps), a compress rate, etc. in accordance with a communication scheme. This case may be a case of distributing the profile in accordance with the communication scheme. The profile may be distributed and used even in accordance with the system, a data transmission scheme, etc. in accordance with context Various exemplary embodiments using a profile by various scenarios will be described below with reference to the accompanying drawings. In various exemplary embodiments, there may be several actual contexts in which a new process is added and accordingly to this, the profile may be variously configured and provided.

Figure 20:
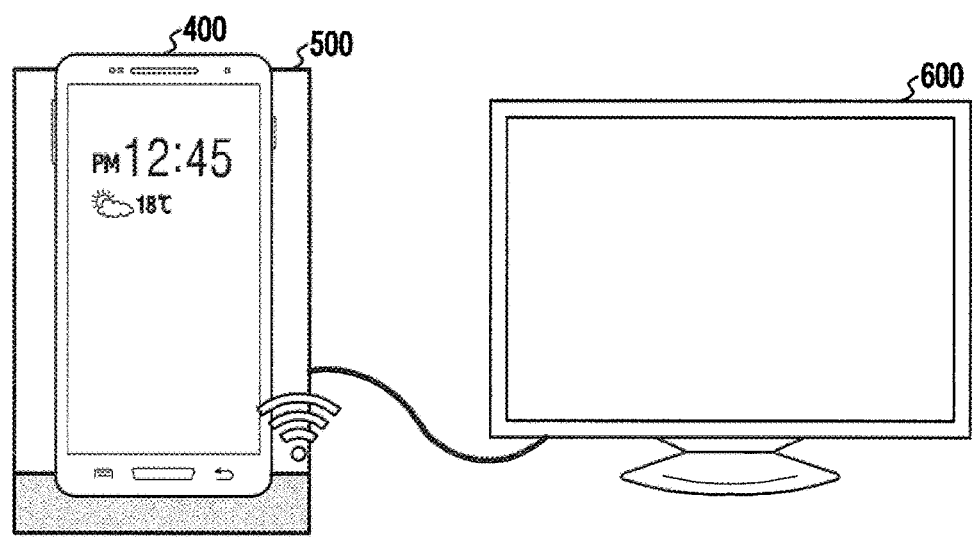
FIG. 20 illustrates a diagram of processing in a system according to various exemplary embodiments of the present disclosure.

FIG. 20 illustrates a diagram of processing a process in a system according to various exemplary embodiments of the present disclosure.

Referring to FIG. 20, FIG. 20 may represent a scenario of a case where a connection between the electronic device 400 and the docking station 500 is released in case where the electronic device 400 receives a call event in course of interworking with the external device 600 and displaying video data of the electronic device 400 through the external device 600.

As illustrated in FIG. 20, in a state where the electronic device 400 gets in contact with the docking station 500 and the external device 600 is connected to the docking station 500, data of the electronic device 400 may be forwarded to the external device 600 through the docking station 500 and be displayed through the external device 600. In this state, if a call is received by the electronic device 400 and a user answers with directly picking up the electronic device 400, a connection of 1st wireless communication (e.g., ultra high speed close proximity communication) between the electronic device 400 and the docking station 500 is disconnected. Accordingly, in various exemplary embodiments, to keep displaying the data using the external device 600, the electronic device 400 and the docking station 500 may maintain data communication using available 2nd wireless communication.

For example, it may be a state where the electronic device 400 and the docking station 500 communicate with each other by the 1st wireless communication (e.g., ultra high speed close proximity communication), and the docking station 500 and the external device 600 communicate with each other by a wired connection such as an HDMI, a display port (DP), etc. In this state, if an event of releasing the 1st wireless communication connection between the electronic device 400 and the docking station 500 takes place, the electronic device 400 and the docking station 500 may communicate with each other through the 2nd wireless communication (e.g., WiFi, WiGig, etc.), and the docking station 500 and the external device 600 may maintain the existing connection scheme in accordance with a new process.

According to one exemplary embodiment, the docking station 500 may include a related communication interface for supporting the 2nd wireless communication (e.g., WiFi, WiGig and/or the like). The electronic device 400 and the docking station 500 may not only connect with each other using the 1st wireless communication at mutual initial connection, but also may set up even a connection corresponding to the 2nd wireless communication. Thereafter, in case where a contact release between the electronic device 400 and the docking station 500 takes place due to a specific event, the electronic device 400 and the docking station 500 may release the 1st wireless communication and activate the connection of the 2nd wireless communication, thereby performing an operation of making even a phone call while transmitting the data to the external device 600 through the docking station 500.

Figure 21:
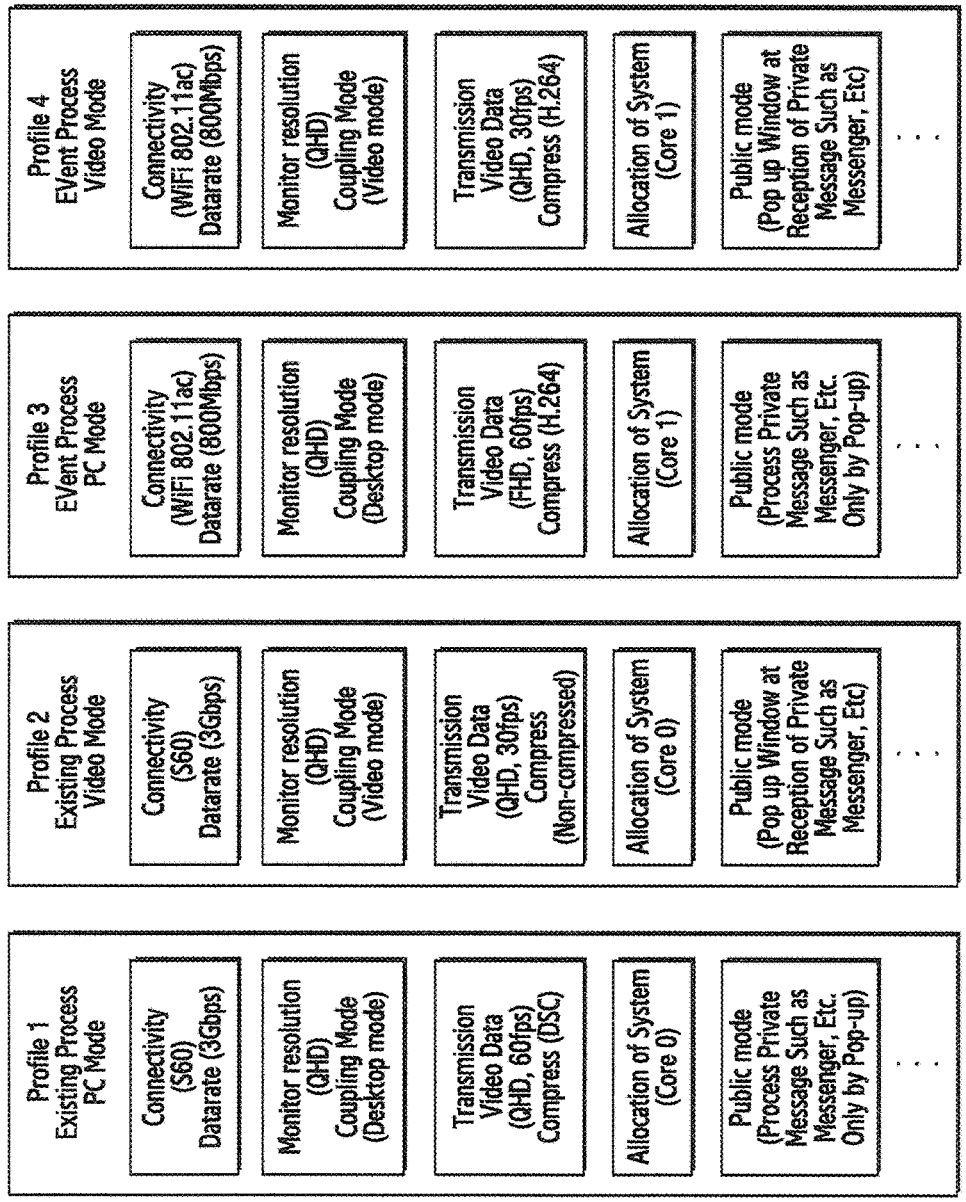
FIG. 21 illustrates a diagram of a profile for processing in an electronic device according to various exemplary embodiments of the present disclosure.

FIG. 21 illustrates a diagram of a profile for processing in an electronic device according to various exemplary embodiments of the present disclosure.

Referring to FIG. 21, in various exemplary embodiments, the electronic device 400 may configure one or more profiles (e.g., a profile 1, a profile 2, a profile 3, a profile 4, etc.) in consideration of various contexts such as a connection scheme between at least two or more devices among the electronic device 400, the docking station 500 or the external device 600, the abilities (performance) of the respective devices, an operation mode (state) of the electronic device 400, the type of a process, the type of transmission video data, etc. According to various exemplary embodiments, the electronic device 400 may configure the profiles in real-time, in consideration of the process executed by the electronic device 400 and the context of a time point of executing the process.

In accordance with one exemplary embodiment, the electronic device 400 may load the profile suitable to each context in course of processing a process. In various exemplary embodiments, the profile may variously decide and distinguish, for example, a communication means, a required data rate, a connected peripheral device or an environment thereof, transmission video data, an operation mode, a use environment, etc.

In accordance with one exemplary embodiment, the profile 1 illustrated in the example in FIG. 21 may represent a basic case used in a desktop mode (or a PC mode) as an example. In accordance with one exemplary embodiment, according to the profile 1, connectivity uses 1st wireless communication (e.g., S60) that is an ultra high speed close proximity communication scheme that uses a 60 GHz band. At this time, a data rate may be guaranteed up to 3 Gbps. Also, the profile 1 may define an outputtable resolution through the connected external device 600 (e.g., a monitor) and/or may define whether to operate in a desktop mode or whether to operate in a display mode through a peripheral device, etc. In accordance with one exemplary embodiment, to guarantee an optimized quality of service (QoS) in the desktop mode, the profile 1 may be set to use QHD, 60 fps, and display stream compression (DSC). Also, the profile 1 may enable a Core0 to perform related processing, thereby guaranteeing the best performance.

In accordance with one exemplary embodiment, unlike the profile 1, the profile 2 illustrated in the example of FIG.

21 may be an example that is set to decrease a frame rate to a video mode, not the desktop mode, and transmit non-compressed video data.

In accordance with one exemplary embodiment, the profile 3 illustrated in the example of FIG. 21 may be an example that is set to transmit video data through the 2nd wireless communication (e.g., WiFi) when an event of releasing the 1st wireless communication between the electronic device 400 and the docking station 500 (e.g., a connection release of the 1st wireless communication between the electronic device 400 and the docking station 500) occurs in the profile 1. In the profile 3, the video data is transmitted through the 2nd wireless communication, so the data rate may be guaranteed up to, for example, approximately 800 Mbps, and the video data may be transmitted with FHD, 60 fps and H.264 for the minimum QoS. Also, the electronic device 400 may minimize a load of the Core0, in preparation for when the electronic device 400 performs related processing at the Core1 and re-operates in the profile 1.

Figure 22:
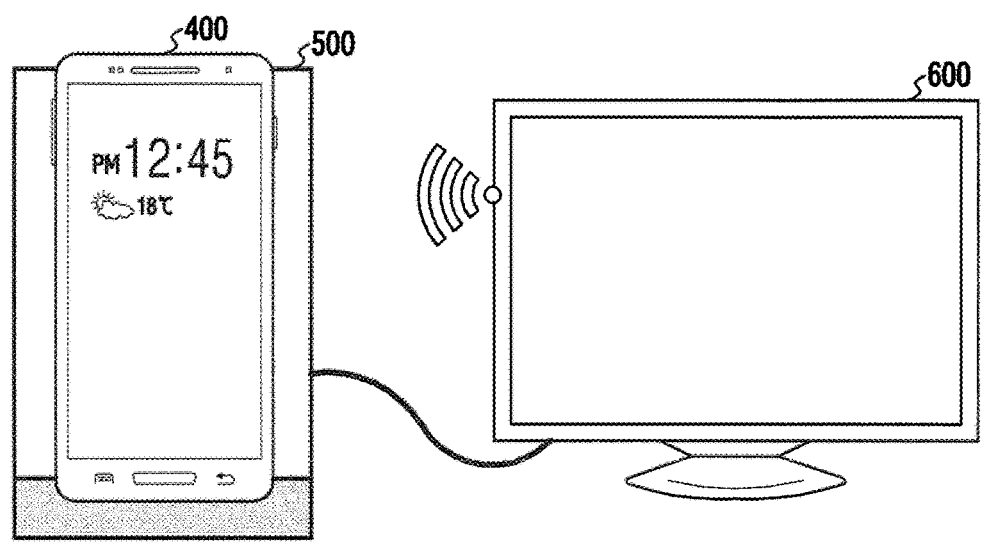
FIG. 22 illustrates a diagram of processing in a system according to various exemplary embodiments of the present disclosure.

FIG. 22 illustrates a diagram of processing in a system according to various exemplary embodiments of the present disclosure.

Referring to FIG. 22, FIG. 22 may represent a scenario of a case where a connection between the electronic device 400 and the docking station 500 is released when the electronic device 400 receives a call event in course of interworking with the external device 600 and displaying video data of the electronic device 400 through the external device 600. At this time, FIG. 22 may represent an example of a case where the docking station 500 does not support 2nd wireless communication (e.g., WiFi, WiGig, etc.), for example, does not include a related communication means (e.g., the 4th wireless communication interface 520) for the 2nd wireless communication. Also, FIG. 22 may represent a case where the external device 600 supports the 2nd wireless communication with the electronic device 400. Accordingly, the external device 600 may include a related communication means (e.g., a 5th wireless communication interface (not shown)) for the 2nd wireless communication.

As illustrated in FIG. 22, at initial connection with the docking station 500, the electronic device 400 may perform the connection using the 1st wireless communication (e.g., ultra high speed close proximity communication). And, the electronic device 400 may set up even a connection of the 2nd wireless communication (e.g., WiFi, WiGig, etc.) with the external device 600 (e.g., a display device), not with the docking station 500.

Thereafter, in case where a contact release between the electronic device 400 and the docking station 500 (e.g., a case where the electronic device 400 becomes distant away from the docking station 500 equal to or greater than a distance supporting the 1st wireless communication) occurs due to call incoming, the electronic device 400 may release the 1st wireless communication with the docking station 500 and immediately activate a connection of the 2nd wireless communication (e.g., WiFi, WiGig, etc.) with the external device 600. Through this, while making a phone call according to call incoming, the electronic device 400 may perform an operation of immediately transmitting data to the external device 600.

For example, it may be a state where, in accordance with the existing process, the electronic device 400 and the docking station 500 communicate with each other by the 1st wireless communication (e.g., ultra high speed close proximity communication), and the docking station 500 and the external device 600 communicate with each other by a wired connection such as an HDMI, etc. In this state, if an event of releasing a connection of the 1st wireless communication between the electronic device 400 and the docking station 500 takes place, in accordance with a new process, the electronic device 400 and the docking station 500 communicate with each other by the 2nd wireless communication (e.g., WiFi, WiGig, etc.), and the docking station 500 and the external device 600 may maintain the existing connection scheme.

According to various exemplary embodiments, the electronic device 400 may connect with a plurality of the external devices 600 (e.g., a 1st display device (e.g., a monitor) and a 2nd display device (e.g., a VR device)) through the docking station 500. In this context, regarding the occurrence of a new process, the electronic device 400 may define and apply a profile, suitably to corresponding operation context, a communication means and/or the like. This example is illustrated in FIG. 23.

Figure 23:
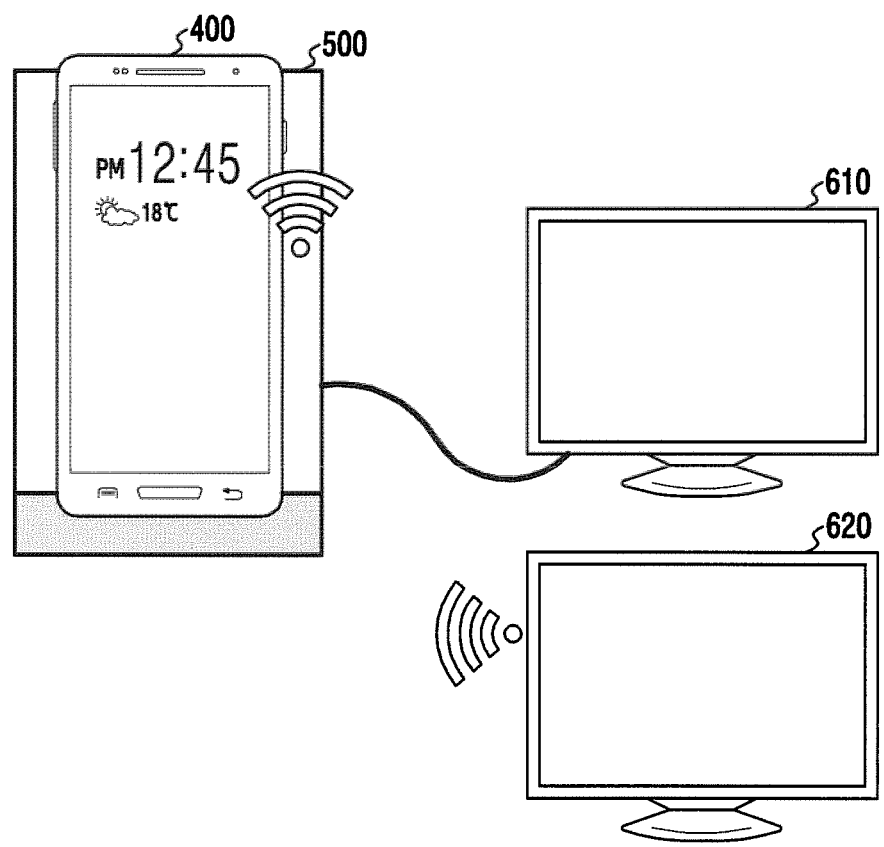
FIG. 23 illustrates a diagram of processing in a system according to various exemplary embodiments of the present disclosure.

FIG. 23 illustrates a diagram of processing in a system according to various exemplary embodiments of the present disclosure.

Referring to FIG. 23, it may be a state where the electronic device 400 gets in contact with the docking station 500, and a plurality of external devices 600 (e.g., a 1st external device 610 and a 2nd external device 620) are connected to the docking station 500. In this system, data of the electronic device 400 may be forwarded to at least one of the external devices 600 through the docking station 500 and be displayed in the at least one of the external devices 600. In this state, if the electronic device 400 receives a call and a user directly answers with picking up the electronic device 400, a connection of the 1st wireless communication (e.g., ultra high speed close proximity communication) between the electronic device 400 and the docking station 500 may be disconnected.

For example, it may be a state where the electronic device 400 and the docking station 500 communicate with each other by the 1st wireless communication (e.g., ultra high speed close proximity communication) or a wired connection such as a USB, etc., and the docking station 500 and the 1st external device 610 communicate with each other by a wired connection such as an HDMI, a DP, etc., in accordance with the existing process. In this state, if the new 2nd external device 620 is additionally connected to the docking station 500, the electronic device 400 and the docking station 500 may maintain the existing connection therebetween, and the docking station 500 and the 1st external device 610 may maintain the existing connection therebetween, and the docking station 500 and the 2nd external device 620 may connect with each other by 2nd wireless communication (e.g., WiFi, WiGig, etc.) or wired connection (e.g., an HDMI, a DP, etc.).

In accordance with one exemplary embodiment, in case where the majority of external devices 600 (e.g., the 1st external device 610 and the 2nd external device 620) are wiredly connected to the docking station 500, the electronic device 400 may forward data to the docking station 500, and the docking station 500 may reallocate a resource required for the respective external devices 600 (e.g., the 1st external device 610 and the 2nd external device 620).

In accordance with one exemplary embodiment, in case where the majority of external devices 600 (e.g., the 1st external device 610 and the 2nd external device 620) are wiredly and wirelessly connected to the docking station 500 respectively, the electronic device 400 may allocate a resource required for the respective external devices 600 and wiredly forward data to the 1st external device 610 through the docking station 500, and the electronic device 400 and the 2nd external device 620 may connect with each other by the 2nd wireless communication to perform an operation.

In accordance with one exemplary embodiment, in case where the majority of external devices 600 (e.g., the 1st external device 610 and the 2nd external device 620) are all wirelessly connected to the docking station 500, the electronic device 400 may decide (e.g., through WiGig beamforming) the external device for connecting, on the basis of the directivity of a wireless signal, and execute a process through the corresponding external device as well.

An example of a profile for a case where the majority of external devices 600 are connected to the docking station 500 as in FIG. 23 mentioned above is illustrated in FIG. 24.

Figure 24:
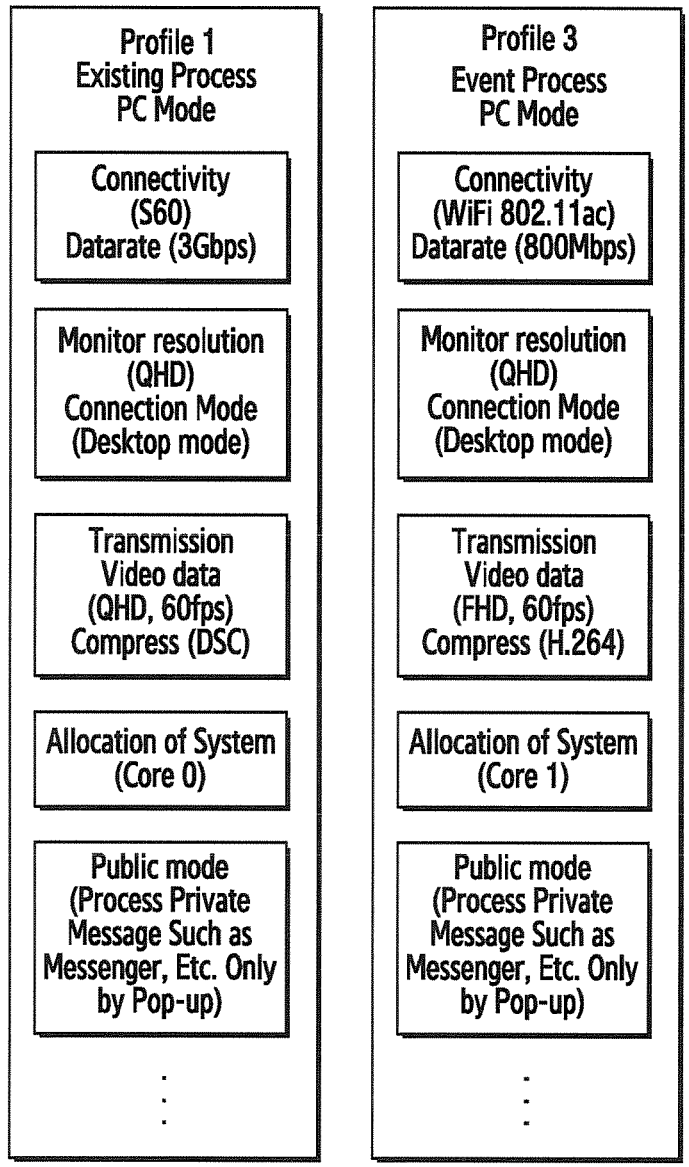
FIG. 24 illustrates a diagram of a profile for processing in a system according to various exemplary embodiments of the present disclosure.

FIG. 24 illustrates a diagram of a profile for processing in a system according to various exemplary embodiments of the present disclosure.

Referring to FIG. 24, an example of profiles (e.g., a profile 1 and a profile 3) illustrated in FIG. 24 is an example of context in which an additional external device (e.g., the 2nd external device 620) is connected to the docking station 500 as explained earlier with reference to FIG. 23. As illustrated in FIG. 24, the profile 1 may be loaded for the 1st external device 610 (e.g., a display 1), and the profile 3 may be loaded for the 2nd external device 620 (e.g., a display 2).

According to various exemplary embodiments, the electronic device 400 may correspond to the majority of external devices 600, to operate on the basis of the respective external devices 600 and two profiles (e.g., a profile 1 and a profile 2) corresponding to two PC modes. The electronic device 400 may allocate a resource to the respective external devices 600 on the basis of the profiles corresponding to the respective external device 600. Accordingly to this, the electronic device 400 may optimize the resource for the majority of external devices 600, and may transmit video data to the respective external device 600, and may provide the best usability of the electronic device 400 to a user.

The following description will be made for examples of an operation of again returning to previous context in accordance with the ending of a new process, in course of operations of the existing process and the new process in accordance with various exemplary embodiments.

Figure 25:
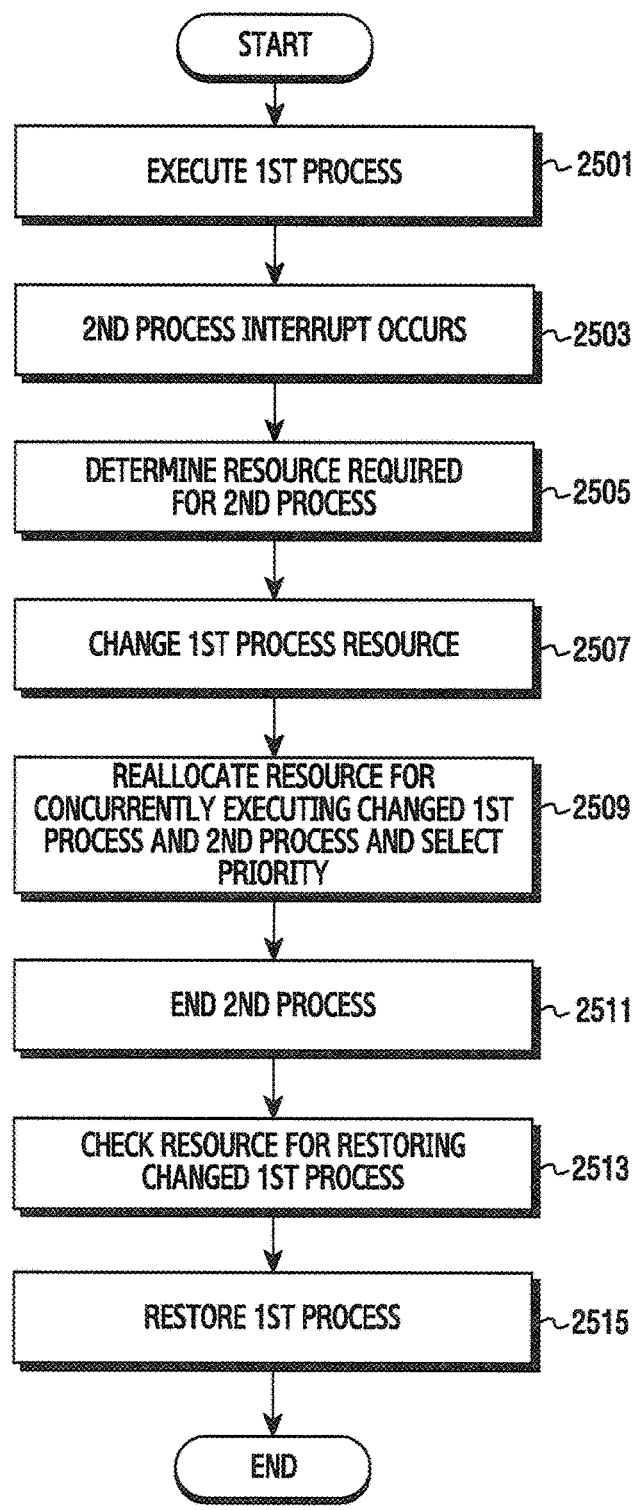
FIG. 25 illustrates a flowchart of processing in an electronic device according to various exemplary embodiments of the present disclosure.

FIG. 25 illustrates a flowchart of processing a process in an electronic device according to various exemplary embodiments of the present disclosure.

Referring to FIG. 25, in operation 2501, the processor 120 of the electronic device 400 may be in a state of executing a 1st process. For example, the processor 120 may be in a state of being executing a process of forwarding data to the docking station 500 using 1st wireless communication with the docking station 500.

In operation 2503, the processor 120 may sense the occurrence of an interrupt related to a 2nd process, in course of executing the 1st process. For example, the processor 120 may judge the occurrence or non-occurrence of the interrupt related to the 2nd process, in course of processing the 1st process. According to one exemplary embodiment, the processor 120 may sense the new 2nd process (e.g., call event reception, external device additional connection, etc.) other than the 1st process, in course of performing data communication according to the 1st process with the docking station 500.

In operation 2505, the processor 120 may determine a resource required for the 2nd process. For example, the processor 120 may judge the resource required for processing of the 2nd process, and determine the related resource.

In operation 2507, the processor 120 may change a scheme of processing the 1st process. For example, the processor 120 may change a 1st resource related to the processing of the 1st process, into a 2nd resource that excludes as much as a partial resource for allocating to the 2nd process from the 1st resource.

In operation 2509, the processor 120 may reallocate a resource for concurrently executing the changed 1st process and the 2nd process, and select the priority of the 1st process and the 2nd process. According to one exemplary embodiment, the processor 120 may distribute a resource related to the 1st process, to allocate (distribute) to the 2nd process as mentioned above. In accordance with one exemplary embodiment, after allocating the resource for processing the 1st process and the 2nd process, the processor 120 may select the priority of the 1st process and the 2nd process, and execute the 1st process and the 2nd process on the basis of the selected priority.

In operation 2511, the processor 120 may sense the ending of the 2nd process. For example, the processor 120 may sense the ending of the 2nd process, in course of processing the 1st process and the 2nd process on the basis of the reallocated resource. According to one exemplary embodiment, while executing the 1st process of transmitting video data to the external device 600 and the 2nd process of performing a phone call, the processor 120 may sense the ending of the 2nd process in accordance with the ending of the phone call.

In operation 2513, the processor 120 may check a resource for restoring the changed 1st process. According to one exemplary embodiment, the processor 120 may check a resource required for processing the 1st process in accordance with the existing resource (e.g., the 1st resource before changing into the 2nd resource).

In operation 2515, the processor 120 may restore the changed 1st process. For example, the processor 120 may allocate the original resource (e.g., the 1st resource) before change, to the 1st process, and process the 1st process.

As mentioned above with reference to FIG. 25, according to various exemplary embodiments, in a state where the electronic device 400 and the docking station 500 come close to each other and are executing the 1st process, the electronic device 400 may change a resource of the 1st process in accordance with the occurrence of the new 2nd process, and allocate a part of the resource to the 2nd process, and process each of the 1st process and the 2nd process. In accordance with various exemplary embodiments, in case where the electronic device 400 resumes the 1st process as the 2nd process is ended, the electronic device 400 may process the execution of the 1st process more seamlessly, and execute the 1st process more easily and quickly. For example, in response to the ending of the 2nd process, the electronic device 400 may again allocate the 1st process a resource that has been distributed to the 2nd process among a resource of the 1st process, to resume an operation of the 1st process.

Figure 26:
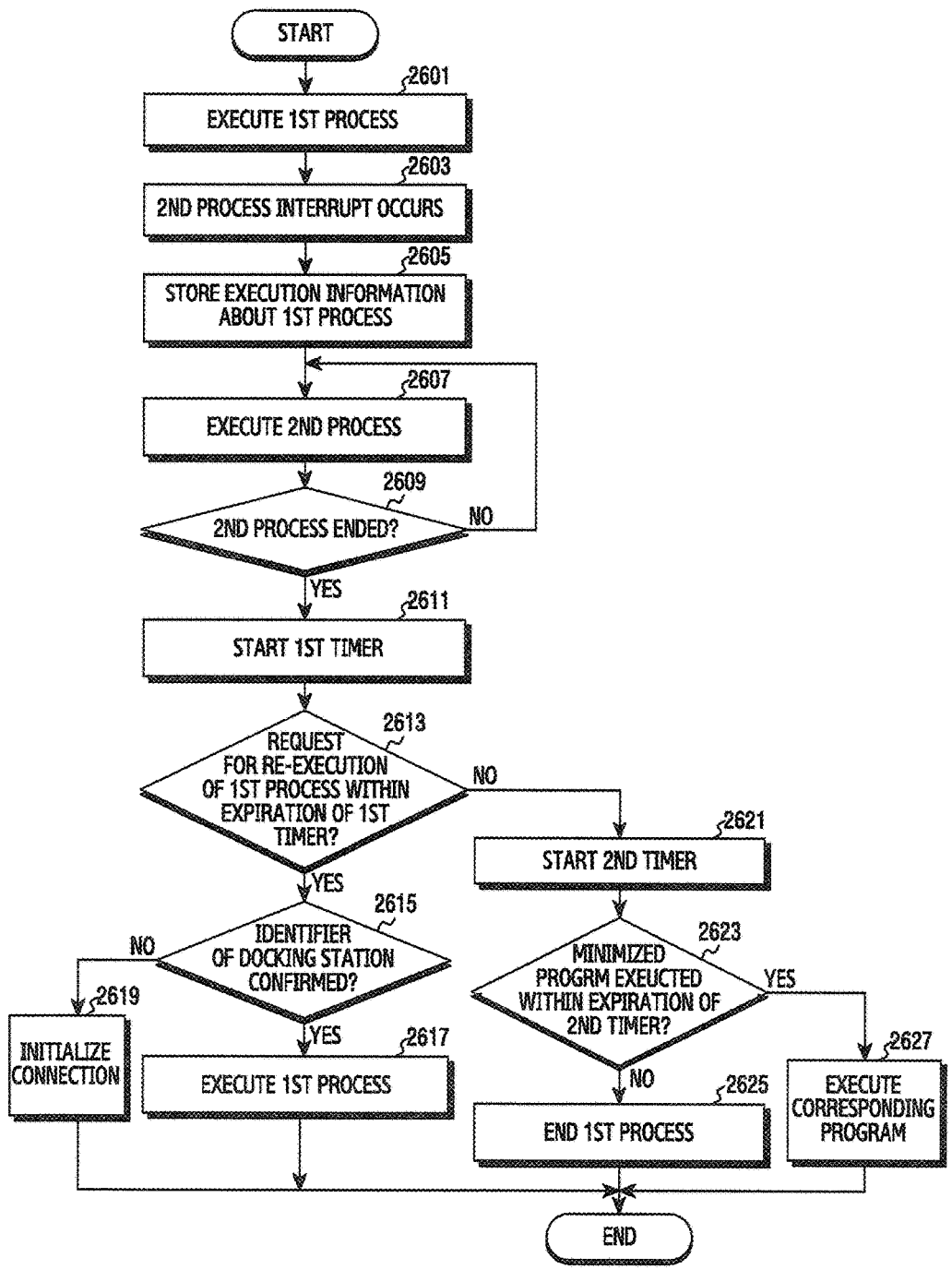
FIG. 26 illustrates a flowchart of processing in an electronic device according to various exemplary embodiments of the present disclosure.

FIG. 26 illustrates a flowchart of processing in an electronic device according to various exemplary embodiments of the present disclosure.

Referring to FIG. 26, in operation 2601, the processor 120 of the electronic device 400 may be in a state of executing a 1st process. For example, the processor 120 may be in a state of being executing a process of forwarding data to the docking station 500 using 1st wireless communication with the docking station 500.

In operation 2603, the processor 120 may sense the occurrence of an interrupt related to a 2nd process, in course of executing the 1st process. For example, the processor 120 may judge the occurrence or non-occurrence of the interrupt related to the 2nd process, in course of processing the 1st process. According to one exemplary embodiment, the processor 120 may sense the new 2nd process (e.g., call event reception, external device additional connection, etc.) other than the 1st process, in course of data communication according to the 1st process with the docking station 500.

In operation 2605, the processor 120 may store execution information about the 1st process. According to one exemplary embodiment, when the electronic device 400 and the docking station 500 come close to each other and are executing the 1st process, the processor 120 may stop the 1st process that is operating, in response to the occurrence of the new 2nd process. For example, while the electronic device 400 and the docking station 500 come close to each other and are transmitting data by the 1st wireless communication, the processor 120 may stop transmitting the data in accordance with a connection release between the electronic device 400 and the docking station 500. When the processor 120 stops the 1st process, the processor 120 may store the execution information about the 1st process (e.g., information of the 1st process (e.g., type, application, process stop time point information, etc.), an identifier of the docking station 500, a resource allocated to the 1st process, a profile or the like).

In operation 2607, the processor 120 may execute the 2nd process. For example, in response to an interrupt, the processor 120 may stop the 1st process, and execute the 2nd process. In accordance with various exemplary embodiments, as mentioned above, the processor 120 may execute the 2nd process on the basis of a profile related to the 2nd process.

In operation 2609, the processor 120 may judge the ending or non-ending of the 2nd process. For example, the processor 120 may sense the ending or non-ending of the 2nd process, in course of processing the 2nd process in a state of stopping the 1st process. According to one exemplary embodiment, while executing the 2nd process of performing a phone call in a state of stopping the 1st process of transmitting video data to the external device 600, the processor 120 may sense the ending of the 2nd process in accordance with the ending of the phone call.

If the ending of the 2nd process is not sensed in operation 2609 ("No" of operation 2609), the processor 120 may return to operation 2607, to process the execution of operation 2607 and subsequent operations.

If the processor 120 senses the ending of the 2nd process in operation 2609 ("Yes" of operation 2609), in operation 2611, the processor 120 may initiate a 1st timer. According to one exemplary embodiment, the processor 120 may initiate the 1st timer related with resuming of the 1st process. In various exemplary embodiments, the 1st timer may include a timer for counting a waiting time for resuming the existing process that has been stopped being executed. For example, the processor 120 may count, through the 1st timer, a time for resuming data transmission by the 1st wireless communication when the electronic device 400 and the docking station 500 come close to each other.

In operation 2613, the processor 120 may judge if there is a request for re-execution of the 1st process within the expiration of the 1st timer. For example, the processor 120 may judge if the electronic device 400 and the docking station 500 come close to each other within a supportable distance of the 1st wireless communication or if there is a request for resuming the existing 1st process, for example, data transmission from a user.

If the request for re-execution of the 1st process is sensed before the expiration of the 1st timer in operation 2613 ("Yes" of operation 2613), in operation 2615, the processor 120 may confirm an identifier of the docking station 500. For example, the processor 120 may confirm the identifier of the docking station 500 to which the electronic device 400 comes close, to judge if the confirmed identifier corresponds to an identifier of the docking station 500 connected to the existing 1st process. The processor 120 may confirm the identifier of the docking station 500 on the basis of the execution information that is stored when the processor 120 stops the 1st process.

If the identifier of the docking station 500 is confirmed in operation 2615 ("Yes" of operation 2615), in operation 2617, the processor 120 may execute the 1st process. For example, the processor 120 may process the fast execution of the 1st process by the existing resource from a time point of stopping the execution of the existing 1st process, on the basis of the stored execution information.

If the identifier of the docking station 500 is not confirmed in operation 2615 ("No" of operation 2615), the processor 120 may initialize connection. For example, the processor 120 may cancel a connection with the existing docking station 500, and reset a connection with a new docking station 500.

If the request for re-execution of the 1st process is not sensed within the expiration of the 1st timer in operation 2613 ("No" of operation 2613), in operation 2621, the processor 120 may initiate a 2nd timer. According to one exemplary embodiment, the processor 120 may initiate the 2nd timer related to maintaining a state (e.g., a session) of the 1st process. In various exemplary embodiments, the 2nd timer may include a timer for counting a waiting time for execution of a minimized program related to the 1st process. For example, the processor 120 may count, through the 2nd timer, a time for an input (request) for execution of the related program (e.g., an application related to data transmission or playback, etc.) for maintaining the state of the 1st process.

In operation 2623, the processor 120 may judge if there is a request for execution of a program within the expiration of the 2nd timer. For example, the processor 120 may judge if there is a request for execution of a minimized program related to the 1st process.

If the execution of the program is not sensed within the expiration of the 2nd timer in operation 2623 ("No" of operation 2623), in operation 2625, the processor 120 may end the 1st process.

If the execution of the program is sensed before the expiration of the 2nd timer in operation 2623 ("Yes" of operation 2623), in operation 2627, the processor 120 may execute the corresponding program.

In accordance with various exemplary embodiments, operation 2621, operation 2623 and operation 2627 may be selectively carried out as well. For example, in various exemplary embodiments, if the request for re-execution of the 1st process is not sensed within the expiration of the 1st timer as in operation 2613, the processor 120 may immediately proceed to operation 2625, to end the 1st process, without performing operation 2621, operation 2623 and operation 2627.

As described above with reference to FIG. 26, according to various exemplary embodiments, in a state where the electronic device 400 and the docking station 500 come close to each other and are executing the 1st process, the processor 120 may stop the 1st process in accordance with the occurrence of the new 2nd process, and execute the 2nd process. In accordance with various exemplary embodiments, in case where the 2nd process is ended, the processor 120 may execute the 1st process seamlessly fast. For example, at stopping of the 1st process, the processor 120 may store execution information related to the 1st process and, at ending of the 2nd process, the processor 120 may connect fast with the docking station 500 on the basis of the execution information, and resume fast an operation of the 1st process from a time point of stopping the 1st process. Also, in various exemplary embodiments, the processor 120 may wait for the restoring of the 1st process during a set time of the timer, to prevent unnecessary use of a resource.

Figure 27:
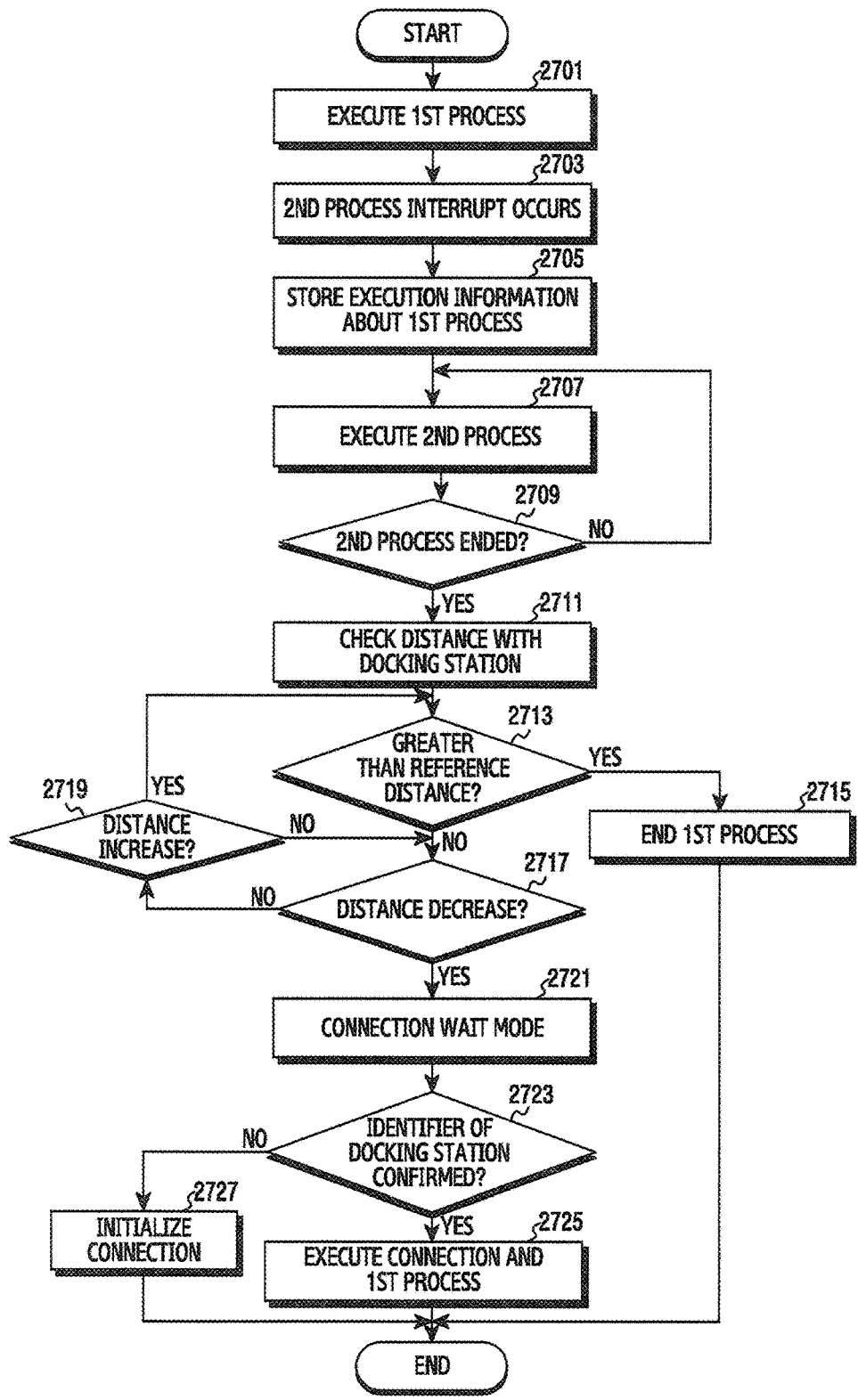
FIG. 27 illustrates a flowchart of processing in an electronic device according to various exemplary embodiments of the present disclosure.

FIG. 27 illustrates a flowchart of processing in an electronic device according to various exemplary embodiments of the present disclosure.

Referring to FIG. 27, in operation 2701, the processor 120 of the electronic device 400 may be in a state of executing a 1st process. For example, the processor 120 may be in a state of being executing a process of forwarding data to the docking station 500 using 1st wireless communication with the docking station 500.

In operation 2703, the processor 120 may sense the occurrence of an interrupt related to a 2nd process, in course of executing the 1st process. For example, the processor 120 may judge the occurrence or non-occurrence of the interrupt related to the 2nd process, in course of processing the 1st process. According to one exemplary embodiment, the processor 120 may sense the new 2nd process (e.g., call event reception, external device additional connection, etc.) other than the 1st process, in course of data communication according to the 1st process with the docking station 500.

In operation 2705, the processor 120 may store execution information about the 1st process. According to one exemplary embodiment, when the electronic device 400 and the docking station 500 come close to each other and are executing the 1st process, the processor 120 may stop the 1st process that is operating, in response to the occurrence of the new 2nd process. For example, while the electronic device 400 and the docking station 500 come close to each other and are transmitting data by the 1st wireless communication, the processor 120 may stop data transmission in accordance with a connection release of the electronic device 400 and the docking station 500. When stopping the 1st process, the processor 120 may store execution information about the 1st process (e.g., information of the 1st process (e.g., type, application, process stop time point information, etc.), an identifier of the docking station 500, a resource allocated to the 1st process, a profile or the like).

In operation 2707, the processor 120 may execute the 2nd process. For example, the processor 120 may stop the 1st process in response to the interrupt, and execute the 2nd process. In accordance with various exemplary embodiments, as mentioned above, the processor 120 may execute the 2nd process on the basis of a profile related to the 2nd process.

In operation 2709, the processor 120 may judge the ending or non-ending of the 2nd process. For example, the processor 120 may sense the ending or non-ending of the 2nd process, in course of processing the 2nd process in a state of stopping the 1st process. According to one exemplary embodiment, while executing the 2nd process of performing a phone call in a state of stopping the 1st process of transmitting video data to the external device 600, the processor 120 may sense the ending of the 2nd process in accordance with the ending of the phone call.

If the ending of the 2nd process is not sensed in operation 2709 ('No' of operation 2709), the processor 120 may return to operation 2707, to process the execution of operation 2707 and subsequent operations.

If the processor 120 senses the ending of the 2nd process in operation 2709 ('Yes' of operation 2709), in operation 2711, the processor 120 may check a distance with the docking station 500. For example, the processor 120 may discern a distance between the electronic device 400 and the docking station 500, by 2nd wireless communication (e.g., BLE communication) between the electronic device 400 and the docking station 500.

In operation 2713, the processor 120 may judge if a distance (hereinafter, a judgment distance) between the electronic device 400 and the docking station 500 is greater than a preset reference distance. In various exemplary embodiments, the reference distance may be set as a value that is the same as or greater than a communication distance (e.g., 10 cm) for setting the 1st wireless communication between the electronic device 400 and the docking station 500.

If it is judged that the judgment distance is greater than the reference distance in operation 2713 ("Yes" of operation 2713), in operation 2715, the processor 120 may end the 1st process. For example, if the judgment distance is greater than the reference distance, the processor 120 may judge that a connection between the electronic device 400 and the docking station 500 is released, and end an operation of the 1st process of, for example, transmitting video data based on the 1st wireless communication, etc.

If it is judged that the judgment distance is equal to or is less than the reference distance in operation 2713 ("No" of operation 2713), in operation 2717 and operation 2719, the processor 120 may track the distance between the electronic device 400 and the docking station 500, to judge if the distance decreases or increases. For example, the processor 120 may judge if it is a state where the distance between the electronic device 400 and the docking station 500 is decreasing (is approaching), or if it is a state where the distance between the electronic device 400 and the docking station 500 is increasing. In accordance with one exemplary embodiment, the processor 120 may judge whether the distance between the electronic device 400 and the docking station 500 decreases or increases, in accordance with a change (e.g., decrease or increase) of the judgment distance.

If the distance decrease is not sensed in operation 2717 ("No" of operation 2717), in operation 2719, the processor 120 may judge if the distance is increased or not. In accordance with various exemplary embodiments, if the processor 120 judges the distance increase in operation 2719 ("Yes" of operation 2719), the processor 120 may return to operation 2713 and process the execution of operation 2713 and subsequent operations. If the distance is not increased in operation 2719 ("No" of operation 2719) (e.g., if there is not a distance change), the processor 120 may return to operation 2717, to process the execution of operation 2717 and subsequent operations.

If the processor 120 senses the distance decrease in operation 2717 ("Yes" of operation 2717), in operation 2721, the processor 120 may operate in a connection wait mode. For example, the processor 120 may wait for fast connection of the 1st wireless communication between the electronic device 400 and the docking station 500. In accordance with one exemplary embodiment, the processor 120 may identify the docking station 500 on the basis of the execution information of the 1st process, and judge a previous progress state of the 1st process in order to continuously execute the 1st process as well.

In operation 2723, the processor 120 may confirm an identifier of the docking station 500. For example, the processor 120 may confirm an identifier of the docking station 500 to which the electronic device 400 comes close, to judge if the confirmed identifier corresponds to the identifier of the docking station 500 connected to the exiting 1st process. The processor 120 may confirm the identifier of the docking station 500 on the basis of the execution information that is stored when the processor 120 stops the 1st process.

If the identifier of the docking station 500 is confirmed in operation 2723 ("Yes" of operation 2723), in operation 2725, the processor 120 may execute connection with the docking station 500 and the 1st process. For example, on the basis of the stored execution information, the processor 120 may immediately perform the connection with the docking station 500, and process the fast execution of the 1st process by the existing resource from a time point of stopping the execution of the existing 1st process.

If the identifier of the docking station 500 is not confirmed in operation 2723 ("No" of operation 2723), the processor 120 may initialize the connection. For example, the processor 120 may cancel the connection with the existing docking station 500, and reset a connection with a new docking station 500.

As described above with reference to FIG. 27, according to various exemplary embodiments, in a state where the electronic device 400 and the docking station 500 come close to each other and are executing the 1st process, the processor 120 may stop the 1st process in accordance with the occurrence of the new 2nd process, and execute the 2nd process. In accordance with various exemplary embodiments, if the 2nd process is ended, the processor 120 may execute the 1st process seamlessly fast. For example, at stopping of the 1st process, the processor 120 may store execution information related to the 1st process and, at ending of the 2nd process, the processor 120 may connect fast with the docking station 500 on the basis of the execution information, and resume fast an operation of the 1st process from a time point of stopping of the 1st process. Also, in various exemplary embodiments, the processor 120 may discern a distance between the electronic device 400 and the docking station 500 through a beacon scheme (e.g. BLE communication) and, by using this, may decide fast the ending or non-ending of the stopped 1st process or the resuming or non-resuming thereof.

Also, in various exemplary embodiments, in a similar scheme with FIG. 27, the processor 120 may judge and predict the distance between the electronic device 400 and the docking station 500 with a criterion of another received signal strength (e.g., RSSI) value between the electronic device 400 and the docking station 500, to judge the ending or resuming of a process as well. Also, in various exemplary embodiments, FIG. 25, FIG. 26 and FIG. 27 related to the ending or resuming of the process have been described independently, but various exemplary embodiments are not limited to this. For example, the processor 120 may perform an operation related to the ending or resuming of the process in parallel or in sequence by at least one combination of FIG. 25, FIG. 26 or FIG. 27 as well.

As described above, a method for operating in an electronic device 400 according to various exemplary embodiments may include connecting with another electronic device by 1st wireless communication, using a 1st wireless communication interface, executing a 1st process with another electronic device on the basis of the 1st wireless communication, sensing a 2nd process during the execution of the 1st process, allocating a resource for processing the 1st process and the 2nd process, in accordance with a corresponding profile, and processing at least one process among the 1st process or the 2nd process on the basis of the allocated resource.

In accordance with various exemplary embodiments, the 1st wireless communication may include high speed close proximity communication, and the 2nd wireless communication may include one or more wireless communication other than the 1st wireless communication.

In accordance with various exemplary embodiments, processing the at least one process may include, when sensing the 2nd process during the execution of the 1st process, executing connection of the 2nd wireless communication with another electronic device, in accordance with a connection state of the 1st wireless communication.

In accordance with various exemplary embodiments, processing the at least one process may include executing the 1st process with another electronic device, on the basis of the 2nd wireless communication that use the 2nd wireless communication interface, in accordance with a connection state of the 1st wireless communication with another electronic device.

In accordance with various exemplary embodiments, processing the at least one process may include, when the connection with another electronic device is released, changing the 1st process to correspond to the 2nd wireless communication, and executing the changed 1st process with another electronic device, using the 2nd wireless communication interface.

In accordance with various exemplary embodiments, processing the at least one process may include maintaining, stopping or changing the 1st process, and executing the 2nd process.

In accordance with various exemplary embodiments, reallocating may include, if the 2nd process occurs, judging a resource of the electronic device, and reallocating a resource required for processing of the 1st process and the 2nd process. Processing the at least one process may include executing at least one process among the 1st process or the 2nd process in accordance with the reallocated resource.

In accordance with various exemplary embodiments, the method may further include, if the 2nd process is ended, restoring a resource for the 1st process to execute the 1st process.

In accordance with various exemplary embodiments, the method may further include storing execution information about the 1st process in response to the sensing of the 2nd process. Executing the 1st process may include continuously executing the 1st process with another electronic device in accordance with the execution information, in response to the ending of the 2nd process.

In accordance with various exemplary embodiments, executing the 1st process may include confirming an identifier of another electronic device in response to the ending of the 2nd process, and initializing the connection according to the 1st wireless communication or resuming the 1st process with another electronic device, on the basis of the identifier of another electronic device.

An electronic device and an operation method thereof according to various exemplary embodiments may smoothly provide interworking between devices to enhance the usability of the electronic device in a scenario of a case where a new process is additionally executed besides the existing process in a connection between the electronic device supporting a plurality of wireless communication functions and the docking station.

According to various exemplary embodiments, an electronic device, a docking station and an external device may be connected with one another, and the electronic device may adaptively change and perform data communication on the basis of a connection state with the docking station. According to various exemplary embodiments, the electronic device may distinguish the external devices connected through the docking station and, at occurrence of a new process in course of the progress of the existing process, the electronic device may automatically change data communication for the external device in accordance with a connection state of ultra high speed proximity communication with the docking station and process a multiple process. According to various exemplary embodiments, in case where the electronic device is connected to the docking station and thereafter the new process occurs by the electronic device, the electronic device may seamlessly process the existing process and the new process. Through this, various exemplary embodiments may more enhance the usability of the electronic device, and may make smooth interworking among several devices, and extend the performance of the electronic device, and provide several functions in an improved method.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. An electronic device comprising:
   a first wireless communication interface configured to establish a first connection with another electronic device;
   a second wireless communication interface configured to establish a second connection with the other electronic device; and
   a processor operatively coupled with the first wireless communication interface and the second wireless communication interface, the processor configured to:
   establish, by the first wireless communication interface, the first connection between the electronic device and the other electronic device;
   perform a data communication with the other electronic device using the first connection;
   obtain an interrupt while performing the data communication with the other electronic device using the first connection;
   in response to obtaining the interrupt, determine a profile corresponding to the interrupt, wherein the profile is configured to allocate a system resource to the data communication;
   in response to determining the profile, allocate the system resource to the data communication in accordance with the determined profile; and
   perform the data communication with the other electronic device using the allocated system resource.

2. The electronic device of claim 1, wherein the first connection comprises a high speed close proximity communication, and wherein the second connection comprises one or more wireless communications than the first connection.

3. The electronic device of claim 1, wherein the profile is configured to allocate at least one of a communication resource, a data transmission capacity, a data processing scheme, or a system capacity to the data communication.

4. The electronic device of claim 3, wherein the processor is further configured to:
   in response to determining the profile, establish, by the second wireless communication interface, the second connection between the electronic device and the other electronic device in accordance with the determined profile, wherein the first connection is independently maintained from establishing the second connection; and
   perform the data communication with the other electronic device using at least one of the first connection or the second connection in accordance with a connection state of the first connection.

5. The electronic device of claim 4, wherein the processor is further configured to,
   when the first connection is disconnected during performing the data communication with the other electronic device using the first connection,
   perform the data communication with the other electronic device using the second connection.

6. The electronic device of claim 3, wherein the processor is further configured to:
   adjust data to meet the data transmission capacity corresponding to the determined profile; and
   perform the data communication, with the other electronic device, using the adjusted data.

7. The electronic device of claim 3, wherein the processor is further configured to:
   determine whether the interrupt occurs by another process than a process associated with the data communication;
   based on determining that the interrupt occurs by the other process, reallocate the system resource to the data communication and the other process in accordance with the determined profile; and
   perform, using the reallocated system resource, at least one of the data communication or the other process.

8. The electronic device of claim 7, wherein the processor is further configured to:
   identify that the other process is ended during performing the data communication using the reallocated system resource;
   in response to identifying, restore the system resource reallocated to the other process for the data communication; and
   continuously perform the data communication.

9. The electronic device of claim 8, wherein the processor is further configured to:
   in response to obtaining the interrupt, store execution information associated with the data communication before reallocating the system resource; and
   in response to ending the other process, restore the system resource in accordance with the stored execution information.

10. The electronic device of claim 9, wherein the processor is further configured to:
    confirm an identifier of the other electronic device in response to ending the other process; and
    initialize the first connection or resume the data communication with the other electronic device based on the identifier of the other electronic device.

11. A method for operating in an electronic device, the method comprising:
    establishing, by a first wireless communication interface, a first connection between the electronic device and another electronic device;
    performing a data communication with the other electronic device using the first connection;

obtaining an interrupt while performing the data communication with the other electronic device using the first connection;

in response to obtaining the interrupt, determining a profile corresponding to the interrupt, wherein the profile is configured to allocate a system resource to the data communication;

in response to determining the profile, allocating the system resource to the data communication in accordance with the determined profile; and perform the data communication with the other electronic device using the allocated system resource.

12. The method of claim 11, wherein the first connection comprises a high speed close proximity communication, and wherein a second connection comprises one or more wireless communication than the first connection.

13. The method of claim 11, wherein the profile is configured to allocate at least one of a communication resource, a data transmission capacity, a data processing scheme, or a system capacity to the data communication.

14. The method of claim 13, further comprising, in response to determining the profile, establishing, by a second wireless communication interface, a second connection between the electronic device and the other electronic device in accordance with the determined profile, wherein the first connection is independently maintained from establishing the second connection, and performing the data communication with the other electronic device using at least one of the first connection or the second connection in accordance with a connection state of the first connection.

15. The method of claim 14, further comprising, when the first connection is disconnected during performing the data communication with the other electronic device using the first connection, perform the data communication with the other electronic device using the second connection.

16. The method of claim 13, further comprising adjusting data to meet the data transmission capacity corresponding to the determined profile, and performing, using the adjusted date, the data communication with the other electronic device.

17. The method of claim 13, further comprising:

determining whether the interrupt occurs by another process than a process associated with the data communication;

based on determining that the interrupt occurs by the other process, reallocating the system resource to the data communication and the other process in accordance with the determined profile; and performing, using the reallocated system resource, at least one of the data communication or the other process.

18. The method of claim 17, further comprising:

identifying that the other process is ended during performing the data communication using the reallocated system resource;

in response to the identification, restoring the system resource reallocated to the other process for the data communication; and continuously perform the data communication.

19. The method of claim 18, further comprising:

in response to obtaining the interrupt, storing execution information associated with the data communication before reallocating the system resource, in response to ending of the other process, restoring the system resource in accordance with the stored execution information.

20. The method of claim 19, further comprising:

confirming an identifier of the other electronic device in response to ending of the other process; and initializing the first connection or resuming the data communication with the other electronic device based on the identifier of the other electronic device.

* * * * *